(12) United States Patent
Santos et al.

(10) Patent No.: US 12,508,595 B2
(45) Date of Patent: Dec. 30, 2025

(54) ROLLER CRUSHER AND A METHOD FOR OPERATING THE SAME

(71) Applicant: Metso USA Inc., Brookfield, WI (US)

(72) Inventors: Kristen Santos, Mechanicsburg, PA (US); Nicholas Joseph Mayfield, Monkton, MD (US); Julian Arnold Bublitz, Hillarys (AU); Brandon John Schuerman, York, PA (US); Vadim Reznitchenko, Mechanicsburg, PA (US)

(73) Assignee: METSO USA INC., Brookfield, WI (US)

( * ) Notice: Subject to any disclaimer, the term of this patent is extended or adjusted under 35 U.S.C. 154(b) by 260 days.

(21) Appl. No.: 18/330,529

(22) Filed: Jun. 7, 2023

(65) Prior Publication Data

US 2024/0408607 A1    Dec. 12, 2024

(51) Int. Cl.
| | |
|---|---|
| *B02C 4/30* | (2006.01) |
| *B02C 4/02* | (2006.01) |
| *B02C 4/28* | (2006.01) |
| *B02C 4/40* | (2006.01) |

(52) U.S. Cl.
CPC ............... *B02C 4/305* (2013.01); *B02C 4/40* (2013.01)

(58) Field of Classification Search
CPC ....................................................... B02C 4/40
See application file for complete search history.

(56) References Cited

U.S. PATENT DOCUMENTS

| | | | |
|---|---|---|---|
| 1,072,195 A | 9/1913 | Townsend | |
| 1,092,026 A | 3/1914 | Dailey | |
| 1,204,450 A | 11/1916 | Joseph | |
| 1,618,942 A | 2/1927 | O'Brien | |
| 1,963,781 A | 6/1934 | Evans | |
| 2,111,535 A | 3/1938 | Miller | |

(Continued)

FOREIGN PATENT DOCUMENTS

| | | |
|---|---|---|
| AU | 2018264756 A1 | 12/2019 |
| AU | 2018264756 B2 | 9/2021 |

(Continued)

OTHER PUBLICATIONS

English translate (CN115487897A), retrieved date May 10, 2025.*

(Continued)

*Primary Examiner* — Mohammed S. Alawadi
(74) *Attorney, Agent, or Firm* — Andrus Intellectual Property Law, LLP

(57) ABSTRACT

A roller crusher having two parallel rollers that rotate in opposite directions and are separated by a gap. At least one of the rollers has a flange at an end thereof. The roller crusher includes a material removal device having a rotatable cutter unit with a plurality of cutter elements arranged tangentially about the rotatable cutter unit at a radial distance from a rotational axis for the rotatable cutter unit. A rotation device rotates the rotatable cutter unit at an end of a roller having a flange. When the cutter unit is rotated by the rotation device, the cutter unit at least partially cuts away material accumulated on the flange and/or on the envelope surface at an end portion of the roller adjacent the flange. Each cutter elements presents an impact surface that faces the material to be cut away and is a polycrystalline diamond (PCD).

28 Claims, 23 Drawing Sheets

(56) References Cited

U.S. PATENT DOCUMENTS

| | | |
|---|---|---|
| 2,124,008 A | 7/1938 | Ernst |
| 2,560,837 A | 7/1951 | Alciati et al. |
| 2,969,193 A | 1/1961 | Ball |
| 2,991,019 A | 7/1961 | Sugden |
| 3,255,285 A | 6/1966 | Chilson |
| 4,134,673 A | 1/1979 | Fisher |
| 4,173,177 A | 11/1979 | Davis |
| 4,357,287 A | 11/1982 | Schoenert |
| 4,434,522 A | 3/1984 | Linzberger |
| 4,906,335 A | 3/1990 | Goodnow et al. |
| 5,054,701 A | 10/1991 | Durinck |
| 5,257,510 A | 11/1993 | Cox |
| 5,408,720 A | 4/1995 | Miles |
| 5,980,692 A | 11/1999 | Goodnow |
| 9,033,270 B2 | 5/2015 | Vantrease |
| 11,618,034 B2 | 4/2023 | Mark |
| 2012/0199402 A1 | 8/2012 | Rupp |
| 2013/0175379 A1* | 7/2013 | Vantrease ............... B02C 4/40 241/167 |
| 2015/0251222 A1* | 9/2015 | Walling ............... B05C 11/048 15/256.51 |
| 2023/0126189 A1 | 4/2023 | Reznitchenko |

FOREIGN PATENT DOCUMENTS

| | | | |
|---|---|---|---|
| CN | 203281336 U | | 11/2013 |
| CN | 104607268 A | | 5/2015 |
| CN | 106540776 A | | 3/2017 |
| CN | 106733110 A | * | 5/2017 |
| CN | 106975535 A | | 7/2017 |
| CN | 108126786 A | | 6/2018 |
| CN | 106179585 B | | 8/2018 |
| CN | 108855346 A | | 11/2018 |
| CN | 109046576 A | | 12/2018 |
| CN | 109174284 A | * | 1/2019 |
| CN | 106881169 B | | 8/2019 |
| CN | 210304685 U | | 4/2020 |
| CN | 113976221 A | | 1/2022 |
| CN | 217140526 U | | 8/2022 |
| CN | 217341537 U | | 9/2022 |
| CN | 115254297 A | * | 11/2022 |
| CN | 217856344 U | | 11/2022 |
| CN | 218459658 U | | 2/2023 |
| CN | 116889903 A | | 10/2023 |
| CN | 117654693 A | | 3/2024 |
| DE | 102014104038 A1 | | 9/2015 |
| DE | 102017208014 A1 | | 11/2018 |
| DE | 102019209514 A1 | | 12/2020 |
| EP | 2653229 A1 | | 10/2013 |
| EP | 3572153 A1 | | 11/2019 |
| JP | 3379672 B2 | | 2/2003 |
| WO | 2018206200 A1 | | 11/2018 |
| WO | 2020226651 A1 | | 11/2020 |
| WO | 2020226653 A1 | | 11/2020 |
| WO | 2020260307 A1 | | 12/2020 |

OTHER PUBLICATIONS

English translate (CN109174284A), retrieved date May 10, 2025.*
English translate (CN106733110A), retrieved date May 10, 2025.*
International Search Report and Written Opinion for International Application No. PCT/US2022/019686 mailed Jul. 14, 2022.
Wire wheel (from 2017); https://www.amazon.com/dp/B08KDFHSVS, website accessed Feb. 16, 2023.
International Search Report and Written Opinion for PCT/US2022/049185, mailed Mar. 21, 2023.
Office action for U.S. Appl. No. 17/197,346, mailed Feb. 27, 2023.
Final office action for U.S. Appl. No. 17/197,346, mailed Sep. 7, 2023.
Office action for U.S. Appl. No. 17/546,215, mailed Aug. 31, 2023.
International Search Report and Written Opinion for PCT/US2024/028297, mailed Jun. 26, 2024.
Office action for U.S. Appl. No. 17/197,346, mailed Apr. 9, 2024.
Final rejection for U.S. Appl. No. 17/197,346, mailed Feb. 25, 2025.
Office action for U.S. Appl. No. 17/197,346, mailed Jun. 16, 2025.
Office Action for U.S. Appl. No. 17/940,139, mailed Jul. 8, 2025.
International Search Report and Written Opinion for International Application No. PCT/US2023/072881, mailed Jan. 9, 2024.
International Search Report & Written Opinion for International Application No. PCT/ US2024/028301, mailed Jun. 26, 2024.
Office Action and Search Report for Chinese Patent Application No. 202210233929.3, issued Sep. 30, 2024.
Office Action for U.S. Appl. No. 17/940,139, dated Aug. 1, 2024.
Office Action for U.S. Appl. No. 18/330,532, dated May 6, 2025.
Office action for Chinese Utility Model Application No. 2024213052592, mailed Apr. 10, 2025.
Search Report and Examiner's Report for Chilean Patent Application No. 202401590, dated Sep. 24, 2025.

* cited by examiner

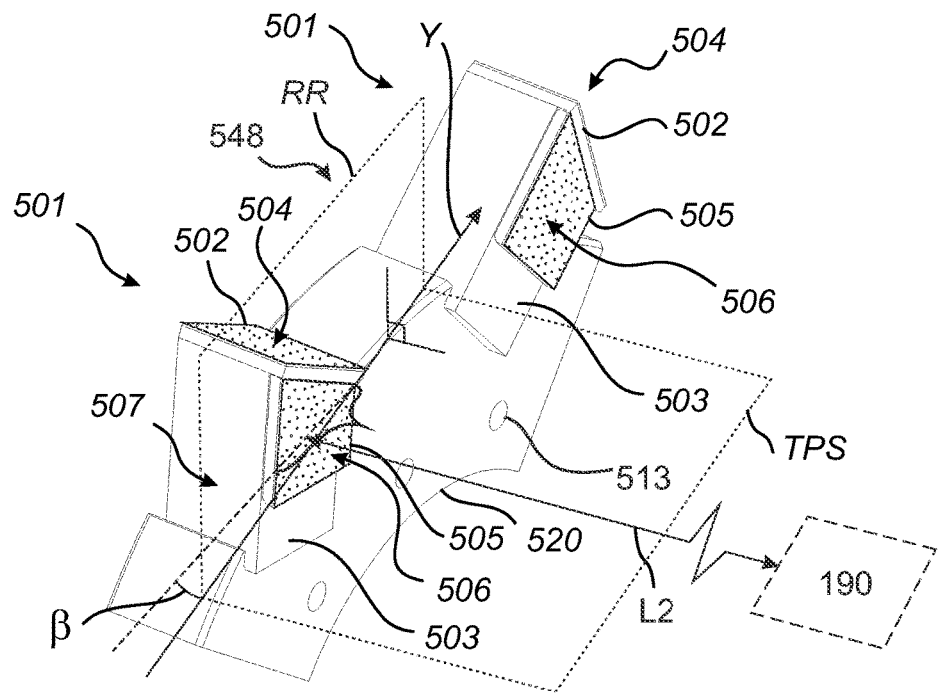
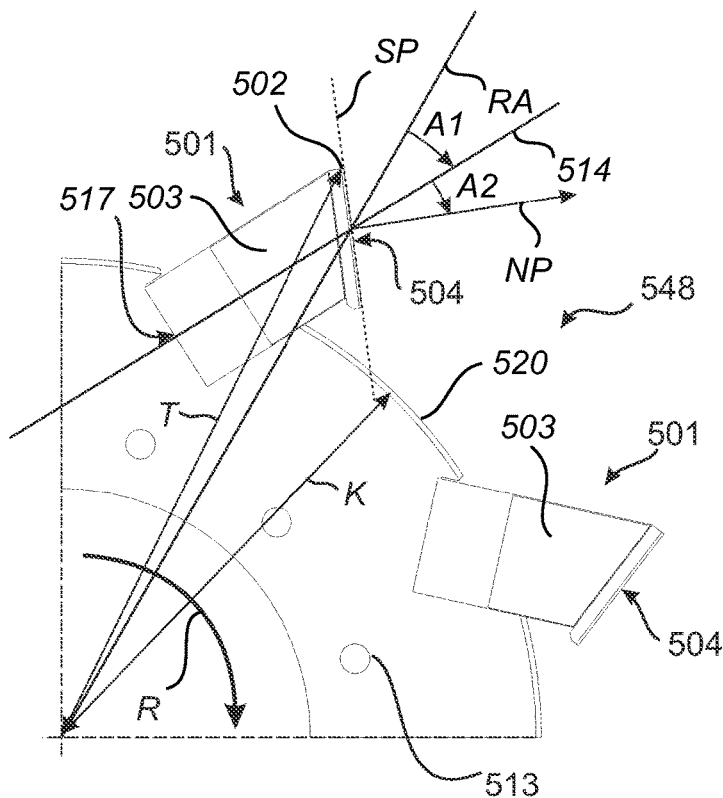 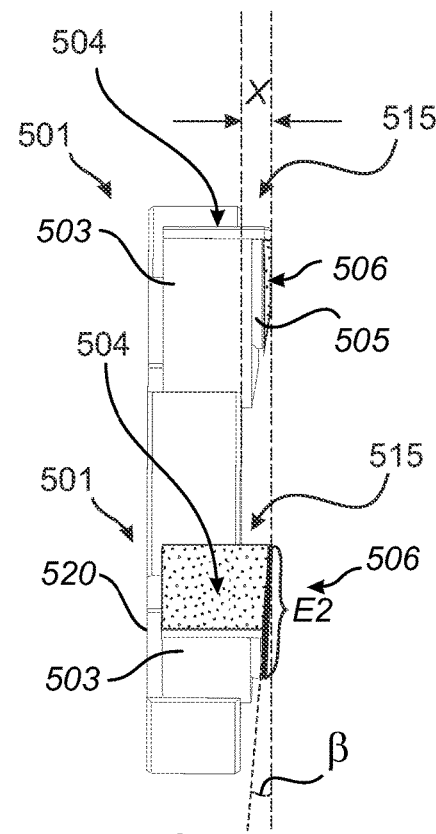
Fig. 19A
Fig. 19B
Fig. 19C

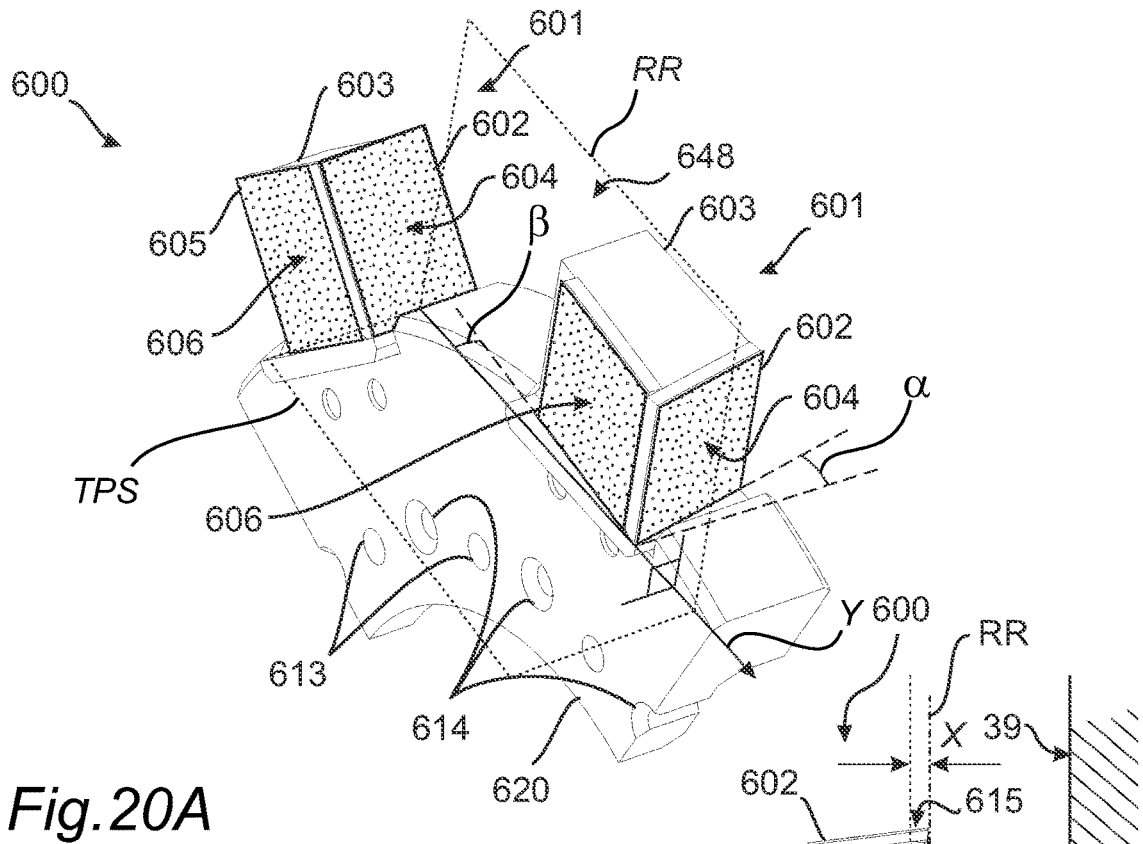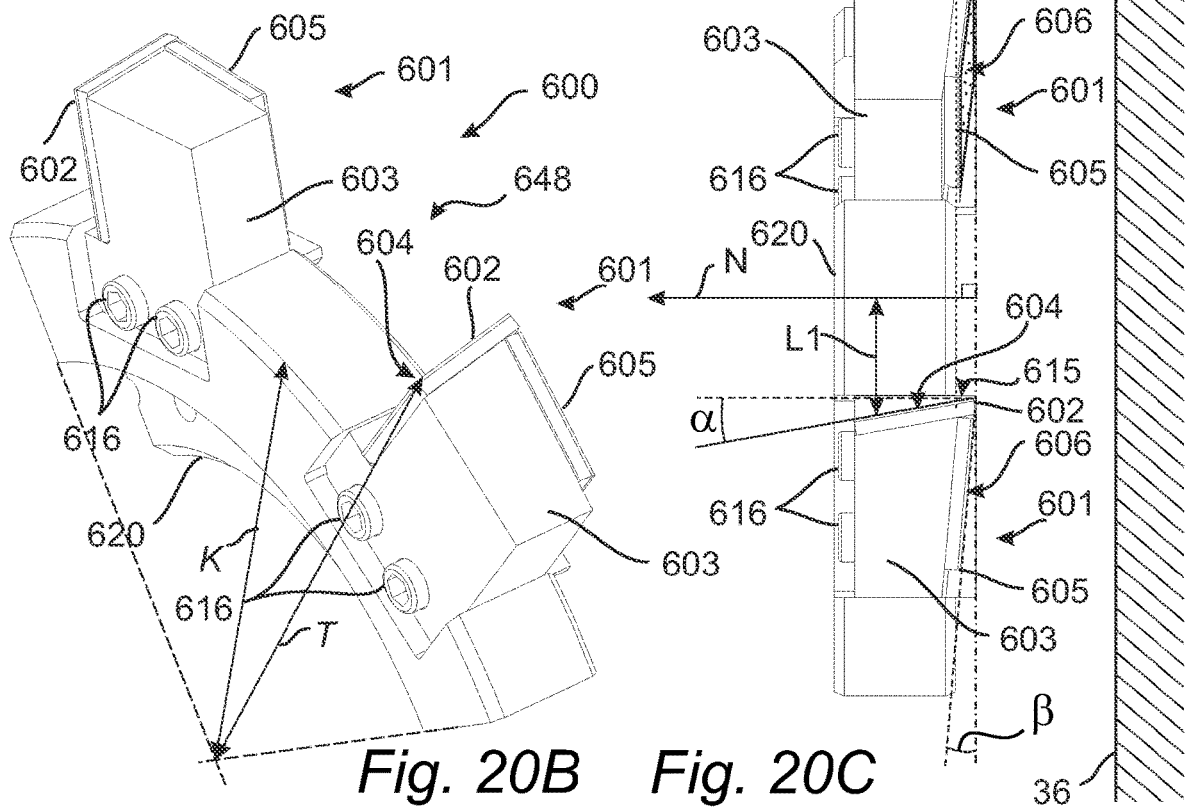
Fig. 20A  Fig. 20B  Fig. 20C

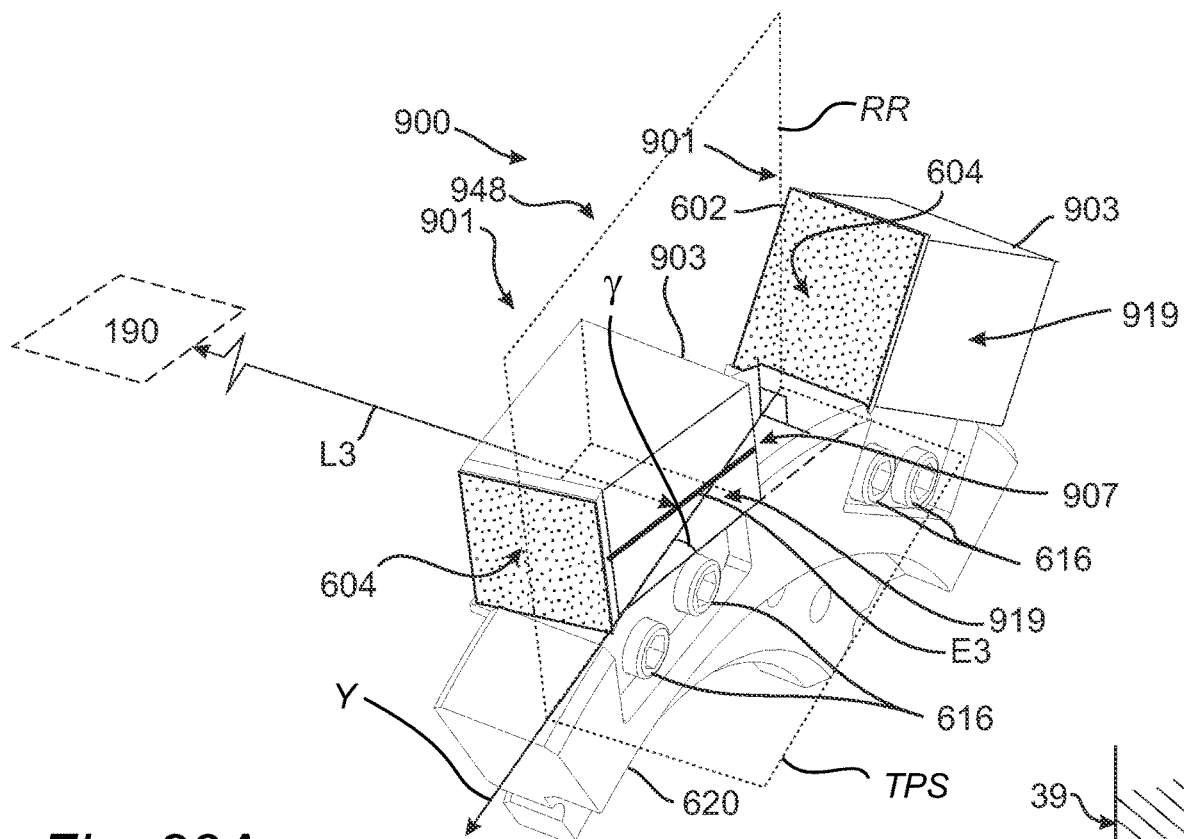
Fig. 23A
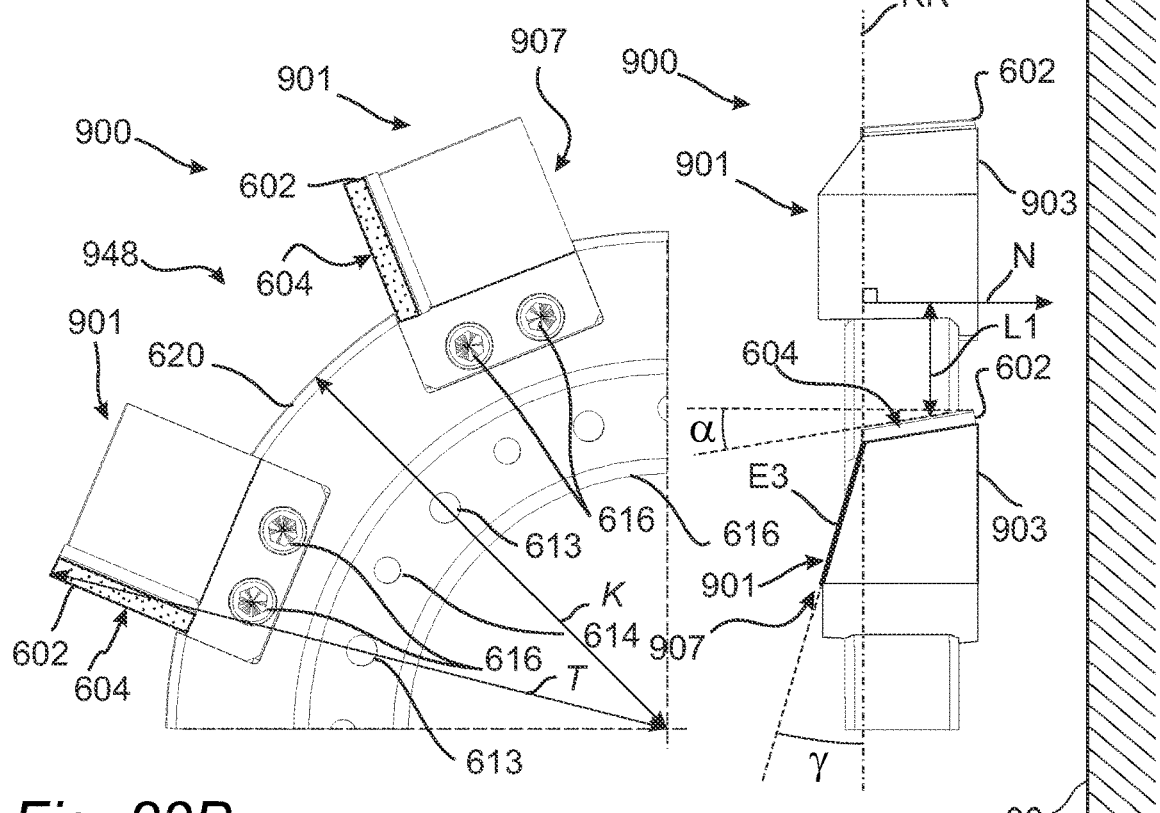
Fig. 23B
Fig. 23C

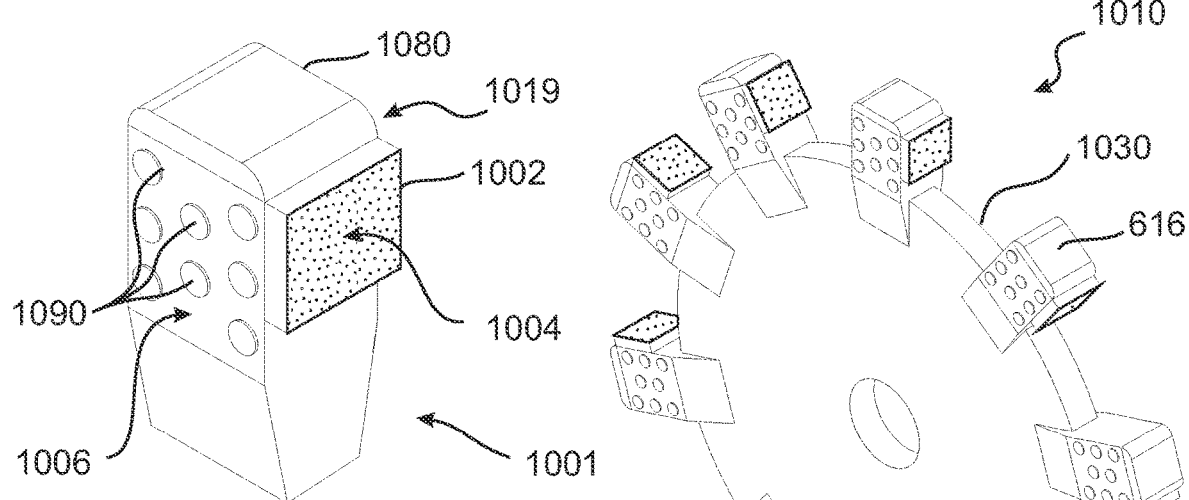
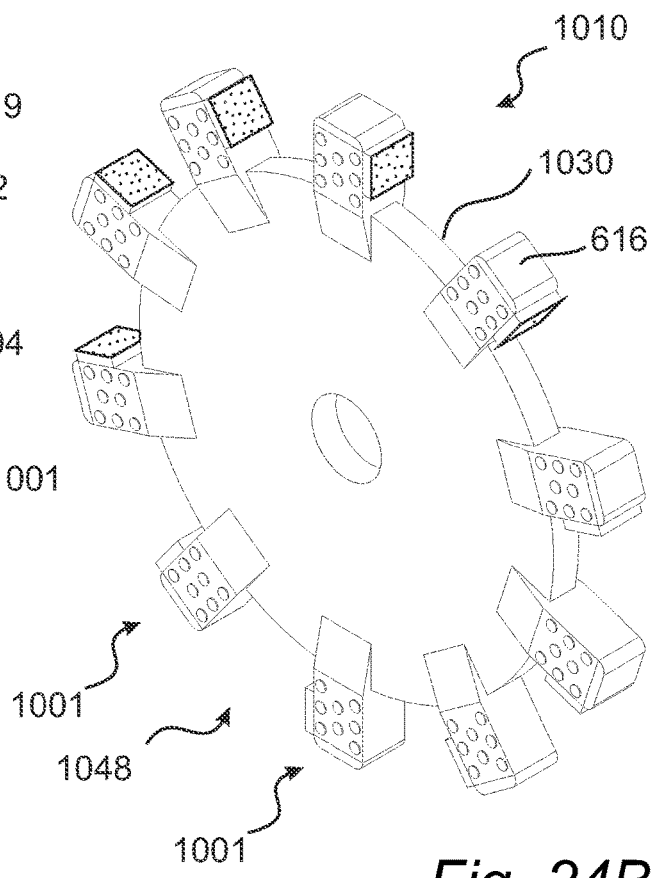
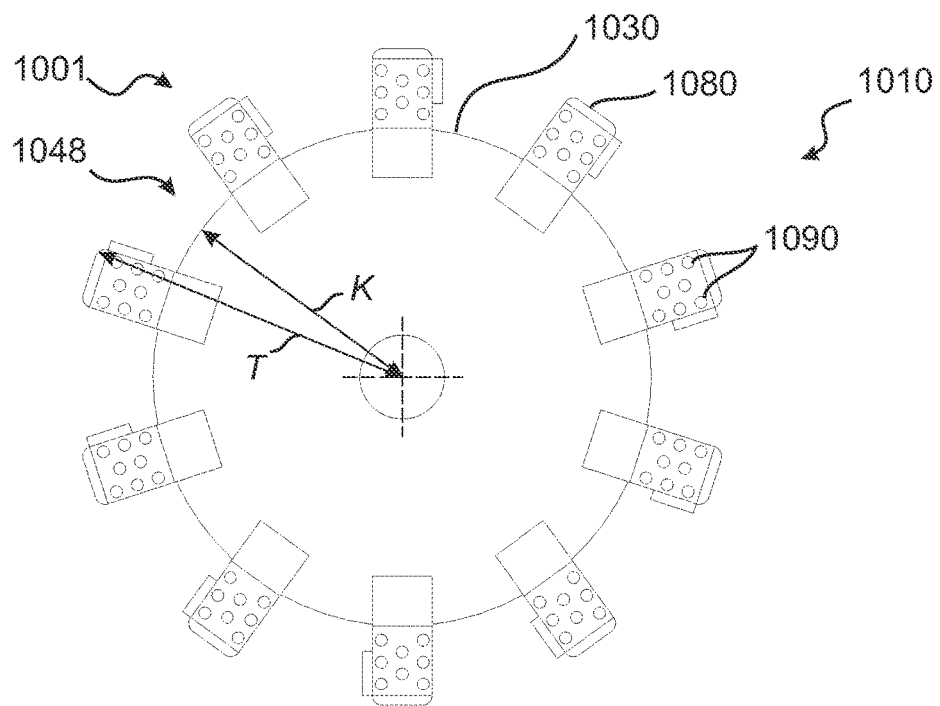
Fig. 24C
Fig. 24B
Fig. 24A

ROLLER CRUSHER AND A METHOD FOR OPERATING THE SAME

FIELD OF THE INVENTION

The present disclosure relates to a roller crusher having two generally parallel rollers, wherein the roller crusher comprises a flange attached to at least one of the ends of one of the rollers. The present disclosure further relates to a method for operating a roller crusher.

BACKGROUND

When crushing or grinding rock, ore, cement clinker and other hard materials, roller crushers may be used having two generally parallel rolls which rotate in opposite directions, towards each other, and which are separated by a gap. The material to be crushed is then fed into the gap. One type of roller crusher is called high pressure grinding rollers or high-pressure roller crushers. This type of comminution has been described in U.S. Pat. No. 4,357,287 where it was established that it is in fact not necessary to strive for single particle breakage when trying to achieve fine and/or very fine comminution of material. Quite opposite, it was found that by inducing compression forces so high that briquetting, or agglomeration of particles occurred during comminution, substantial energy savings and throughput increases may be achieved. This crushing technique is called interparticle crushing. Here, the material to be crushed or pulverized is crushed, not only by the crushing surfaces of the rolls, but also by particles in the material to be crushed, hence the name interparticle crushing. U.S. Pat. No. 4,357,287 specifies that such agglomeration may be achieved by using much higher compression forces then what was previously done. As an example, forces up to 200 kg/cm2 were previously used, whereas the solution in U.S. Pat. No. 4,357,287 suggests to use forces of at least 500 kg/cm2 and up to 1500 kg/cm2. In a roller crusher having a roller diameter of 1 meter, 1500 kg/cm2 would translate into a force of more than 200 000 kg per meter length of the rollers whereas previously known solutions could, and should, only achieve a fraction of these forces. Another property of the interparticle crushing is that a roller crusher should be choke fed with the material to be crushed, meaning that the gap between the two opposed rolls of the roller crusher should always be filled with material along the entire length thereof and there should also always be material filled to a certain height above the gap to keep it full at all times and to maintain a state of particle-on-particle compression. This will increase the output and the reduction to finer material. This stands in sharp contradiction to older solutions where it was always emphasized that single particle breaking was the only way fine and very fine particle comminution could be obtained.

Interparticle crushing, as opposed to some other types of crushing equipment, such as e.g. sizers, has the attribute that it does not create a series of shocks and very varying pressure during use. Instead, equipment using interparticle crushing is working with a very high, more or less constant pressure on the material present in the crushing zone created in and around the gap between the rolls.

In order to maintain crushing effect all along the length of the grinding rollers, flanges may be arranged to ends of the crushing rolls; one flange at each end of one roll, or one flange at one end of each roll, but on opposite ends of the roller crusher. With such an arrangement, it is possible to create a more efficient and uniform roll feed entry. The flanges will allow for material being fed such that a preferred material pressure is created over the entire length of the crusher rolls. It has been shown that it is possible to increase capacity of a given roller crusher with up to 20%, or sometimes even more, by using flanges. A general problem associated with grinding rollers without flanges is that the ratio between the roller diameter and the roller width is very important due to a significant edge effect, i.e. the crushing result is reduced at the edges of the rollers. This is because of the fact that material may escape over the edges of the rollers thereby reducing the crushing pressure on the material towards the gap at the edges of the rollers. Without flanges, it is thus necessary to recycle both material escaping the rolls and some of the material having passed the gap at the edges of the crusher rolls due to a lower pressure resulting in reduced breakage at the edges.

However, during operation of a grinding crusher with flanges, the flanges and also edges of opposite crusher roller is under a lot of stress and wear, and build-up material will gather in the transition between the crusher roller surface and the flange. Such excessive build-up material needs to be removed consistently during operation of the grinding crusher.

Prior art has suggested a scraper element for removing build-up material in the transition between the crusher roller surface and the flange, see for example AU2018264756 or U.S. Pat. No. 5,054,701.

Proceeding therefrom, it is an object of the present disclosure to provide a roller crusher having flanges, wherein the flanges and edges of opposing roller crusher ends are subjected to less stress and wear.

SUMMARY

According to a first aspect of the disclosure, this and other objects are achieved, in full or at least in part, by a roller crusher having two generally parallel rollers arranged to rotate in opposite directions, and separated by a gap, each roller having two ends, the roller crusher comprising:

a flange attached to one of the ends of one of the rollers, the flange extending in a radial direction of the roller, and the flange having an extension (H) past an envelope surface of the roller, wherein the roller crusher further comprises a material removal device, comprising:

a rotatable cutter unit having a plurality of cutter elements arranged tangentially about the rotatable cutter unit at a respective radial distance from a rotational axis of the rotatable cutter unit; and a rotation device arranged to rotate the rotatable cutter unit, wherein the rotatable cutter unit is arranged at an end of a roller having a flange and thereby, when being rotated by the rotation device, at least partially allow cutting away material accumulated on the flange and/or on the envelope surface at an end portion of the roller adjacent the flange, wherein each of the cutter elements of the plurality of cutter elements presents an impact surface arranged to face the material to be cut away, and wherein each of the impact surfaces comprises a polycrystalline diamond (PCD).

With the term "impact surface" is herein meant a surface of the cutter element that at least partly faces in a tangential direction of motion defined at the impact surface and directed along a rotational direction of the rotatable cutter unit. In other words, the impact surface has a projection in a plane being orthogonal to said tangential direction of motion which projection is larger than zero. As readily appreciated by the person skilled in the art, this achieves the effect that when the material removal device is arranged on a roller crusher, the impact surfaces may be arranged such that it at least partially faces the material to be removed. The impact surface may include one or more sub surfaces, termed herein as portions. These may be shaped in different ways and thus fulfil the above criterion of non-zero projection to a different degree. However, all surfaces that in one way or another faces the material to be removed will form a part of the impact surface. Surfaces which do not fulfil the above criterion may still be exposed to wear, but of an abrasive nature rather than an impact driven. Thus, these abrasive surfaces are not termed herein as impact surfaces. This may be expressed in an alternative way: Each cutter element may present one or more wear surfaces wherein said one or more wear surfaces include said impact surface arranged to face the material to be cut away and optionally one or more abrasive surfaces.

A first advantage of having impact surfaces comprising a polycrystalline diamond (PCD) is that the wear life of the cutter element is considerably prolonged. Normally such impact surfaces would comprise wear resistant material such as ceramic or composite materials comprising Tungsten carbide, Titanium carbide, or Vanadium carbide, but with an impact surface comprising polycrystalline diamond (PCD), the wear life may be prolonged with up to about 50 times in comparison with only comprising e.g. a composite material comprising Tungsten carbide.

It is conceivable to provide further surfaces of the cutter element with a polycrystalline diamond (PCD). For example, side surfaces of the cutter element which do not form part of the impact surface and therefore may be regarded as abrasive surfaces may comprise a polycrystalline diamond (PCD). Such side surfaces of the cutter element may include e.g. a surface of the cutter element which faces the flange, a surface of the cutter element which faces away from the flange, and a surface of the cutter element which faces the roller surface. Thus, it should be understood that the current inventive concept should not be construed as limited to cutter element having only its impact surface (i.e. its frontward facing surface) comprising a polycrystalline diamond (PCD).

According to one embodiment, the cutter element further comprises a wear resistant material in which the polycrystalline diamond (PCD) is at least partly embedded.

The polycrystalline diamond (PCD) may in an alternative embodiment be attached to a surface of a wear resistant material of the cutter element.

The wear resistant material may comprise a ceramic material, such as Titanium carbide, Vanadium carbide or Tungsten carbide; a metal ceramic composite material, such as cemented carbides, e.g. Titanium carbide, Tungsten carbide or Vanadium carbide with cobalt as a binder; or a metal matrix composite material comprising Titanium carbide, Tungsten carbide or Vanadium carbide.

In one embodiment, the wear resistant material is a cemented carbide comprising Tungsten carbide and, as a binder, cobalt in which the binder content may be 10-15 wt %.

In one embodiment, the polycrystalline diamond (PCD) is embedded in Tungsten carbide, Vanadium carbide, or Titanium carbide.

According to one embodiment, the impact surface of the cutter element may comprise a layer of polycrystalline diamond (PCD). The layer of polycrystalline diamond (PCD) may have a thickness of 0.4 to 3.2 mm, or 1.0 to 2.0 mm, or 1.35 to 1.8 mm, or 1.4 to 1.6 mm, or about 1.5 mm.

According to one embodiment, the impact surface of the cutter element may comprise two or more layers of polycrystalline diamond (PCD). Other surfaces, such as abrasive surfaces, or wear surfaces, of the cutter element may also comprise two or more layers of polycrystalline diamond (PCD). The two or more layers may be attached to each other e.g. by an adhesive. The number of layers and/or the thickness of individual layers may depend on grain size and/or the application for which it is used.

The diamond grain size of the polycrystalline diamond (PCD) of the impact surface may be 0.8 to 30 µm, as determined by image analysis using a Scanning Electron Microscope (SEM).

The grain size of diamond may be measured by various measurement techniques, such as laser size analysers or by scanning electronic microscopes (SEM). One example of a laser size analyser is a Malvern Particle size analyser equipment which is based on laser diffraction. The values determined using the laser size analyser may be the initial diamond grain size that for some embodiments may later be subjected to High Pressure High Temperature Sintering. When the diamond particles have been sintered and compacted to form the polycrystalline diamond (PCD) of the impact surface, an image analysis by means of scanning electron microscopy is used to determine the end microstructural grain size distribution, i.e. the diamond grain size of the polycrystalline diamond (PCD) of the impact surface.

The roller crusher of the first aspect may be advantageous as it allows removing built-up material accumulated on the flange and/or on the envelope surface at an end portion of the roller adjacent the flange in a more efficient way. The rotatable cutter unit could be regarded as a plurality of movable impact surfaces, each of these impact surfaces being defined on a respective one of the plurality of cutter elements. The material is removed as a result from the impact forces created between the material build-up on the roller and these impact surfaces during operation. The impact forces will increase with an increase in relative speed between the material build-up (i.e. determined by the tangential speed of the envelope surface, also termed herein as roller surface, or outer surface, of the roller with a flange) and the speed of the impact surface (i.e. determined by the tangential speed of the cutter elements on the rotatable cutter unit). By the provision of a rotatable cutter unit, the material removal is not solely relying on the impact forces created by the movement of the roller with respect to the material removal device, as is the case when the material removal device is a stationary scraper and thus defines a stationary impact surface. Instead, by rotating the rotatable cutter unit, an impact surface of the rotatable cutter unit may obtain a considerable tangential speed on its own. If rotating the rotatable cutter unit in the same rotational direction as the roller with the flange, the impact forces may be considerably increased, allowing a more efficient and reliable material removal. A further advantage of the rotatable cutter unit is that it allows tailoring the impact forces for the specific situation. There may for example be situations where it is less desirable to have a high impact force. For such situations, the rotating speed of the rotatable cutter unit may be reduced to lower the impact forces during material removal without affecting the operation of the crusher itself (i.e. the rotating speed of the roller with the flange can be kept constant). It may even be situations where it is desirable to lower the impact forces beyond what can be achieved with a stationary scraper. For such situations, the rotatable cutter unit may be rotated in a rotational direction opposite to the rotational direction of the roller with the flange. A yet further advantage of the rotatable cutter unit is that the provision of a plurality of cutter elements increases the overall wear resistance of the material removal device as compared to a stationary scraper. The plurality of cutter elements will share the wear, whereby individual cutter elements will have a longer expected lifetime. This allows increasing the time period of operation before material removal device maintenance, hence reducing down-time of the roller crusher.

As readily appreciated by the person skilled in the art, the rotatable cutter unit may be rotated about a cutter unit rotational axis. The cutter unit rotational axis is preferable parallel with a rotational axis of the roller with a flange. However, it is conceivable that the cutter unit rotational axis is angled with respect to the rotational axis of the roller with a flange, as will be described in more detail in what follows.

The rotatable cutter unit may be arranged such the cutter unit rotational axis forms a tilt angle $\phi$ with respect to the rotational axis of the roller in the radial plane of the roller which intersects the cutter unit rotational axis. This implies that the rotatable cutter unit will be unparallel with the flange of the roller, resulting in a varying distance between the rotatable cutter unit and the flange in the radial direction of the roller. The tilt angle $\phi$ may be in the range of 0 to 90 degrees, preferably within the range 0 to 45 degrees.

The rotatable cutter unit may alternatively, or additionally, be arranged such the cutter unit rotational axis forms a skew angle $\varphi$ with respect to the rotational axis of the roller in the tangential plane of the roller which is orthogonal to said radial plane of the roller which intersects the cutter unit rotational axis. This implies that the rotatable cutter unit will be unparallel with the flange of the roller, resulting in a varying distance between the rotatable cutter unit and the flange along the tangential direction of the roller surface. The skew angle $\varphi$ may be in the range of 0 to 20 degrees, preferably within the range 0 to 15 degrees. Preferably, the skew angle $\varphi$ is defined such that the distance between the rotatable cutter unit and the flange is at its minimum on an upstream end of the material removal device. This may be advantageous as it may facilitate removal of the broken off build-up material at the down-stream end of the material removal device as a result of the distance between the rotatable cutter unit and the flange being wider there.

The rotatable cutter unit may be rotated in the same rotational direction as the rotational direction of the roller with a flange. Alternatively, the rotatable cutter unit may be rotated in a rotational direction being opposite to the rotational direction of the roller with a flange. The rotational speed of the rotatable cutter unit may be within the range of 1 rpm up to 200 rpm. As readily appreciated by the person skilled in the art, the important factor will be the relative difference in tangential velocity between the roller surface and the cutter elements of the rotatable cutter unit at the point of impact between the same. If the rotatable cutter unit rotates along the same rotational direction as the rotational direction of the roller with a flange, the highest relative difference in tangential velocity will typically be obtained. If the rotatable cutter unit rotates along the rotational direction being opposite to the rotational direction of the roller with a flange, the relative difference in tangential velocity will be lower. At a particular ratio between the rotational speed of the roller and the rotational speed of the rotatable cutter unit, the relative difference in tangential velocity will be zero which will result in loss of cutting action. Therefore, when operating the rotatable cutter unit along the rotational direction being opposite to the rotational direction of the roller, care must be taken to avoid this operating condition. For an efficient cutting operation, the relative tangential speed is preferably higher than 1.25 times the tangential speed of the roller surface.

The rotatable cutter unit may be mounted on, or attached to, a rotating shaft. The rotating shaft may be a through-going rotating shaft. This implies that the rotating shaft extends through the rotatable cutter unit. This may be advantageous as it allows supporting the rotating shaft at both ends of the rotatable cutter unit, hence providing improved structural integrity. It is however conceivable that the rotatable cutter unit is mounted on, or attached to, a rotating shaft which is not through-going. This may have the advantage that it is easier to replace the rotatable cutter unit.

The rotatable cutter unit has a plurality of cutter elements arranged tangentially about the rotatable cutter unit. This implies that the cutter elements are arranged along a periphery of the rotatable cutter unit. In other words, each cutter element will be arranged on a circular path. It further implies that the cutter elements are arranged radially distanced from the cutter unit rotational axis. Preferably, the cutter elements are arranged at the same radial distance from the cutter unit rotational axis. However, it is conceivable that the cutter elements are arranged at different radial distances from the cutter unit rotational axis. For example, every other cutter element may be arranged at a first radial distance from the cutter unit rotational axis and remaining cutter element arranged at a second radial distance from the cutter unit rotational axis, wherein the first and second radial distances are different. This may allow providing a material removal device which increases the material removal efficiency once it has reached a certain degree of wear. The cutter elements may be mutually equidistantly arranged tangentially about the rotatable cutter unit. This implies that the distance between one cutter element and its neighbour will be the same for all cutter elements. It is however also conceivable that the cutter elements are arranged at different distances from each other.

The rotatable cutter unit may be integrally formed by a single element. This implies that the plurality of cutter elements will constitute radially extended protrusions on such a single element. Alternatively, the rotatable cutter unit may be an assembly of two or more elements. This will be further described hereinbelow and example embodiments will be defined.

Each cutter element of the plurality of cutter elements presents an impact surface arranged to face the material to be cut away. The term "impact surface" should be construed as any surface of the cutter element which makes first contact with material accumulated on the flange and/or on the envelope surface at an end portion of the roller adjacent the flange. This implies that the impact surface faces the material to be removed.

According to an embodiment, the impact surface is substantially planar and arranged transverse to a tangential direction of motion of the cutter element. This example embodiment resembles the geometry of a stationary scraper of the prior art and may be easier and cheaper to manufacture due to its inherit simplicity.

According to one embodiment, the rotatable cutter unit is arranged such that the plurality of cutter elements during operation passes at a distance to the flange and/or to the outer surface at the end of the roller.

The distances between the cutter elements and the roller surface and/or flange may alternatively be defined using a minimum roller distance and a minimum flange distance, respectively. The minimum roller distance is defined as the minimum distance between a cutter element and the envelope surface of the roller. Similarly, the minimum flange distance is defined as the minimum distance between a cutter element and an inner surface of the flange.

According to an embodiment, the rotatable cutter unit is arranged at a first end of the material removal device, and the rotation device is arranged at a second, opposite, end of the material removal device, and wherein the rotatable cutter unit extends in a reference plane which is orthogonal to the rotational axis.

According to one embodiment, each impact surface of the plurality of cutter elements is substantially planar and arranged to incline in a relation to a normal of the reference plane, as defined in front of the impact surface, and incline such that a distance between the normal and the impact surface decreases towards the flange. The normal is defined as a line which is orthogonal to the reference plane. When the material removal device is arranged in relation to the roller in an untilted way, the reference plane will be parallel with a plane defined by the inner surface of the flange. For such a configuration, the normal is also orthogonal to the inner surface of the flange. However, as will be described later herein, the roller crusher of the disclosure is not limited to such an arrangement, and tilted configurations where the reference plane of the rotational cutter unit and the plane defined by the inner surface of the flange are unparallel with each other, are also conceivable.

An advantage of having the impact surface in an inclination in relation to the normal of the reference plane with a decreasing distance towards the flange, is that the material removed from the position in the corner formed by the envelope surface of the roller and the inner surface of the flange will be urged by the inclined impact surface towards the centre of the roller instead of being squeezed and compacted between the cutter element and the inner surface of the flange. With the term "inner surface" is meant the surface of the flange that faces the centre of the roller. Thus, the inner surface of the flange will be in contact with the material to be crushed.

According to one embodiment, the impact surface may be substantially planar. Therefore, the varying distance as described hereinabove may, according to this embodiment, be further expressed in terms of an angle α defined between the impact surface and the normal of the reference plane, wherein the angle α is defined within a tangential plane of the cutter element which is orthogonal to the reference plane. This angle α may be 1 to 45°, 1 to 35°, 1 to 30°, 1 to 15°, or 2 to 10°, or 3 to 8°, or 4 to 6°, or 5°.

With "tangential plane of the cutter element" is herein means a plane which is parallel with the tangential direction of motion of the cutter element, as defined at the impact surface and directed along a rotational direction of the rotatable cutter unit, and which plane is orthogonal to the reference plane. Thus, each cutter element of the plurality of cutter elements have an associated tangential plane, which are all angled with respect of each other as a result from the cutter elements being arranged tangentially about the rotatable cutter unit.

According to an embodiment, the impact surface has a front portion and a rear portion which interconnect each other, wherein the front portion is arranged upstream of the rear portion as seen in relation to a tangential direction of motion of the cutter element and wherein the front portion is arranged closer to the flange than the rear portion. This may be advantageous as it allows creating very strong impact forces on localized regions of the material build-up on the roller with the flange with the front portion, thereby increasing the likelihood of breaking away larger portions of material. The rear portion may then step in and aid in further removing material from the roller and/or conveying the already removed material away from the flange region.

According to an embodiment, the rear portion is shaped so as to convey cut away material in a direction away from the flange. This implies that the rear portion is shaped to achieve a propeller of turbine effect.

According to an embodiment, the rear portion is substantially planar and forms an oblique angle with respect to the tangential direction of motion of the cutter element. This may be advantageous as it is relatively easy and cheap to manufacture.

According to an embodiment, the rear portion is curved inwardly so as to form a bowl-shape, also called concave shape. The bowl-shape may further enhance the propeller effect and thereby further enhance the conveying of already removed/loosened material from the flange region.

According to one embodiment, each of the cutter elements has a surface facing the flange, which surface has an extension from its impact surface tangentially towards a rear end thereof, wherein the cutter element is structured and arranged such that a distance between the surface facing the flange and the rotation device decreases towards the impact surface over at least a part of the extension. With the expression "which surface has an extension from its impact surface tangentially towards a rear end thereof", it is meant that the cutter element has an extension on its back side. The surface facing the flange will thus be located downstream of the impact surface. Thus, the "extension [ . . . ] tangentially"-phrasing should be construed broadly and be read to encompass any surface which has an extension, or dimension, which is substantially parallel with a tangential direction of motion at the position of the cutter element. This extension does not have to be the main extension of the cutter element.

An advantage of cutter elements with such a structure and arrangement is that the material removed from the position in the corner formed by the outer surface of the roller and the inner surface of the flange will be prone to flow along this surface of the cutter element facing the flange, and as the distance is increasing away from and downstream of the impact surface, the removed material will be allowed to be removed towards the center of the roller instead of being squeezed and compacted between the cutter element and the inner surface of the flange.

According to one embodiment, the surface facing the flange is substantially planar. Therefore, the varying distance as described hereinabove may, according to this embodiment, be further expressed in terms of an angle β defined between the surface facing the flange and the reference plane, wherein the angle β is defined within a tangential plane of the cutter element which is orthogonal to the reference plane. The angle β may be 1 to 45°, 1 to 40°. 1 to 30°, 5 to 25°, or 5 to 20°, or 5 to 15°, or 8 to 12°, or 10°.

According to one embodiment, each of the cutter elements has a surface facing the flange, which surface comprises a polycrystalline diamond (PCD). Alike with the polycrystalline diamond (PCD) on the impact surface, also on this surface facing the flange, the polycrystalline diamond (PCD) may be at least partially embedded in a wear resistant material, as defined above.

According to one embodiment, each of the plurality of cutter elements has a surface facing away from the flange, which surface has an extension tangentially from the impact surface towards a rear end thereof, wherein the cutter element is structured and arranged such that a distance between the surface facing away from the flange and the rotation device decreases towards the impact surface over at least a part of the extension. On the at least one cutter element, the surface facing away from the flange is opposite to the surface facing the flange. As readily appreciated by the person skilled in the art, a distance defined between a surface facing away from the flange and the rotation actuator must inevitably be defined as going through the cutter element which presents said surface. In the context of defining the distance, the term "surface" should thus be construed as a mathematical or geometrical surface. Again, the cutter element provides a surface which will urge the removed material to be moved towards the centre of the roller, which is beneficial.

According to one embodiment, the surface facing away from the flange includes a surface which is substantially planar. Therefore, the varying distance as described hereinabove may, for this embodiment, be further expressed in terms of an angle $\gamma$ defined between the surface which faces away from the flange and the reference plane, wherein the angle $\gamma$ is defined within a tangential plane of the cutter element which is orthogonal to the reference plane. The angle $\gamma$ may be 1 to 45°, or 1 to 40°, or 1 to 30°, or 5 to 25°, or 5 to 20°, or 5 to 15°, or 8 to 12°, or 10°. Although preferably angled such that the distance between the surface facing away from the flange and the rotation device decreases towards the impact surface over at least a part of the extension, it is also conceivable to provide a cutter element having a surface facing away from the flange arranged such that the distance between said surface facing away from the flange and the rotation device increases towards the impact surface over at least a part of the extension. As readily appreciated by the person skilled in the art, this will for a substantially planar surface be defined using negative angles $\gamma$ using the above definition. For such embodiments, the angle $\gamma$ may hence be $-1$ to $-45°$, or $-1$ to $-40°$, or $-1$ to $-30°$, or $-5$ to $-25°$, or $-5$ to $-20°$, or $-5$ to $-15°$, or $-8$ to $-12°$, or $-10°$.

According to one embodiment, the plurality of cutter elements is arranged to form axial protrusions on one or both sides of the rotatable cutter unit. Phrased in differently, the plurality of cutter elements is arranged such that they axially protrude outside one or both axial end(s) of the remaining part of the rotatable cutter unit. Thus, when the rotatable cutter unit is arranged in a roller crusher for operation and the plurality of cutter elements has an axial extension towards the flange, then a distance between the plurality of cutter elements and the flange is narrower than a distance between the remaining part of the rotatable cutter unit and the flange. An advantage with this is that, upon arranging and operating the rotatable cutter unit in a roller crusher, the material removed will, as soon as it has flown past along the surface of the cutter unit facing the flange, easily be removed via the wider gap between the inner surface of the flange and the remaining part of the rotatable cutter unit, and flow towards the centre of the roller instead of being squeezed and compacted between the rotatable cutter unit and the inner surface of the flange.

According to one embodiment, the axial protrusions have axial extensions within the range of up to 75 mm, or 5 to 50 mm, or 10 to 40 mm. Although the above disclosed ranges are currently preferred, it is contemplated that axial extensions could also be larger than 75 mm. The axial extension may depend on the roller crusher, the operating conditions, and the material to be crushed etc. Thus, the axial extension must be chosen based on parameters such as, but not limited to, the crushing gap, the size of the crushing rolls, and the size of the build-up material to be removed. A bigger material build-up may require a bigger axial extension.

According to one embodiment, the rotatable cutter unit extends in a reference plane which is orthogonal to the rotational axis of the rotatable cutter unit, wherein each of the plurality of cutter elements extends in the reference plane along a cutter element axis towards the impact surface, and wherein the cutter element axis forms a first acute angle along a reference rotational direction with a radial axis of the rotatable cutter unit which radial axis intersects with the cutter element. An advantage with this is that the impact forces acting upon the impact surface will become substantially aligned with the cutter element axis during operation and will more likely be absorbed in the direction of the cutter element axis, which is well supported and attached by the rotatable cutter unit.

According to one embodiment, each impact surface of the plurality of cutter elements extends in a plane which has a normal which forms an acute angle along the reference direction with the cutter element axis. Again, an advantage with this is that the impact forces acting upon the impact surface become even more substantially aligned with the cutter element axis during operation and will more likely be absorbed in the direction of the cutter element axis, which is well supported and attached by the rotatable cutter unit.

According to one embodiment, each of the plurality of cutter elements has a surface facing away from the flange and a surface facing the flange, and wherein at least one of the surface facing away from the flange and the surface facing the flange comprises ceramic inserts. Arranging ceramic inserts on these surfaces will prolong the wear life of the cutter elements.

According to an embodiment, each cutter element of the plurality of cutter elements comprises a cutter element holding structure and an attached thereto, wherein the active cutter element presents said impact surface. This may be advantageous as it allows using dedicated cutter elements which may thus be tailored specifically for the cutting. Another advantage is that the active cutter element may be replaced when worn out without having to replace the cutter element holding structure, which may thus be reused. This may reduce the overall waste and cost.

According to an embodiment, the rotatable cutter unit has an annular engagement portion and wherein each cutter element of the plurality of cutter elements is releasably arranged to the annular engagement portion. The term "annular engagement portion" should be construed as an annularly shaped part of a structure, which could consist of one element or an assembly of elements, which forms an outer periphery onto which the plurality of cutter elements can be releasably arranged. The annular engagement portion could e.g. be the peripheral annular portion of a rotatable disc. The provision of releasable cutter element may be advantageous as it allows selectively replacing individual cutter elements. Thus, if e.g. one cutter element is damaged, remaining cutter elements may be left untouched and replacement only undertaken for the damaged element.

According to an embodiment, the rotatable cutter unit further comprises a main support structure and at least two cutter element support structures, wherein the at least two cutter element support structures are releasably arranged with respect to the main support structure and shaped as circular ring sectors which together form a circular ring, and which circular ring presents the annular engagement portion. In principle, the rotatable cutter unit may comprise any number of cutter element support structures. Thus, it is also conceivable to provide a single cutter element support structure. However, the provision of at least two cutter element support structures has the advantage that it allows mounting on a main support structure which is rotationally arranged on a through-going shaft. The at least two cutter element support structures may have the same dimensions. Thus, for an embodiment having two cutter element support structures, each of the cutter element support structures may constitute a 180 degree circular ring sector. Alternatively, for an embodiment having three cutter element support structures, each of the cutter element support structures may constitute a 120 degree circular ring sector. Alternatively, for an embodiment having four cutter element support structures, each of the cutter element support structures may constitute a 90 degree circular ring sector. It is also conceivable that the two or more cutter element support structures have different dimensions. Every embodiment will however have one thing in common: The at least two cutter element support structures will together form a circular ring, and the circular ring will present the annular engagement portion. These example embodiments may be advantageous as they provide a modularity to the design, hence facilitating easier and faster maintenance. By the provision of the at least two cutter element support structures, a complete module including several cutter elements may be removed from the material removal device in a single operation. This may also improve the speed and reliability when replacing cutter elements on a material removal device, since every cutter element may be replaced by replacing only the at least two cutter element support structures.

According to an embodiment, each cutter element of the plurality of cutter elements is releasably arranged in the annular engagement portion by a geometrical locking engagement. This may be advantageous as it allows making the construction impact resistant. During operation, the cutter elements will repeatedly make impact with material build-up on the roller having a flange, which will result in a torsional load on in the connection region between the cutter element and the annular engagement portion. By the provision of a locking engagement, this load may be at least partly absorbed by the structures themselves, hence reducing load on fasteners, such as e.g. bolts, screws and nuts, which are typically used to provide said releasable arrangement of the cutter elements to the annular engagement portion. The geometrical locking engagement may be embodied in different ways as will be detailed hereinbelow.

According to an embodiment, the geometrical locking engagement is at least partly defined by a protruding structure of the cutter element being inserted into an associated recess of the annular engagement portion, wherein the protruding structure and the associated recess has complementary shapes.

This is regarded as a preferred way of providing the locking engagement. It is achieved by the provision of complementary shapes on the cutter elements and the annular engagement portion, respectively. Such complementary shapes may be a protrusion that locks, by its mere shape, to a recess when inserted therein. A simple example may be a rod protruding into a bore. One conceivable way of providing a locking engagement could be to provide a plurality of bores directed radially inwardly on the periphery of the annular engagement portion and allow the cutter elements protruding into these bores. They may then be secured to the annular engagement portion by bolting. As readily appreciated by the person skilled in the art, the bolts will not absorb a majority of the torsional loads, which will instead be absorbed by the bore-protrusion arrangement having the complementary shapes.

According to an embodiment, the associated recess of the annular engagement portion is defined on a side surface thereof. This may be advantageous as it allows easier replacement. The provision of the recesses on a side surface of the annular engagement portion may reduce the risk of jam between the annular engagement portion and the cutter elements as a result from dust and contamination entering into the recesses.

According to an embodiment, each cutter element of the plurality of cutter elements comprises a cutter element holding structure and an active cutter element attached thereto, wherein the active cutter element presents said impact surface, and wherein the protruding structure forms a part of the cutter element holding structure. This may be advantageous as it allows an even more modular system. The dedicated cutter elements, termed herein as "active cutter elements" allow for individual replacement without having to replace the rest of the cutter element (i.e. the cutter element holding structure). However, during replacement, it is conceivably easier to replace the whole cutter element to a new one, including thus both the active cutter element and the cutter element holding structure. Once a cutter element has been removed, it may however be taken to a workshop or other dedicated facility, at which the worn-out active cutter element can be replaced by a new one on the cutter element holding structure. Thus, the same cutter element holding structure may be used many times.

According to an embodiment, the cutter element holding structure comprises a support portion protruding out from the same in a direction counter to a tangential direction of motion of the cutter element, said support portion being arranged such that it is supported by the annular engagement portion. This may be advantageous as it further aids in absorbing the torsional loads exerted in the cutter elements during operation. When a cutter element makes impact with material on the roller having a flange, the cutter element will be forced backwards. Since the cutter element is arranged in the annular engagement portion which is located radially inwardly from the point of impact (i.e. at the impact surface of the cutter element), the cutter element will exert a torsional load at the position where the cutter element is arranged in the annular engagement portion. This will, in turn, result in that the cutter element will strive to bend backwards around this point. By the provision of the backward-facing protrusion on the cutter element, this bending will be counteracted by the protrusion being supported by the annular engagement portion. In a way, this may be regarded as yet another means of geometrical locking. In some embodiments, the protrusion is supported by the annular engagement portion by being in direct contact therewith. In other words, the protrusion may be in abutment with the annular engagement portion. In other embodiments, the protrusion is supported by the annular engagement portion by being in direct contact with one or more further elements which in turn are in a direct contact with the annular engagement portion. Thus, the support may not require abutment.

According to an embodiment, the roller crusher further comprises wear shields structured and arranged to protect at least parts of the rotatable cutter unit. The wear shields may be advantageous as they allow protecting the rotatable cutter unit from the harsh environment in which it is intended to operate. During crusher operation in general, and in particular during removal of build-up material from the roller with a flange, there will be a high density of high-velocity stone, sand and dust constantly impinging on surfaces of the rotatable cutter unit, hence increasing the risk of wear on the parts, as well as damage due to penetration into cavities and gaps, which may also increase the complexity of maintenance and replacement.

According to an embodiment, the roller crusher comprises a first set of wear shields structured and arranged to protect a first side of the rotatable cutter unit, and a second set of wear shields structured and arranged to protect a second side of the rotatable cutter unit, and wherein at least wear shields of one of the first and second sets of wear shields have edge walls for interconnecting the first and second set of wear shields at the annular engagement portion between the plurality of cutter elements when mounted on the rotatable cutter unit. The first set of wear shields may comprise two or more wear shields. The second set of wear shields may comprise two or more wear shields. The wear shields may be mounted onto the rotatable cutter unit as a last step. This implies that, for embodiments having cutter elements which are releasably arranged to the annular engagement portion, the cutter elements are first arranged to the annular engagement portion, whereby the first and second sets of wear shields are mounted onto the rotatable cutter unit. This has the advantage of allowing protection to the fastening system used to releasably arrange the cutter elements to the annular engagement portion.

The wear shields may be made of hardened steel, hardened iron, hardened metals, carbides, braced with tungsten carbides, or high wear-materials such as weld overlay.

It is conceivable to control the rotational speed of the rotatable cutter unit based on input from one or more sensors. Such sensors could be e.g. level sensors or gauge sensors configured to measure properties of the roller with the flange. However, the rotational speed of the rotatable cutter unit may alternatively or additionally be controlled based on sensor data from the material removal device itself. For example, the rotational speed of the rotatable cutter unit may be controlled based on sensor data pertaining to the rotational velocity of the rotatable cutter unit and/or the torsional strain in the material removal device.

According to an embodiment, the rotation device comprises a drive unit. The drive unit may be a motor, such as e.g. an electrical motor. Alternatively, the drive unit may be pneumatically or hydraulically driven.

According to an embodiment, the rotation device further comprises a transmission system which includes a gear box. The gear box may be a high-reduction ratio gear box. For example, the gear box may have a reduction ratio of 4, 6, 8, 10 or 12 times. It is however conceivable to use higher reduction ratios such as e.g. 60, 80 or 100 times. This may be advantageous as it allows using a less powerful drive unit.

The rotatable cutter unit may be arranged on different positions in relation to the roller with a flange. Typically, the rotatable cutter unit may be arranged with respect to the roller with a flange at 5 to 1 o'clock as defined when the rotational direction of the roller is clockwise.

According to an embodiment, the rotatable cutter unit is arranged with respect to the roller with a flange at 9 to 12 o'clock as defined when the rotational direction of the roller is clockwise. This may be advantageous for some roller crushers where access and/or fastening of the rotatable cutter unit is typically limited at the lower end.

According to an embodiment, the rotatable cutter unit is arranged with respect to the roller with a flange at 6 to 9 o'clock as defined when the rotational direction of the roller is clockwise. This may be advantageous for some roller crushers where access and/or fastening of the rotatable cutter unit is typically limited at the upper end but may also be advantageous as the removed build-up material in this position easily is directed towards and removed from the roller crusher through an outlet chute together with the crushed material below the roller crusher.

According to one embodiment, a periphery of the rotatable cutter unit, as seen between a pair of adjacent cutter elements of the plurality of cutter elements, has a radial extension being at least 20 mm smaller than a smallest radial distance of the pair of adjacent cutter elements.

With "periphery of the rotatable cutter unit" is herein meant a radial extension of the rotatable cutter unit as defined transverse to the rotational axis.

The provision of a periphery being at least 20 mm smaller than the smallest radial distance of the pair of adjacent cutter elements may be advantageous as it makes it easier for removed build-up material to leave the rotatable cutter unit. If the periphery of the rotatable cutter unit, as seen between the pair of adjacent cutter elements of the plurality of cutter elements, is too close to the smallest radial distance of the pair of adjacent cutter elements, there is a risk that removed build-up material may get jammed between said periphery and the envelope surface of the roller.

The smallest difference between the radial extension of the periphery of the rotatable cutter unit as seen between the pair of adjacent cutter elements, and the smallest radial distance of the pair of adjacent cutter elements may be a function of roll diameter. The reason for this is that the crushing gap typically increases with the roll diameter thereby resulting in more excessive build-up material with a larger thickness accumulated on the flange and/or on the envelope surface at an end portion of the roller adjacent the flange. It is contemplated that the above-defined smallest difference must exceed the thickness of the build-up material. Therefore, the above-defined difference may have to be larger than 20 mm for roller crushers having large crushing rolls. The radial extension may be within the range 20 to 150 mm smaller than a smallest radial distance of the pair of adjacent cutter elements.

According to a second aspect of the disclosure, there is provided a method for operating a roller crusher according to the first aspect, wherein the method comprises at least the step of at least partially cutting away material accumulated on the flange and/or on the envelope surface at an end portion of the roller adjacent the flange by means of the material removal device.

Similarly, and correspondingly to the first aspect of the disclosure above, this second aspect of the disclosure will provide substantial advantages over prior art solutions.

Other objectives, features and advantages of the present disclosure will appear from the following detailed disclosure, from the attached claims, as well as from the drawings. It is noted that the disclosure relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

BRIEF DESCRIPTION OF THE DRAWINGS

The disclosure will be described in more detail with reference to the appended schematic drawings, which show an example of a presently preferred embodiment of the disclosure.

FIG. 19A is a perspective view of a part of the rotatable cutter unit of FIGS. 18A and 18B.

FIG. 19B is a side view of the part of a rotatable cutter unit of FIG. 19A.

FIG. 19C is a top view of the part of a rotatable cutter unit of FIG. 19A.

FIG. 20A is a perspective view of a part of a rotatable cutter unit according to another embodiment of the disclosure.

FIG. 20B is a side view of the part of the rotatable cutter unit of FIG. 20A.

FIG. 20C is a top view of the part of the rotatable cutter unit of FIG. 20A.

FIG. 23A is a perspective view of a part of a rotatable cutter unit according to another embodiment of the disclosure.

FIG. 23B is a side view of the part of the rotatable cutter unit of FIG. 23A.

FIG. 23C is a top view of the part of the rotatable cutter unit of FIG. 23A.

FIG. 24A is a side view of a rotatable cutter unit according to another embodiment of the disclosure.

FIG. 24B is a perspective view of the rotatable cutter unit of FIG. 24A.

FIG. 24C is a perspective view of a cutter element forming a part of the rotatable cutter unit of FIGS. 24A and 24B.

DETAILED DESCRIPTION

Figure 1:
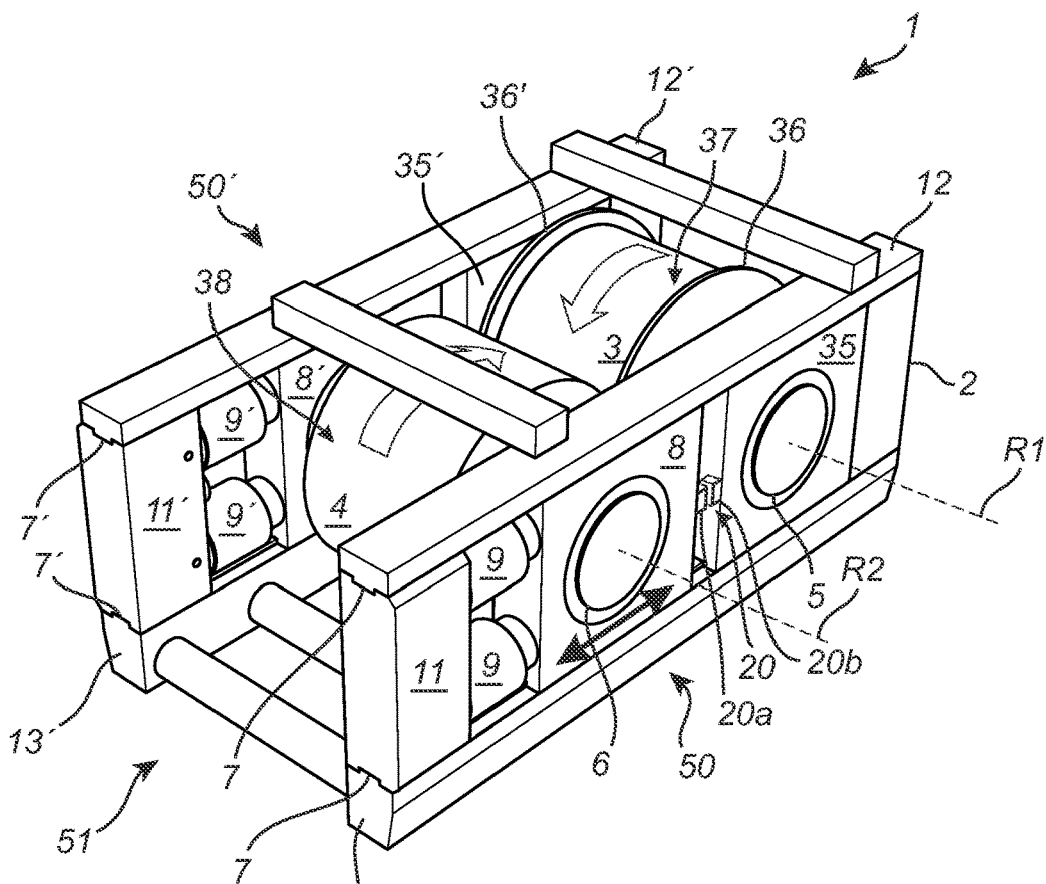
FIG. 1 is a perspective view of a roller crusher according to prior art.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

Figures 2A, 2B:
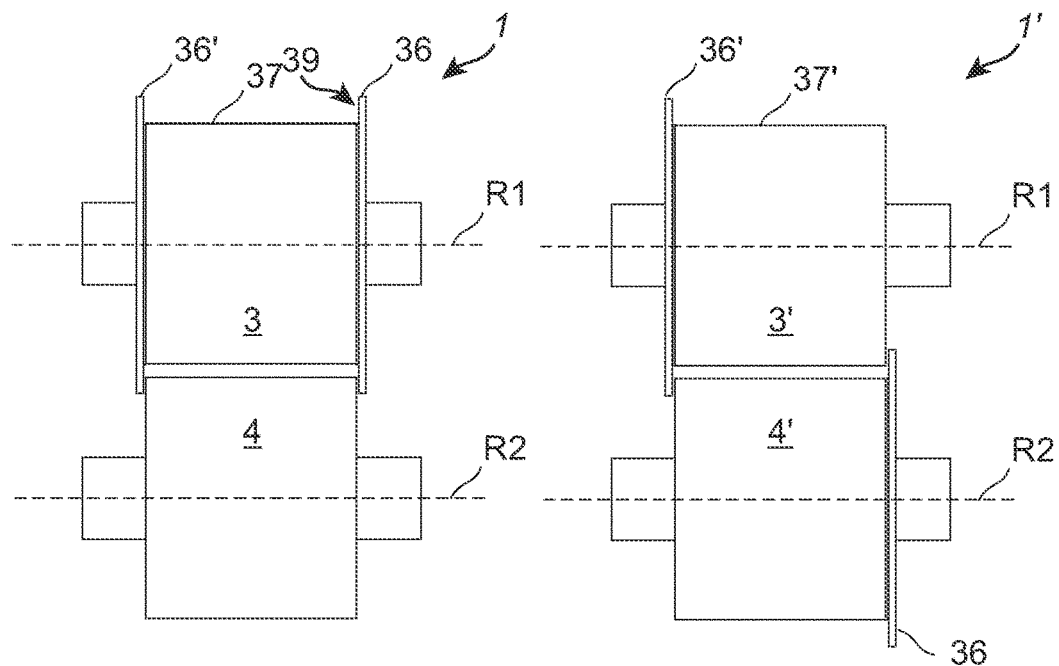
FIG. 2A is a schematic top view of two rollers of the roller crusher of FIG. 1.
FIG. 2B is a schematic top view of two rollers of a roller crusher of the prior art according to an alternative embodiment.

As discussed in the background part of this disclosure, the arrangement of flanges to the ends of the crushing rollers (as shown in FIGS. 1, 2A, and 2B and further discussed below), either one flange in each end of one of the grinding rollers (as shown in FIG. 2A and further discussed below), or one flange on each grinding roller (as shown in FIG. 2B and further discussed below), the crushing effect along the length of the grinding rollers are maintained. However, these flanges and also the edges of opposite crusher roller are under a lot of stress and wear during operation of the grinding roller due to accumulation of grinded material in the transition between the flange and an outer surface, herein also termed "envelope surface", of the roller crusher. Prior art has suggested a scraper element for removing this accumulation of material, but an object of the present disclosure to proceed from there and ensure that flanges and edges of opposing roller crusher are subjected to less stress and wear and at the same time ensure effective removal of accumulation of material as well as economically acceptable time periods of operation of the roller crusher without need to adjust position or replace any scrapers within the roller crusher.

With reference to FIGS. 1, 2A, 2B, 3A, 3B, and 4 this is achieved, in full or at least in part by a roller crusher 1 having two generally parallel rollers 3, 4, 3', 4' arranged to rotate in opposite directions, towards each other, and separated by a gap G, each roller having two ends. The roller crusher 1 further comprises a flange 36, 36' attached to at least one of the ends of one of the rollers 3, 4, 3', 4', which flange 36, 36' extends in a radial direction of the roller 3, 4, 3', 4' and has a height H above an envelope surface 37, 37' of the roller 3, 4, 3', 4'. The roller crusher 1 further comprises a movement blocking arrangement 20, 20a, 20b structured and arranged to limit the gap G between the rollers 3, 4, 3', 4' to a minimum gap M. Even further, the roller crusher 1 further comprises a material removal device 100 having a rotatable cutter 110 positioned at an end of the roller 3, 4, 3', 4' with a flange, wherein the rotatable cutter unit 110 has a plurality of cutter elements 120 arranged tangentially about the rotatable cutter unit 110 at a respective radial distance T from a rotational axis A of the rotatable cutter unit 110. Each of the cutter elements 120 of the plurality of cutter elements 120 presents an impact surface 131 arranged to face the material to be cut away, and each of the impact surfaces comprises a polycrystalline diamond (PCD).

With reference to FIGS. 1, 2A, 2B, 3A, 3B, and 4, this is also achieved, in full or at least in part, by a method for operating a roller crusher 1 having two generally parallel rollers 3. 4, 3', 4' arranged to rotate in opposite directions, towards each other, each roller having two ends, the roller crusher 1 further comprises a flange 36, 36' attached to at least one of the ends of one of the rollers 3, 4, 3', 4', which flange 36, 36' extends in a radial direction of the roller 3, 4, 3', 4' and has a height H above an envelope surface 37, 37' of the roller 3, 4, 3', 4'. The disclosed method comprises at least the step of at least partially cutting away material accumulated on the flange 36, 36' and/or on the envelope surface 37, 37' at an end portion of the roller 3, 4, 3', 4' adjacent the flange 36, 36' by means of the material removal device 100.

The material removal device 100 having the rotatable cutter unit 110 may be advantageous as it allows removing built-up material 41 accumulated on the flange 36, 36' and/or on the envelope surface 37, 37' at an end portion of the roller adjacent the flange 36, 36' in a more efficient way. The rotatable cutter unit 110 could be regarded as a plurality of movable impact surfaces 131a, 131b, each of these impact surfaces 131a, 131b being defined on a respective one of the plurality of cutter elements 120. The material 41 is removed as a result from the impact forces created between the material build-up 41 on the roller 3, 4, 3', 4' and these impact surfaces 131a, 131b during operation. The impact forces will increase with an increase in relative speed between the material build-up 41 (i.e. determined by the tangential speed of the envelope surface 37, 37' of the roller 3, 4, 3', 4' with a flange) and the speed of the impact surface 131a, 131b (i.e. determined by the tangential speed of the cutter elements 120 on the rotatable cutter unit 110). By the provision of a rotatable cutter unit 110, the material removal is not solely relying on the impact forces created by the movement of the roller 3, 4, 3', 4' with respect to the material removal device 100, as is the case when the material removal device is a stationary scraper and thus defines a stationary impact surface. Instead, by rotating the rotatable cutter unit 110, an impact surface 131a, 131b of the rotatable cutter unit 110 may obtain a considerable tangential speed on its own. If rotating the rotatable cutter unit 110 in the same rotational direction as the roller 3, 4, 3', 4' with the flange 36, 36', the impact forces may be considerably increased, allowing a more efficient and reliable material removal. A further advantage of the rotatable cutter unit 110 is that it allows tailoring the impact forces for the specific situation. There may for example be situations where it is less desirable to have a high impact force. For such situations, the rotating speed of the rotatable cutter unit 110 may be reduced to lower the impact forces during material removal without affecting the operation of the crusher itself (i.e. the rotating speed of the roller 3, 3' with the flange 36, 36' can be kept constant). It may even be situations where it is desirable to lower the impact forces beyond what can be achieved with a stationary scraper. For such situations, the rotatable cutter unit 110 may be rotated in a rotational direction opposite to the rotational direction of the roller 3, 3' with the flange 36, 36'. A yet further advantage of the rotatable cutter unit 110 is that the provision of a plurality of cutter elements 120 increases the overall wear resistance of the material removal device 100 as compared to a stationary scraper. The plurality of cutter elements 120 will share the wear, whereby individual cutter elements 120 will have a longer expected lifetime. This allows increasing the time period of operation before material removal device maintenance, hence reducing down-time of the roller crusher 1.

FIG. 1 shows a roller crusher 1 according to the prior art. Such roller crusher 1 comprises a frame 2 in which a first, fixed crusher roller 3 is arranged in bearings 5, 5'. The bearing housings 35, 35' of these bearings 5, 5' are fixedly attached to the frame 2 and are thus immoveable. A second crusher roller 4 is arranged in the frame 2 in bearings 6, 6' which are arranged in the frame 2 in a slidable moveable manner. The bearings 6, 6' can move in the frame 2 in a direction perpendicular to a longitudinal direction of the first and second crusher rollers 3, 4. Typically a guiding structure 7, 7' is arranged in the frame on first and second sides 50, 50' along upper and lower longitudinal frame elements 12, 12', 13, 13' of the roller crusher 1. The bearings 6, 6' are arranged in moveable bearing housings 8, 8' which can slide along the guiding structure 7, 7'. Further, a number of hydraulic cylinders 9, 9' are arranged between the moveable bearing housing 8, 8' and first and second end supports 11, 11' which are arranged near or at a first end 51 of the roller crusher 1. These end supports 11, 11' attach the upper and lower longitudinal frame elements 12, 12', 13, 13' and also act as support for the forces occurring at the hydraulic cylinders 9, 9' as these are adjusting the gap width and reacting to forces occurring at the crusher rollers due to material fed to the roller crusher 1.

Such roller crushers work according to a technique called interparticle crushing. The crushing rollers 3, 4 rotates counter to each other as illustrated schematically in FIG. 1 using the arrows. The gap between the crushing rollers 3, 4 is adjusted by the interaction of feed load and the hydraulic system effecting the position of the second crusher roller 4. As shown in FIG. 1 and also in FIG. 2A which shows the rollers 3, 4 from above, one of the grinding rollers 3 further comprises flanges 36, 36' arranged at opposite ends of the grinding roller 3, wherein each flange 36, 36' has an outer edge that extends a height H (see FIGS. 3A and 5A) radially past the outer surface 37 of the roller body of the grinding roller 3, and positioned axially outward of the roller body of the opposite grinding roller 4.

Another prior art roller crusher is disclosed in e.g. WO2013/156968, in which each of the grinding rollers with bearings is arranged in interconnected arch-shaped frame sections, wherein each interconnected arch shaped frame sections are pivotably connected to a base frame. The disclosed subject matter within this disclosure is equally applicable in such a prior art roller crusher arrangement.

Figure 3A:
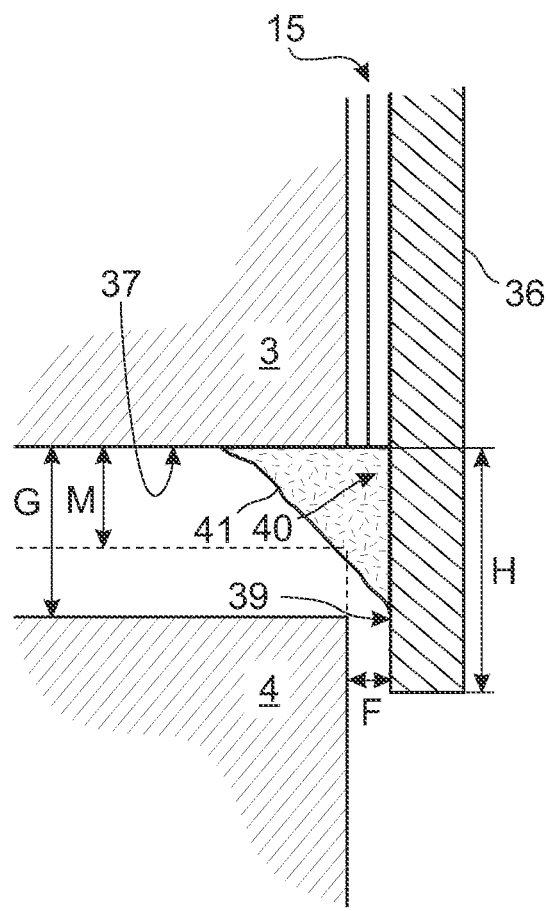
FIG. 3A is a top cross-sectional view of segments of a roller crusher according to the prior art.

As also illustrated in FIG. 3A, each flange 36 is arranged on an end of the roller 3 such that an inner surface 39 of the flange 36 is located at a distance F from the end of the opposing roller 4. The distance F is necessary to avoid contact between the flange 36 and roller 4 which could lead to material damage. At the same time, the distance F should not be too large, as that increases the risk of material leaving the roller crusher through the gap G thus formed. The distance F may be realized by mounting the flange 36 to the roller 3 via shims 15, best illustrated in FIG. 3A. The purpose of the flanges 36, 36' is to prevent material from exiting the gap G at the end thereof, thereby forcing all material that enters the roller crusher to pass through the crushing gap G to be crushed. An alternative embodiment of a roller crusher with flanges is illustrated in FIG. 2B. The only difference between the two embodiments is that the roller crusher in FIG. 2B has flange 36 disposed on the second grind roller 4' instead of the first grind roller 3', which means that each of the grinding rollers 3', 4' has one flange 36, 36' each. As readily appreciated by the person skilled in the art, the technical effect of preventing material to exit the crusher 1, 1' at the ends of the gap G will be equally well achieved for both disclosed embodiments. Importantly, the disclosed inventive concept is equally applicable to both these embodiments.

As initially described, a problem with this type of grinding assemblies is that material tend to build up at the corner 40 (see FIG. 3A) between the outer surface 37 of the grinding roller 3 and the inner surface 39 of the flange 36, 36'. Such material build-up 41 is schematically illustrated in FIG. 3A for the roller crusher 1 of FIGS. 1 and 2A, and is generally unwanted as it generates increased local loads in this area during operation, which may cause wear, damage and/or deformation on the opposite grinding roller 4 which does not have a flange and may also cause strain and/or deformation of the flange 3, 3'. To provide a solution to this problem, means for removing at least a part of this build-up material 41 is provided.

Figure 3B:
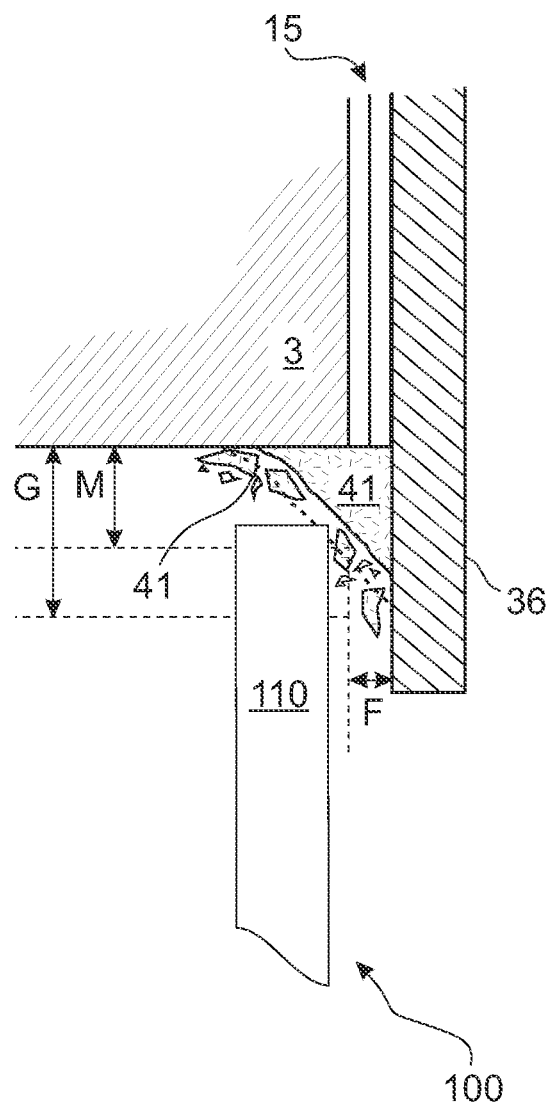
FIG. 3B is a side view of segments of a roller crusher according to an embodiment of the disclosure.

FIG. 3B illustrates schematically the rotatable cutter unit 110 of a material removal device 100 according to an embodiment of the disclosure. The material removal device 100 is illustrated in its entirety in FIG. 4, to which the reader is also referred. The material removal device 100 will be described in detail later. For the purpose of the present description of its material removing function, it will suffice to mention that the material removal device 100 has a rotatable cutter unit 110 which presents a plurality of impact surfaces 131*a*, 131*b*. When the rotatable cutter unit 110 is rotated, the plurality of impact surfaces 131*a*, 131*b* will make impact with build-up material 41 at the roller 3 having a flange 36, which will result in the material removal device 100 being able to cut away material from said build-up 41. The nature of the material build-up 41 and the speed at which the impact surfaces 131*a*, 131*b* and the material build-up 41 meets, tend to make material removal substantially impact-driven. Hence, instead of creating a carved recess in the build-up material 41, large surface portions of the material build-up 41 are more or less instantaneously broken off when encountering the impact surfaces 131*a*, 131*b*. This is schematically illustrated in FIG. 3B. The remaining portion of the material build-up 41 has been found to present a relatively uniform outer surface. It is often not necessary to remove the material build-up 41 completely. Preferably, only parts of the build-up 41 should be removed. The partial removal of the material build-up 41 will reduce overall wear of the rotatable cutter unit 110 as it is exposed to a significantly less degree of wear when positioned further away from the roller surface 37 and the flange 36. The positioning of the rotatable cutter unit 110 in relation to the roller 3 and flange 36 is however not the focus of the disclosure, and the rotatable cutter unit 110 may be positioned in many different ways dependent on the application.

After having described the function of the material removal device in the context of the roller crusher and in particular the roller 3 with a flange 26 as illustrated in FIGS. 3A and B, the material removal device will now be described in detail with reference to FIGS. 4 to 13.

Figure 4:
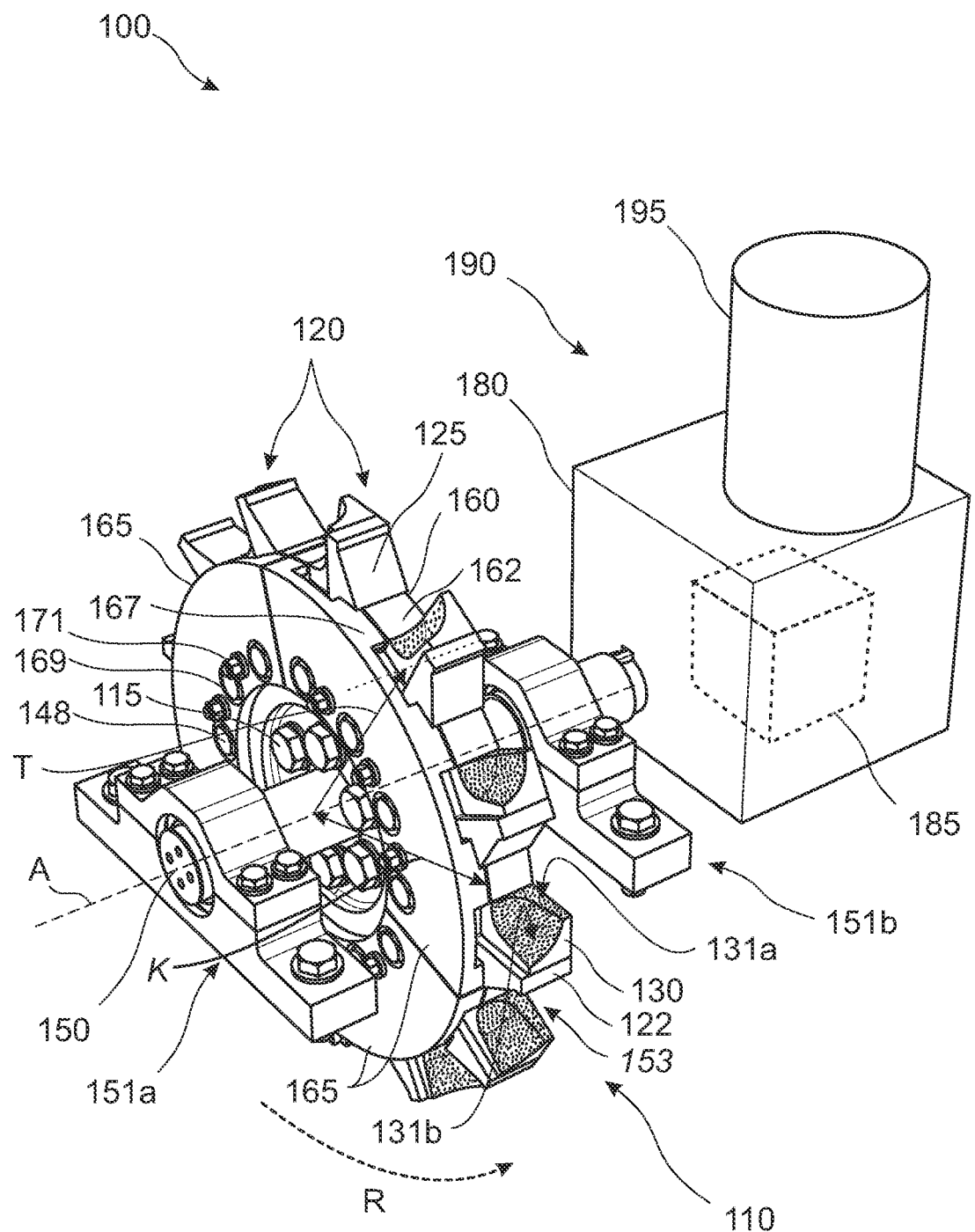
FIG. 4 is a perspective view of a material removal device according to an embodiment of the disclosure.

FIG. 4 illustrates a material removal device 100 according to an example embodiment of the disclosure. In FIG. 4, all parts of the material removal device 100 are shown, which means that some parts will inevitably shield other parts. Therefore, we refer already here to FIG. 6 which illustrates the inner parts of the material removal device 100, FIG. 7 which illustrates the outer parts of the rotatable cutter unit 110 of the material removal device 100, FIG. 8 which illustrate one of the cutter element support structures 140 of the material removal device 100, and FIG. 13 which illustrates the wear shields 160, 165 of the material removal device 100.

The material removal device 100 consists of three main parts: A rotatable cutter unit 110 which is attached to a rotating shaft 150 which is supported by brackets 151*a*, 151*b*, a transmission system 180 connected to the rotating shaft 150, and a rotation device 190, which may comprise a drive unit 195 connected to the transmission system 180. The drive unit 195 may be a motor, such as e.g. an electrical motor. Alternatively, the drive unit 195 may be pneumatically or hydraulically driven. The transmission system 180 may include a gear box 185 (schematically indicated in FIG. 4). The gear box 185 may be a high-reduction ratio gear box 185. For example, the gear box 185 may have a reduction ratio of 4, 6, 8, 10 or 12 times. It is however conceivable to use higher reduction ratios such as e.g. 60, 80 or 100 times. This may be advantageous as it allows using a less powerful drive unit 195.

Figure 5A:
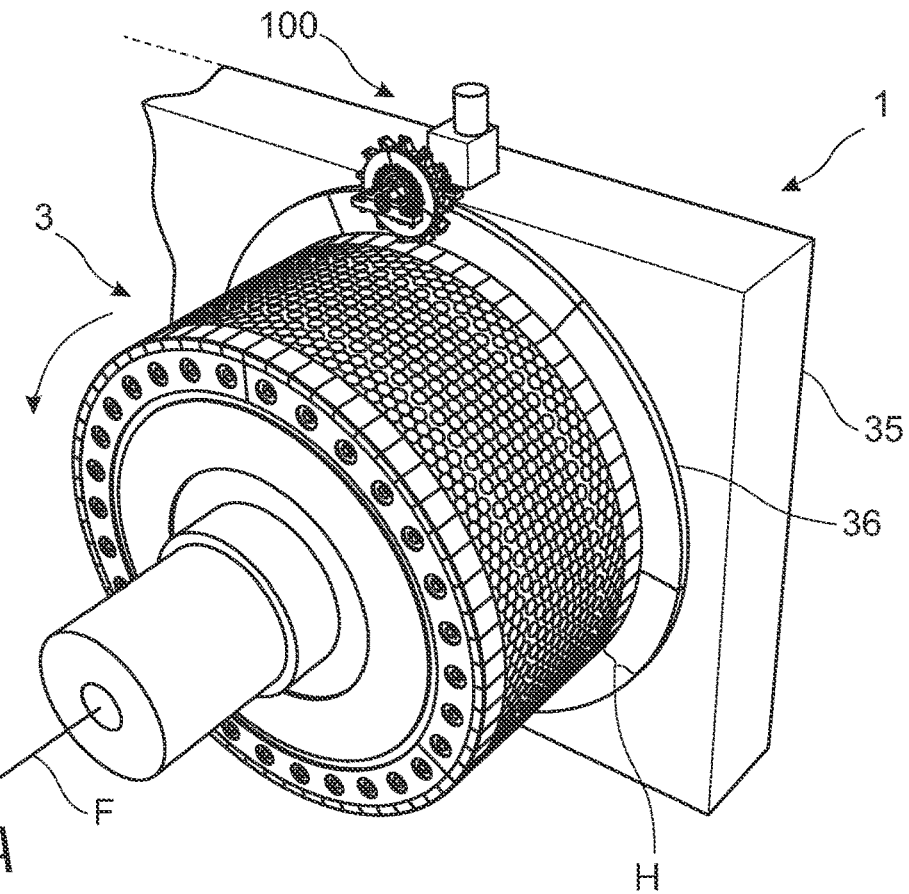
FIG. 5A is a perspective view of a roller crusher having the material removal device of FIG. 4 at the top of the roller with a flange according to an embodiment of the disclosure.
Figure 5B:
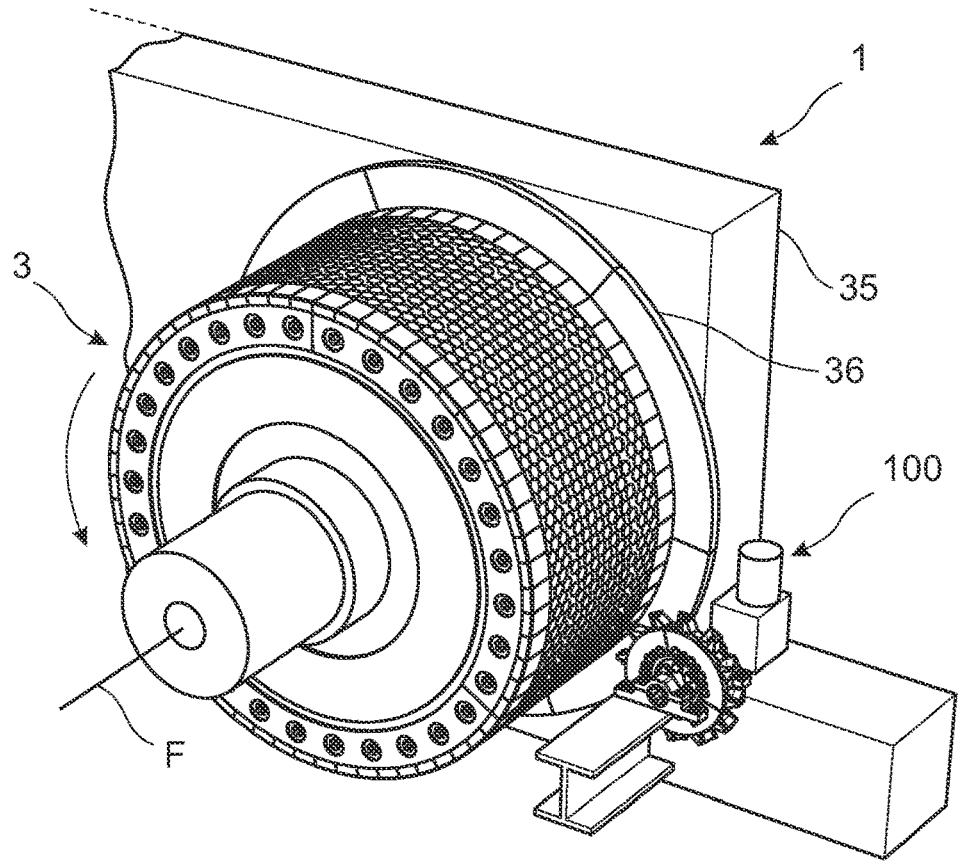
FIG. 5B is a perspective view of a roller crusher having the material removal device of FIG. 4 at the lower end side of the roller with a flange according to another embodiment of the disclosure.

The material removal device 100 is mounted on the roller crusher 1 such that the rotatable cutter unit 110 is located at a preferred region of material removal at the roller 3 with a flange 36. This is schematically illustrated in FIGS. 5A and B, which shows two conceivable locations at which to locate the material removal device 100 with respect to the roller 3 which rotates around rotational axis F. In FIG. 5A, the material removal device 100 is located at the top of the roller crusher, at or around 12 o'clock as defined when the rotational direction of the roller is clockwise. In FIG. 5B, the material removal device 100 is instead located at a bottom side of the roller crusher, at about 8 o'clock as defined when the rotational direction of the roller is clockwise. There are advantages associated with both these positions, and the decision of where to locate the material removal device 100 will likely depend more on specific constrains and requirements of the roller crusher than on the mere efficiency of the cutting. Again a position around 12 o'clock may be advantageous for some roller crushers where access and/or fastening of the rotatable cutter unit is typically limited at the lower end, while a position about 8 o'clock may advantageous for some roller crushers where access and/or fastening of the rotatable cutter unit is typically limited at the upper end but may also be advantageous as the removed build-up material in this position easily is directed towards and removed from the roller crusher through an outlet chute together with the crushed material below the roller crusher.

The rotatable cutter unit 110 will now be described in detail with reference to the above referenced figures. The rotatable cutter unit 110 has a plurality of cutter elements 120 arranged tangentially about the rotatable cutter unit 110 at a respective radial distance T from a rotational axis A thereof (See FIG. 4). Each cutter element 120 presents an impact surface 131*a*. 131*b* arranged to face the material to be cut away. The rotatable cutter unit 110 is arranged to rotate along a rotational direction R about the cutter unit rotational axis A. When rotating in this manner, the impact surface 131*a*, 131*b* will make contact with material build-up 42 at the roller 3 with the flange 26, and cut away at least a part thereof, as detailed earlier with reference to FIGS. 3A and B. The rotatable cutter unit 110 shown in FIG. 7 has twelve cutter elements 120. It is however conceivable to have less, or more, cutter elements, and some example embodiment illustrating this will be discussed later.

As illustrated in FIG. 4, a periphery 153 of the rotatable cutter unit 110, as seen between a pair of adjacent cutter elements 120 of the plurality of cutter elements 120, has a radial extension K being at least 20 mm smaller than a smallest radial distance T of the pair of adjacent cutter elements 120.

The provision of a periphery 153 being at least 20 mm smaller than the smallest radial distance T of the pair of adjacent cutter elements 120 may be advantageous as it makes it easier for removed build-up material 41 to leave the rotatable cutter unit 110. If the periphery 153 of the rotatable cutter unit 110, as seen between the pair of adjacent cutter elements 120 is too close to the smallest radial distance K, there is a risk that removed build-up material 41 may get jammed between said periphery 153 and the envelope surface 37 of the roller 3.

The smallest difference (T−K) between the radial extension K of the periphery 153 of the rotatable cutter unit 110 as seen between the pair of adjacent cutter elements 120, and the smallest radial distance T of the pair of adjacent cutter elements 120 may be a function of roll diameter. The reason for this is that the crushing gap G typically increases with the roll diameter thereby resulting in more excessive build-up material with a larger thickness accumulated on the flange 36 and/or on the envelope surface 37 at an end portion of the roller 3 adjacent the flange 36. It is contemplated that the above-defined smallest difference must exceed the thickness of the build-up material 41. Therefore, the above-defined difference may have to be larger than 20 mm for roller crushers 1 having large crushing rolls. The radial extension may be within the range 20 to 150 mm smaller than a smallest radial distance of the pair of adjacent cutter elements 120.

As readily appreciated by the person skilled in the art, the above-described feature may have less relevance for some example embodiments than for others. Specifically, for a rotatable cutter unit having few cutter elements, the above feature may be less relevant than for a rotatable cutter unit having a larger number of cutter elements.

Figure 7:
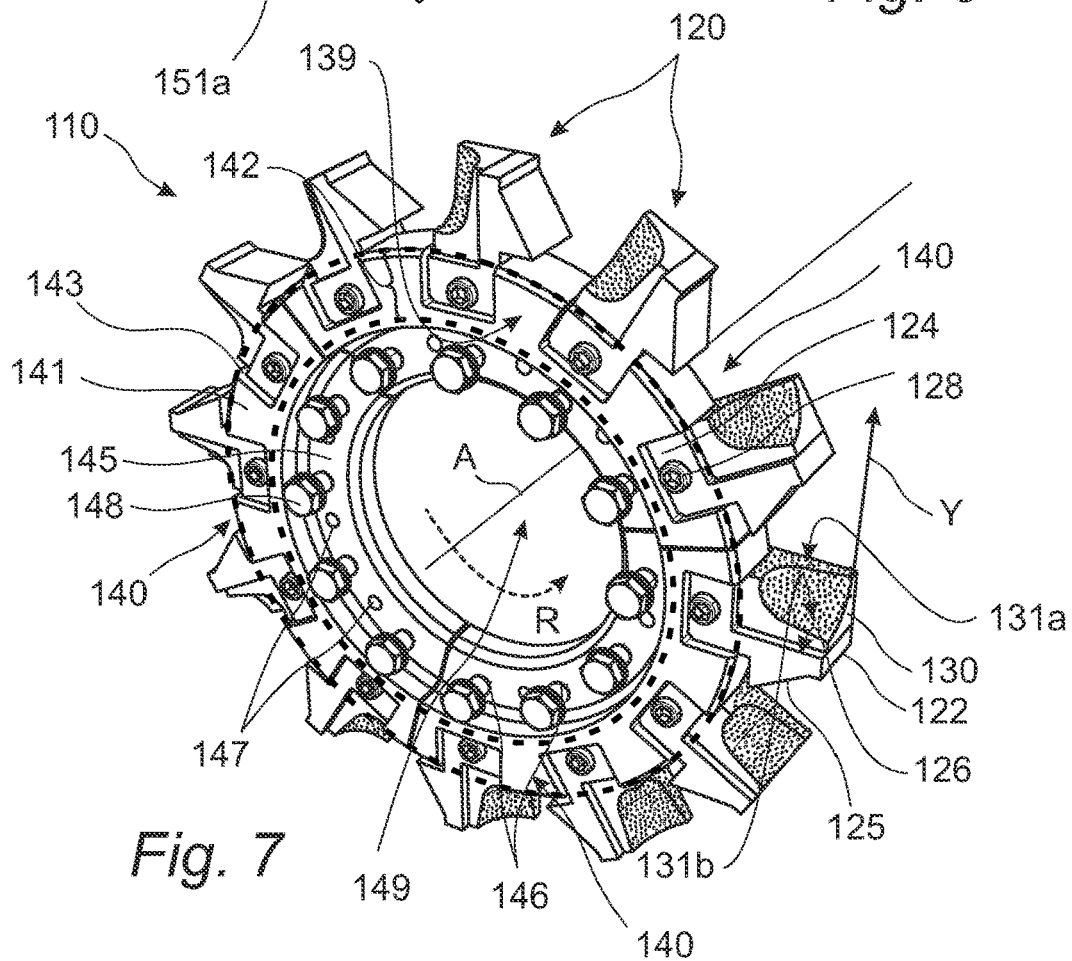
FIG. 7 is a perspective view of parts of the material removal device of FIGS. 4 and 6.
Figure 12:
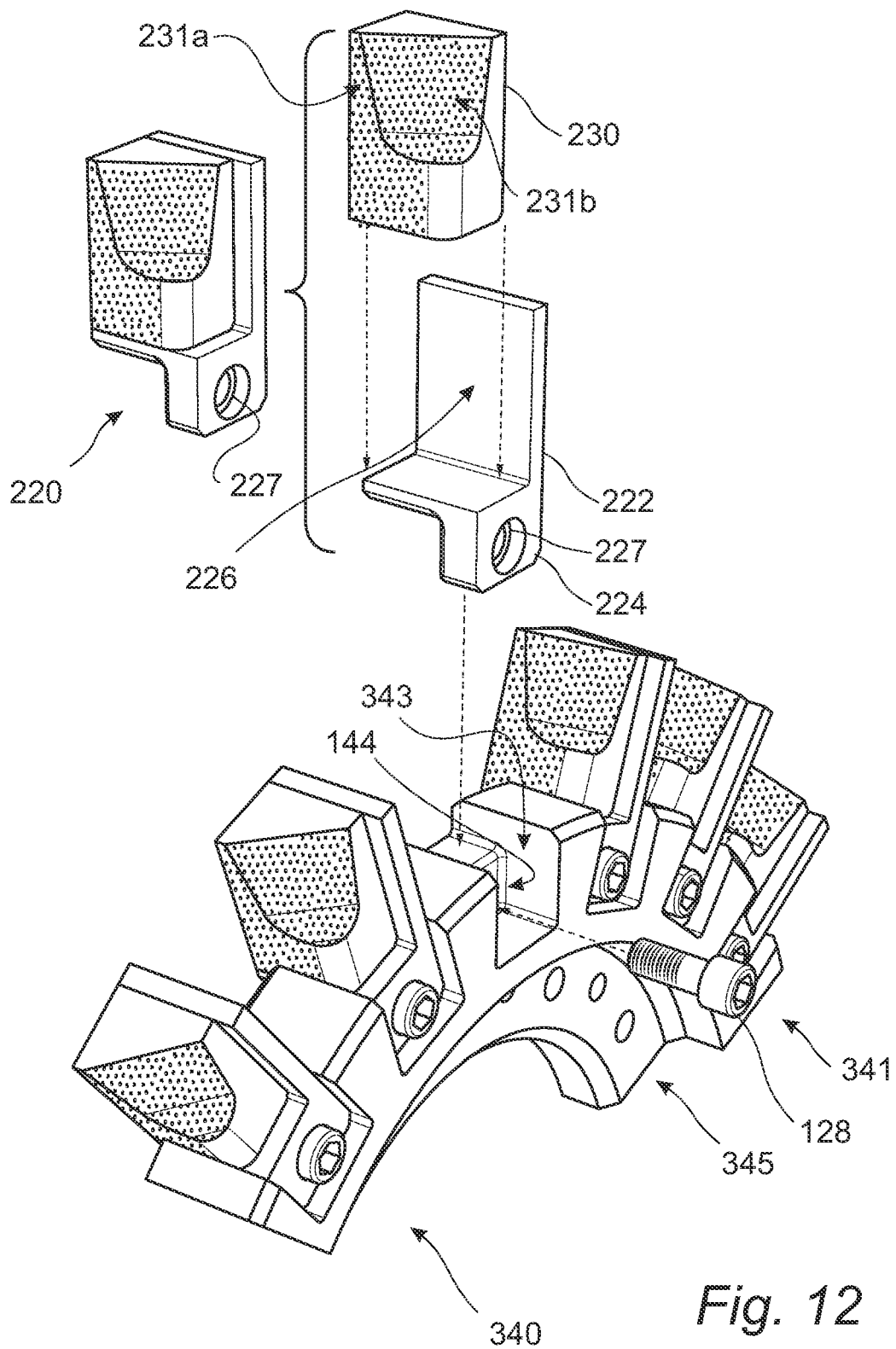
FIG. 12 is a perspective view of the cutter element support structure and associated cutter elements of FIG. 10.

The cutter elements 120 may be releasably arranged on the rotatable cutter unit 110. As best illustrated in FIG. 7, they are releasably attached to a specific portion of the rotatable cutter unit 110, herein termed the "annular engagement portion 142". The annular engagement portion 142 defines the outermost part of the structure that supports the cutter elements 120. For the example embodiment, the annular engagement portion 142 is defined by the outermost parts of three separate elements, herein termed cutter element support structures 140. This will be described in more detail later. However, for the purpose of the releasable arrangement of the cutter elements 120, it is merely required to provide an annular engagement portion as such. For alternative embodiments, this could be equally well represented by the outermost portion of a circular wheel, or disk. Turning again to the rotatable cutter unit 110, the releasable arrangement of the cutter elements 120 in the annular engagement portion 142 is realised by securing each cutter element 120 to the annular engagement portion 142 by fastening bolts 128. There are however further features of importance related to the engagement as such. As best illustrated in FIG. 12 (for another example embodiment but illustrates the same aspect), the annular engagement portion 142 comprises recesses 143, 343 which have a shape which is complementary to the shape of the cutter elements 120, 220 inserted therein. Specifically, the cutter elements 120, 220 comprises protruding structures 124, 224 which are configured to be inserted into the recesses 143, 343 of the annular engagement portion 142, 242, 342. As readily appreciated by the person skilled in the art, this arrangement will provide a geometrical locking engagement. If securing the cutter elements 120 to the annular engagement portion 142 in this manner, the fastening bolts 128 will not have to take the entire load during operation of the material removal device 100. Most of the load will instead be taken by the geometrical locking engagement itself. For the example embodiments illustrated herein, the associated recess of the annular engagement portion 142 is defined on a side surface 139 thereof. It is however conceivable to provide the geometrical locking engagement in other ways, such as e.g. by providing a plurality of bores directed radially inwardly on the periphery of the annular engagement portion and allow the cutter elements protruding into these bores.

Also illustrated clearly in FIG. 12 is that the cutter elements 220 comprises two separate structures, a cutter element holding structure 222 and an active cutter element 230. Although some features may differ between example embodiments provided herein, all example embodiments of the cutter element holding structure 122, 222 have a similar geometrical locking engagement. They also have a similar shape at the other end. Specifically, each cutter element holding structure 122, 222 has a support surface 126, 226 to which the active cutter element 130, 230 is attached. Additionally, the active cutter element 130, 230 presents the impact surface 131a, 131b, 231a, 231b. For the rotatable cutter unit 110 illustrated in FIG. 7, the support surface 126 is illustrated to the right in the figure however mostly covered by the active cutter element 130. The cutter elements 120 further comprises a support portion 125 which protruding out from the cutter element holding structure 122 in a direction counter to a tangential direction of motion Y of the cutter element 120. This is also illustrated in FIG. 7. The support portion 125 is arranged such that it is supported by the annular engagement portion 142. This may be less apparent when viewing FIG. 7 in isolation, as a gap between the annular engagement portion 142 and the support portion 125 is clearly visible in the drawing. However, as will be detailed later, some elements (specifically: the wear shields 160, 165) have been omitted in FIG. 7 for clarity. The reader is referred to FIG. 4, where all elements are shown. In FIG. 4 it is clear that each support portion 125 is in abutment with a surface of the inner structure. Thus, for the example embodiment, the support portion 125 is supported by the annular engagement portion 142 via the wear shields 160, 165 which are inserted in between the former. The wear shields 160, 165 may be made of hardened steel, hardened iron, hardened metals, carbides, braced with tungsten carbides, or high wear-materials such as weld overlay.

Figure 8:
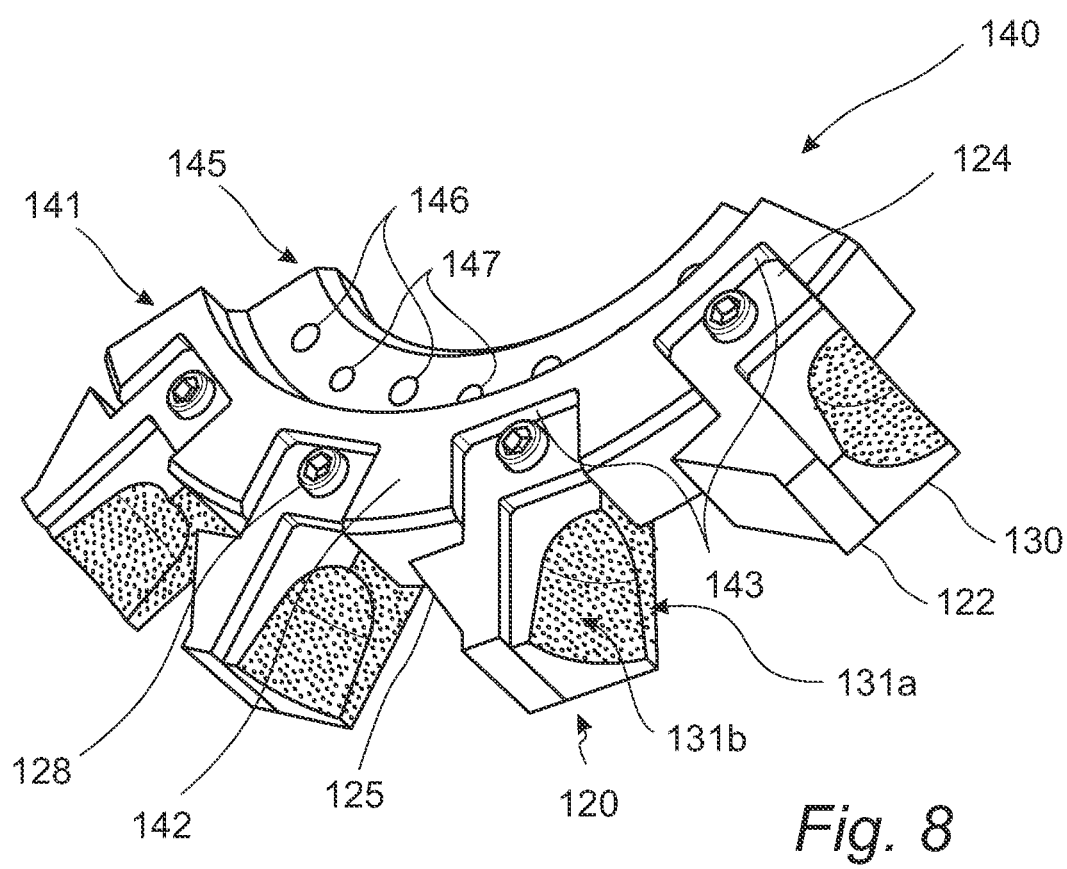
FIG. 8 is a perspective view of a cutter element support structure and associated cutter elements of the material removal device of FIGS. 4, 6 and 7.
Figure 9:
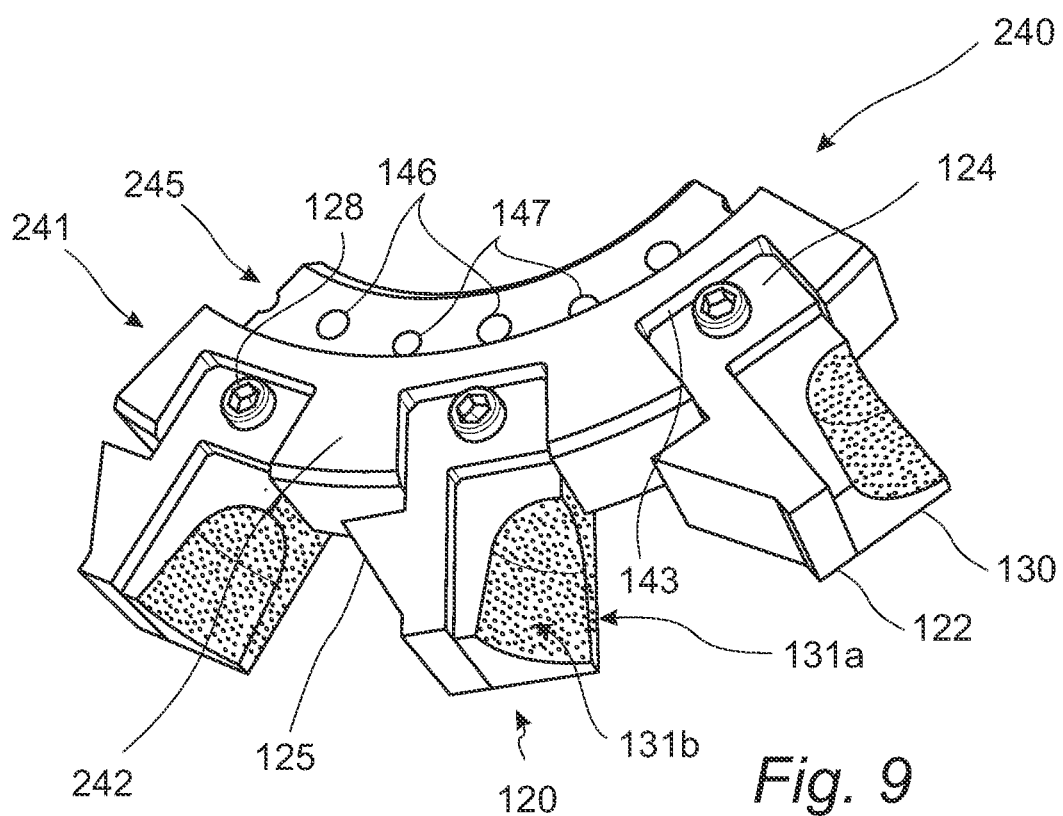
FIG. 9 is a perspective view of a cutter element support structure and associated cutter elements according to another example embodiment of the disclosure.
Figure 10:
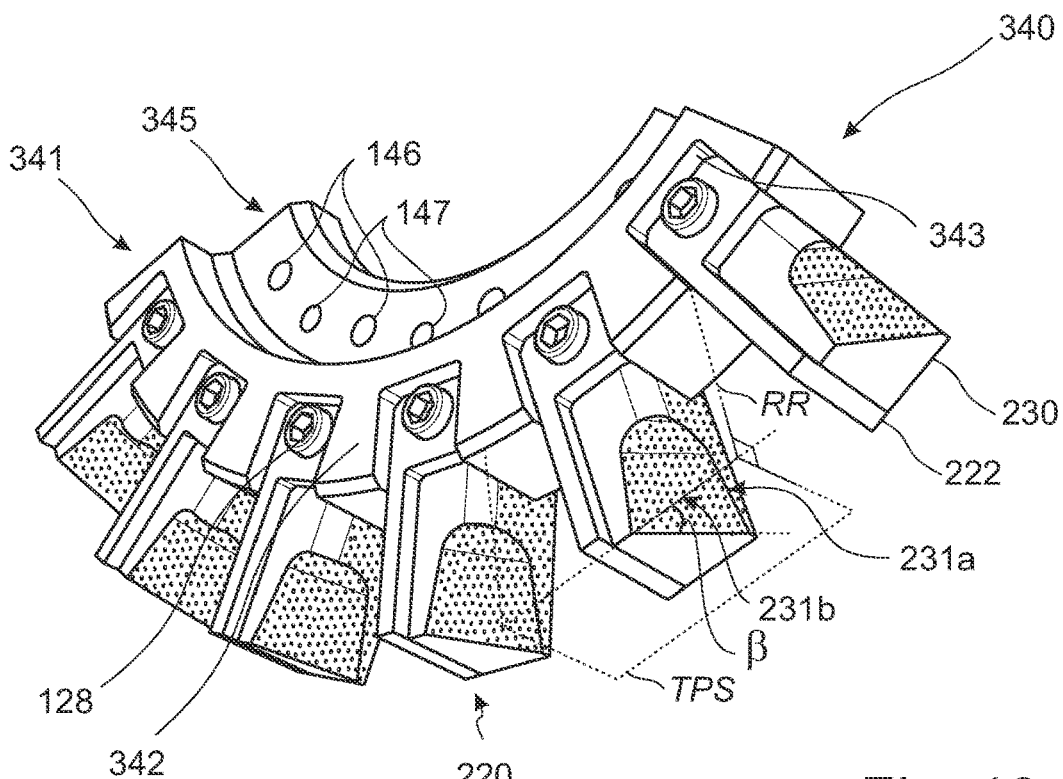
FIG. 10 is a perspective view of a cutter element support structure and associated cutter elements according to yet another example embodiment of the disclosure.

Turning now to FIGS. 8 to 11, various example embodiments of the active cutter element will be discussed. FIG. 8 illustrates a part of the rotatable cutter unit 110, i.e. the first example embodiment of the rotatable cutter unit discussed herein. The cutter elements 120 of this example embodiment comprises active cutter elements 130 which have a particular shape. Specifically, the active cutter element 130 has an impact surface 131a, 131b consisting of two separate parts, namely a front portion 131a and a rear portion 131b. The front portion 131a and the rear portion 131b interconnect with each other. As best illustrated in FIG. 4, the front portion 131a is arranged upstream of the rear portion 131b as seen in relation to a tangential direction of motion Y of the cutter element 120. As best illustrated in FIGS. 5A and B, the front portion 131a is arranged closer to the flange 36 than the rear portion 131b. The reason for this particular design is to provide a more efficient cutting. During operation, the front portion 131a will make impact with the material to be removed first. The somewhat smaller surface area of the front portion 131a allows creating higher local impact forced in the build-up material, hence increasing the probability that large portions are cut away from the roll 3 and or flange 36. Once having been cut away, the rear portion 121b will meet the loosened material and convey the same inwardly away from the flange. This may decrease the risk of the same material getting stuck again and/or being left in the area affecting further cutting operation at the flange 36. To further enhance this propeller, or turbine, effect, the rear portion 121b may be curved inwardly so as to form a bowl-shape, or concave shape. A second example embodiment of the active cutter element is illustrated in FIG. 10, namely active cutter element 230. Active cutter element 230 differ from active cutter element 130 only in that the rear portion 231b of the impact surface is substantially planar and forms an oblique angle with respect to the tangential direction of motion Y of the cutter element 220. As readily appreciated by the person skilled in the art, this design will also provide a propeller, or turbine, effect. The oblique angle is defined in FIG. 10 as the angle γ and is defined between the rear portion 231b of the impact surface and a reference plane RR within which the rotatable cutter unit extends. The angle γ is defined within a tangential plane TPS of the cutter unit 220 which is orthogonal to the reference plane RR. For the example embodiment in FIG. 10, the angle γ is 45°. However, other angles are conceivable. The angle γ will be further discussed later in relation to other example embodiments of the disclosure.

Figure 11:
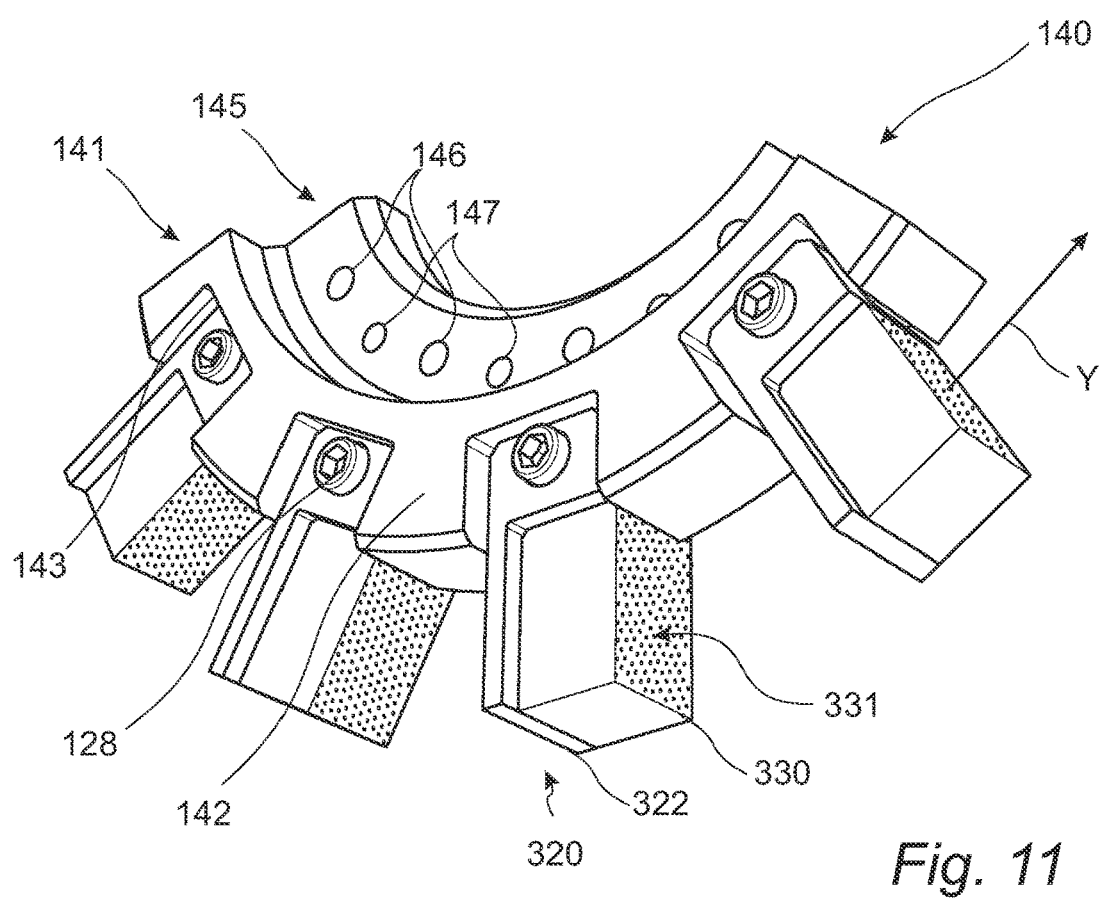
FIG. 11 is a perspective view of a cutter element support structure and associated cutter elements according to yet another example embodiment of the disclosure.

The third and last example embodiment of the active cutter element is illustrated in FIG. 11, namely the active cutter element 330. The active cutter element 330 differ from the active cutter element 130 and 230 in that it only presents a single impact surface 331. Additionally, the impact surface 331 is substantially planar and arranged transverse to a tangential direction of motion Y of the cutter element 320. The cutter element holding structures 322 are similar to the cutter element holding structures 122 but lacks the support portion 125. The active cutter elements 130, 230, 330 of the disclosure may be made from a specific material suitable for withstanding high impact. Such materials are typically wear-resistant materials, such as e.g. carbides. In particular, each of the active cutter elements of the disclosure comprises polycrystalline diamond (PCD) on its impact surface 131, 231, 331, 431. 504, 604, 804, 1004, 1104. This will be described in detail later herein with reference to FIGS. 18-19.

Figure 17A:
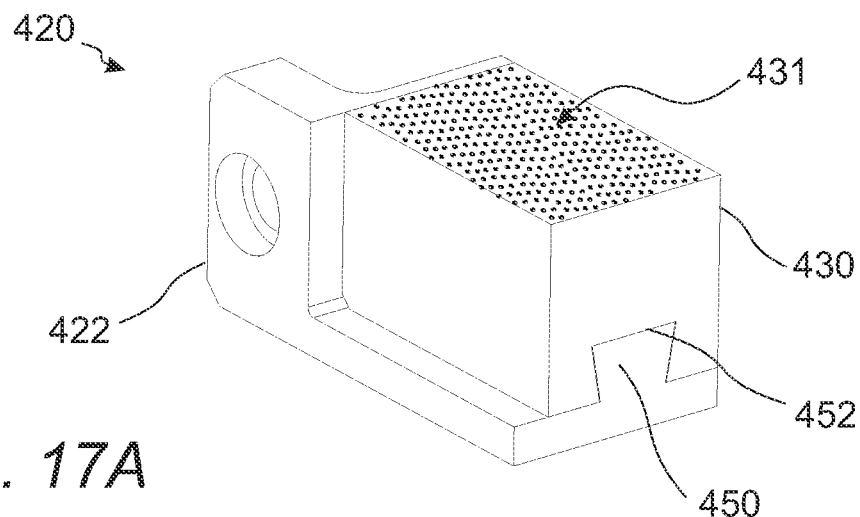
FIG. 17A is a perspective view of a cutter element according to an example embodiment.
Figure 17B:
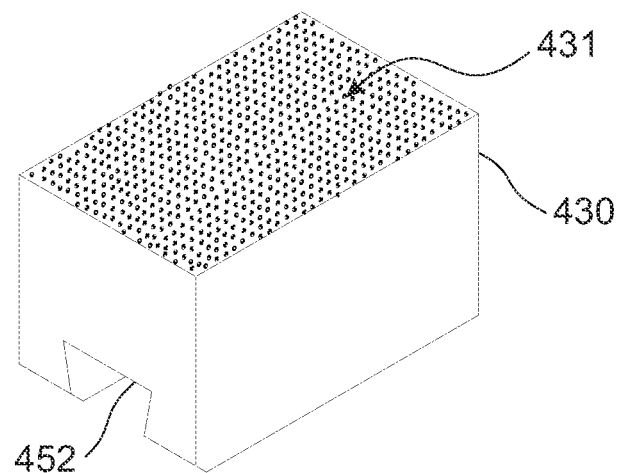
FIG. 17B is an exploded perspective view of the cutter element of FIG. 17A.
Figure 17B:
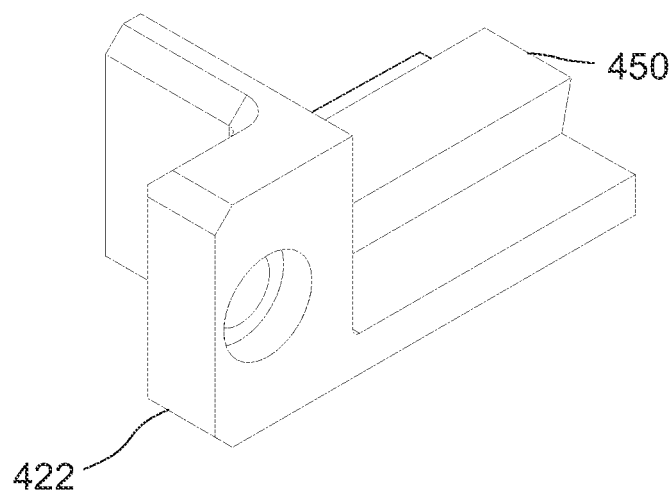

The active cutter elements 130, 230, 330 may be attached to the cutter element holding structures 122, 222, 322 by gluing or brazing. For providing further strength, a locking engagement may be used. FIGS. 17A and B illustrate yet another example embodiment of the cutter element, namely cutter element 420 which has one such conceivable locking engagement. Cutter element 420 is similar to cutter element 320 and has the similar structural properties in so far as relevant for the cutting operation. However, cutter element 420 differs from cutter element 320 in that cutter element 420 comprises a cutter element holding structure 422 which has a protrusion 450, and an active cutter element 430 which has a recess 452. As can be seen in FIGS. 17A and B, the protrusion 450 and the recess 452 have complementary shapes. Moreover, these shapes are chosen to provide a locking engagement between the active cutter element 430 and the cutter element holding structure 422. As readily appreciated by the person skilled in the art, there are many alternative shapes than the one illustrated in FIGS. 17A and B that could provide a locking engagement. To further strengthen the attachment between the active cutter element 430 and the cutter element holding structure 422, the active cutter element 430 and the cutter element holding structure 422 may be glued together once the protrusion 450 of the cutter element holding structure 422 has been inserted into the recess 452 of the active cutter element 430.

Figure 6:
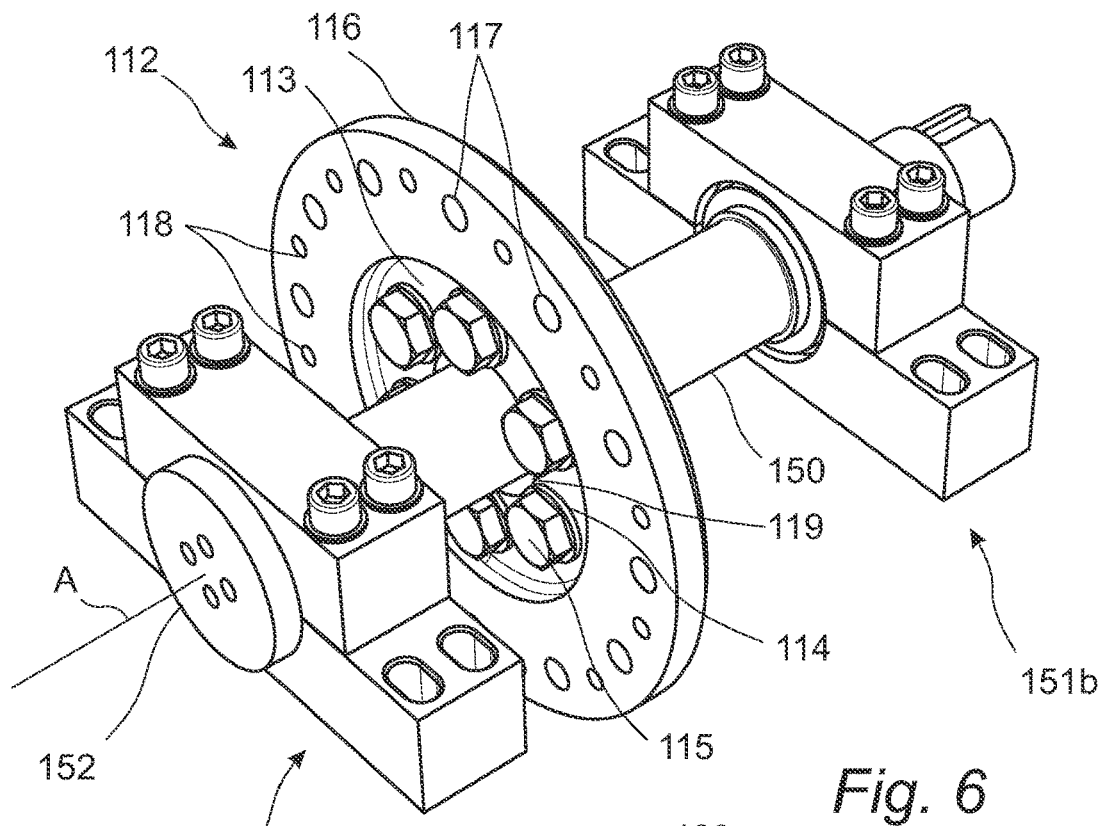
FIG. 6 is a perspective view of parts of the material removal device of FIG. 4.

As previously mentioned, the rotatable cutter unit 110 is an assembly consisting of a plurality of interconnected elements. Focus have so far been on the cutter elements 120, 220, 320. Now, the inner parts of the rotatable cutter unit 110 will be described in detail with reference to FIGS. 6, 7 and 8. FIG. 6 illustrates the rotating shaft 150 supported in its brackets 151*a*, 151*b*. Also illustrated in FIG. 6 is the shaft cap 152 which is mounted onto the rotating shaft 150 to keep it in its intended axial position within the brackets 151*a*, 151*b*. FIG. 6 further illustrates the very inner parts of the rotatable cutter unit 110, herein referred to as the main support structure 112. The main support structure 112 is this example embodiment a steel element which comprises an inner portion 113 configured to be secured to the shaft by fastening bolts 115. Although not illustrated in FIG. 6, the rotating shaft 150 includes a fastening portion (now shown) which protrudes radially outwardly from the surface of the shaft 150. This fastening portion may be welded into the shaft 150 during manufacture thereof. The main support structure 112 has a central opening 119 which has a diameter being large enough to allow the rotating shaft 150 being inserted therein during assembly. Once in position, the main support structure 112 is secured to the fastening portion of the rotating shaft 150 by fastening bolts 115 inserted through through-holes 114. As readily appreciated by the person skilled in the art, the main support structure 112 cannot easily be removed when on a roller crusher. Instead, the main support structure 112 is designed to endure operation over a long time period. The releasable arrangement of the main support structure 112 to the rotating shaft 150 will however allow separate replacement of the main support structure 112 if needed. The outer portion 116 of the main support structure 112 comprises a plurality of threaded holes 117 and a plurality of through-holes 118. These are used for securing the outer elements to the main support structure 112 and will be discussed in more detail later.

For all example embodiments discussed herein, the cutter elements 120 are attached to the main support structure 112 via a series of dedicated support structures, termed herein as "cutter element support structures" 140. These structures are thus mounted onto the main support structure 112 at an inner end thereof and presents the annular engagement portion 142 at an outer end thereof, at which annular engagement portion 142 the cutter elements 120 are to be releasably arranged. FIG. 7 illustrates the outer parts of the rotatable cutter unit 110 and includes these aforementioned structures, for this particular example embodiment: three cutter element support structures 140. For clarity, one of the cutter element support structures 140 is also illustrated in FIG. 8. As clearly illustrated in FIG. 7, the rotatable cutter unit 110 comprises at least two cutter element support structures 140 (for this example embodiment: three cutter element support structures 140). The at least two cutter element support structures 140 are releasably arranged with respect to the main support structure 112 and shaped as circular ring sectors which together form a circular ring. The circular ring presents the annular engagement portion 142. The purpose of providing two or more cutter element support structures 140 is that it allows them to be individually replaced in site without having to completely dismantle the material removal device 100. As will be seen later, there are many conceivable ways to provide cutter element support structures 140 of the disclosure. They may occur in different numbers, have different shapes, and support various numbers of cutter elements 120. The cutter element support structure 140 has a 120-degree circular ring sector design, and therefore three cutter element support structures 140 are needed to completely encircle the main support structure 112 to form the annular engagement portion 142.

The cutter element support structure 140 comprises an inner portion 145 which has a plurality of first through holes 146 and a plurality of second through holes 147. The purpose of the first through holes 146 is to provide a means for securing the cutter element support structure 140 to the main support structure 112 by means of fastening bolts 148. This is best illustrated in FIG. 7. The purpose of the second through holes 147 will be revealed later. The cutter element support structure 140 further comprises an outer portion 141 which comprises one or more recesses 143 (for the example embodiment: four recesses 143). Within each recess is a threaded hole 144 (see FIG. 12) for receiving fastening bolts 128. The recesses 143 have already been described in detail when describing the cutter elements 120 and how these are attached and will not be further elaborated upon here. As illustrated in FIG. 7, the outer portions 141 of the three cutter element support structures 140 together define the annular engagement portion 142 for the present example embodiment. The annular engagement portion 142 is therefore in this case defined by three mutually adjacent elements of the assembly together. Similarly, the person skilled in the art will appreciate that embodiments having less, or more cutter element support structures, such as e.g. 2, 4, or 6 cutter element support structures) will have its associated annular engagement portion defined by a different number of cutter element support structures. When assembled on the main support structure 112, the cutter element support structures 140 together define a central opening 149. The central opening 149 allows for the rotating shaft 150 to pass through the assembly defined by the cutter element support structures 140. As can be seen in FIGS. 7 and 8, the thickness of the outer portion 141 is larger than the thickness of the inner portion 145 as seen along the cutter unit rotational axis A. This design allows creating a recess for housing the main support structure 112 when mounted thereon. This is best illustrated in FIG. 7, where the main support structure 112 has been removed for clarity, but the bolt heads of fastening bolts 148 still marks the position of the outermost surface of the main support structure 112 when assembled together.

Turning now to FIGS. 9 and 10, some alternative example embodiments of the cutter element support structure will be described. Firstly, in FIG. 9, the cutter element support structure 240 is illustrated together with three cutter elements 120 of the same kind as the ones illustrated in FIG. 8 for the first example embodiment. The cutter element support structure 240 differs from the cutter element support structure 140 in that it only has three recesses 143 for the releasable arrangement of the cutter elements 120 and in that the cutter element support structure 240 has a 90-degree circular ring sector design, and therefore requires four cutter element support structures 240 to completely encircle the main support structure 112 to form the annular engagement portion 242. As readily appreciated by the person skilled in the art, the cutter element support structure 140 and the cutter element support structure 240 can be used to assemble a rotatable cutter unit with essentially the same characteristics. Three cutter element support structures 140 each having four recesses 143 will provide a rotatable cutter unit 110 having twelve cutter elements 120. Similarly, four cutter element support structure 240 each having three recesses 143 will also provide a rotatable cutter unit 110 having twelve cutter elements 120. In other words, the annular engagement portion 142 and the annular engagement portion 242 will have a similar interface for the cutter elements 120.

FIG. 10 illustrate a yet another example embodiment of the cutter element support structure, namely cutter element support structure 340. The cutter element support structure 340 differs from cutter element support structure 140 in that it has six recesses 343 instead of four. Having the same outer dimensions as the cutter element support structure 140, and hence requiring the similar set of three cutter element support structures 340 to completely encircle the main support structure 112 to form the annular engagement portion 142, the cutter element support structures 340 therefore allows providing a rotatable cutter unit having 18 cutter elements 220 for defining the annular engagement portion 342. To accommodate the larger number of cutter elements 120, 220, the recesses 343 are not as wide as the recesses 143. This means that the cutter elements 220 with their cutter element holding structures 222 will also be less wide so as to fit into the recesses 343 to provide the geometrical locking engagement. FIG. 11 illustrates the cutter element support structure 140 of FIG. 8 but here equipped with previously described cutter elements 320.

Figure 13:
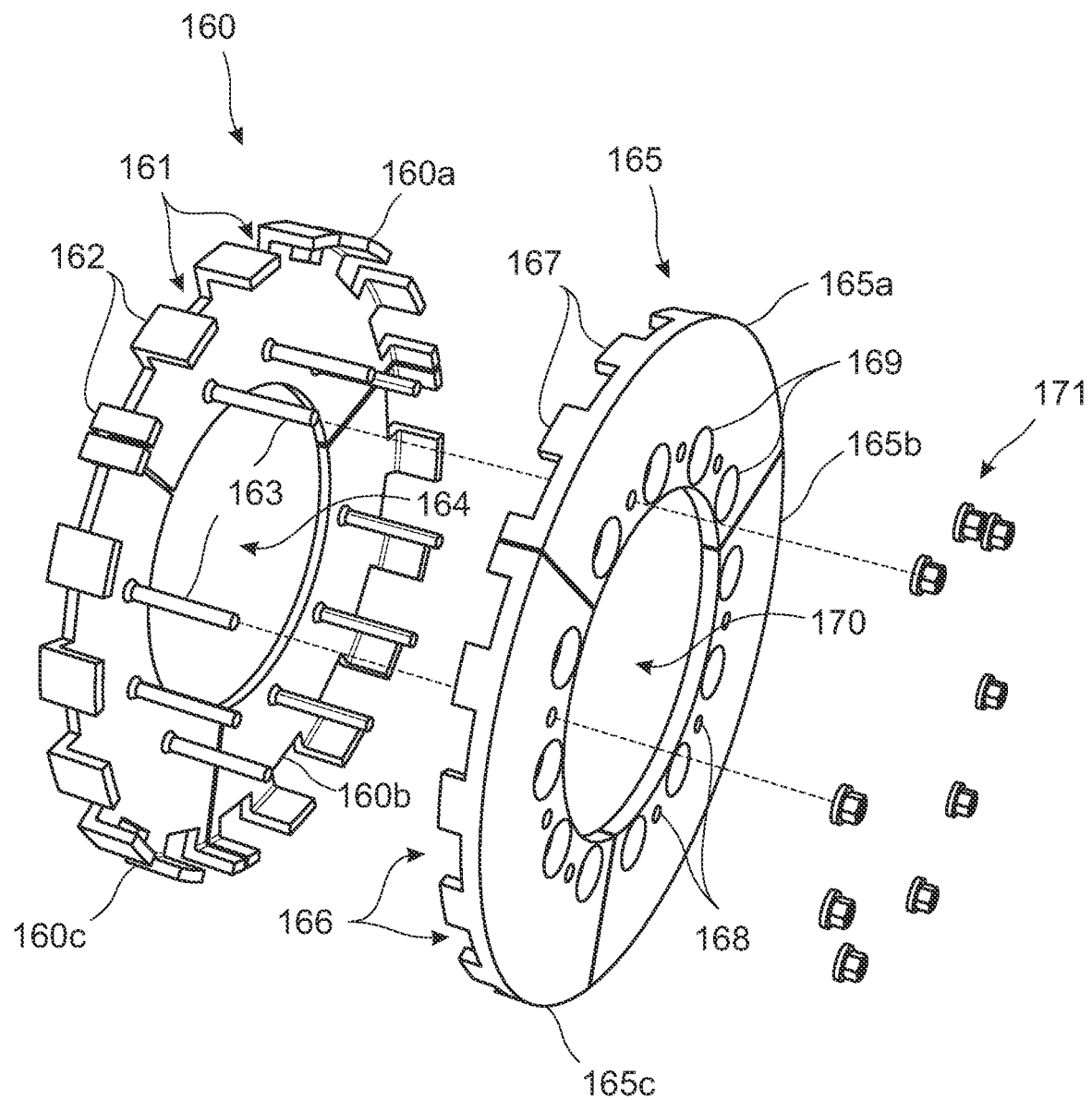
FIG. 13 is a perspective view of wear shields according to an example embodiment of the disclosure.

As to protect the rotatable cutter unit 110, previously mentioned wear shields 160, 165 are provided. The wear shields 160*a-c*, 165*a-c* are most clearly seen in FIG. 13 where they are shown in isolation. However, FIG. 4 illustrates the rotatable cutter unit 110 equipped with the wear shields 160*a-c*, 165*a-c* and it is recommended that these figures are viewed together. The wear shields 160*a-c*, 165*a-c* comprises a first set of wear shields 160*a-c* and a second set of wear shields 165*a-c*. Each of these sets includes two or more wear shields 160*a-c*, 165*a-c*. As for the cutter element support structures, the wear shields 160*a-c*, 165*a-c* are shaped as circular ring sectors which together form circular rings, one on each side of the rotatable cutter unit 110. The wear shields of the first set of wear shields 160*a-c* have openings 161 mutually distributed along a periphery thereof. These openings are structures to allow the cutter elements 120 to protrude out through the wear shields 160*a-c*, 165*a-c*, as best illustrated in FIG. 4. Between each of these openings 161 edge walls 162 are provided. These edge walls 162 may protrude both radially and axially as best illustrated in FIG. 13. The wear shields of the first set of wear shields 160*a-c* may further have threaded rods 163 protruding out from an inside facing surface. When assembled together, the first set of wear shields 160*a-c* together define a central opening 164 for allowing the rotating shaft 150 to pass through the first set of wear shields 160*a-c*. Similarly, the second set of wear shields 165*a-c* has openings 166 mutually distributed along a periphery thereof. Between each of these openings 166 edge walls 167 are provided. In contrast to the edge walls 162, these edge walls 167 only protrude axially. The wear shields 160*a-c*, 165*a-c* are designed such that, ones assembled on the rotatable cutter unit 110, the edge walls 162 will meet the edge walls 167 to form a continuous shield for protecting inner parts of the rotatable cutter unit 110 at the periphery thereof. The second set of wear shields 165*a-c* further have through-holes 168 which are aligned geometrically to allow receiving a respective one of the threaded rods 163 of the first set of wear shields 160*a-c*. Finally, the second set of wear shields 165*a-c* have access openings 169 which are aligned such that they allow accessing the fastening bolts 148, as best illustrated in FIG. 4. The wear shields 160*a-c*, 165*a-c* are designed such that they are mountable onto the rotatable cutter unit 110 after the cutter elements 120 has been mounted thereon. This is achieved by sequentially inserting the threaded rods 163 of a wear shield of the first set of wear shields 160*a-c* into through-holes 118 of the main support structure 112 and second-through holes 147 of the cutter element support structures 140. Each of the through-holes 118 and a corresponding one of the second through holes 147 are positioned such that they coaxially align with each other, and with an associated one of the threaded rods 163 of the first set of wear shields 160*a-c*.

Once every wear shield of the first set of wear shields 160*a-c* has been inserted into place, the second set of wear shields 165*a-c* are assembled from the other side of the main support structure 112 by allowing each of the threaded rods 163 to penetrate through an associated through-hole 168. Finally, fastening nuts 171 are used to secure the first set of wear shields 160*a-c* to the second set of wear shields 165*a-c*.

Figure 14:
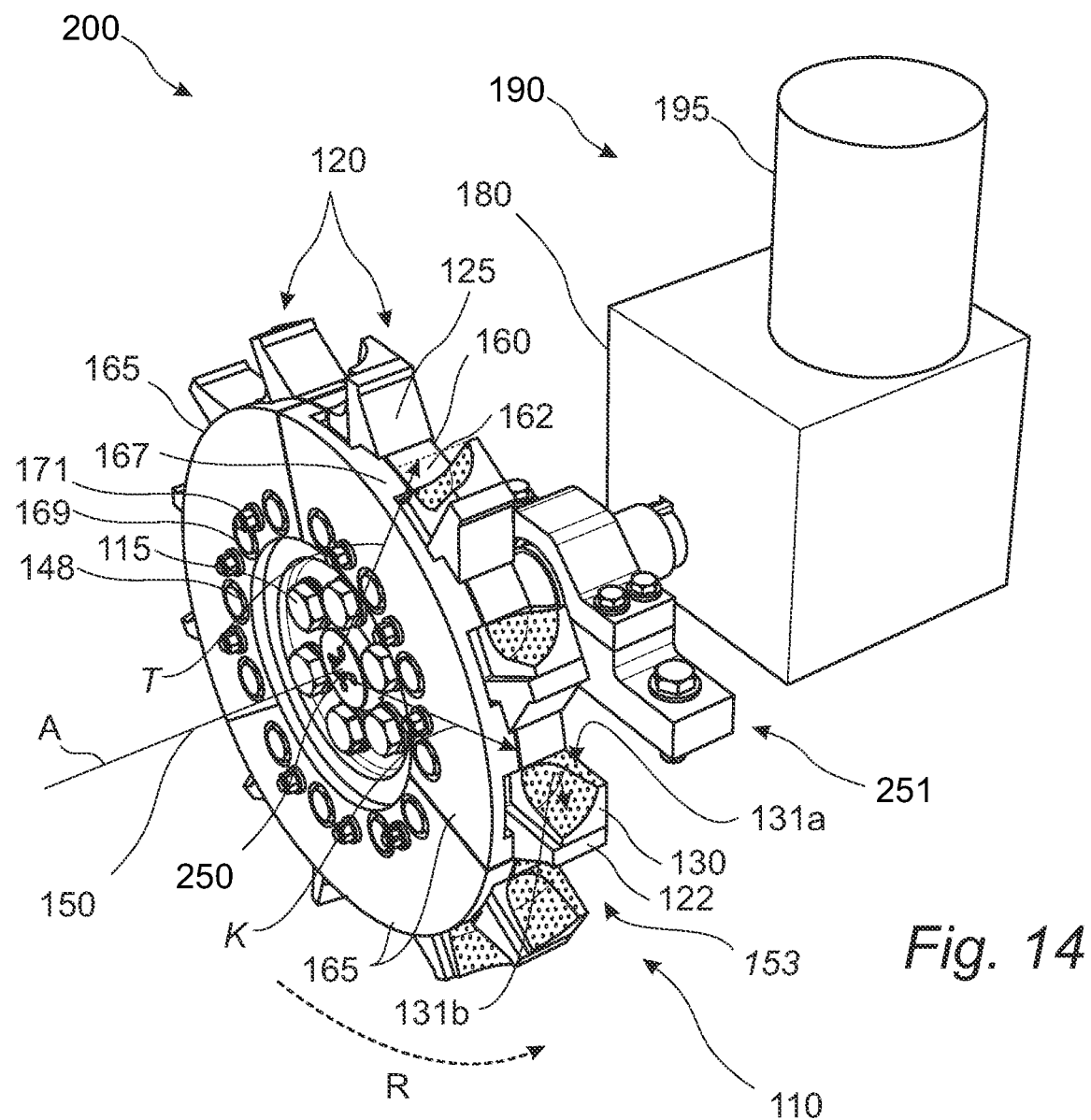
FIG. 14 is a perspective view of a material removal device according to another embodiment of the disclosure.

FIG. 14 illustrates a material removal device 200 according to another example embodiment of the disclosure. The material removal device 200 is similar to the material removal device 100 illustrated in FIG. 4 and only differ in how the rotatable cutter unit is supported. To better illustrate the differences, like reference numbers define features which are the same as for the material removal device 100, whereas different features have been given a new reference number in a new series.

The material removal device 200 consists of three main parts: A rotatable cutter unit 110 which is attached to a rotating shaft 250 which is supported by bracket 251, a transmission system 180 connected to the rotating shaft 250, and a drive unit 195 connected to the transmission system 180. The rotation device 190 comprising the transmission system 180 and the drive unit 195 is only schematically illustrated in FIG. 18A and are the same as previously described with reference to the material removal device 100. The rotatable cutter unit 110 is thus mounted on, or attached to, a rotating shaft 250 which is not through-going as was the case for rotatable shaft 150 of the first example embodiment. This arrangement may have the advantage that it is easier to replace the rotatable cutter unit. It may also facilitate using higher tilt angles as will be further described in what follows.

The cutter unit rotational axis A is preferable parallel with a rotational axis F of the roller 3. However, it is conceivable that the cutter unit rotational axis A is angled with respect to the rotational axis F of the roller 3. This is illustrated in FIGS. 15A-15D

Figure 15A:
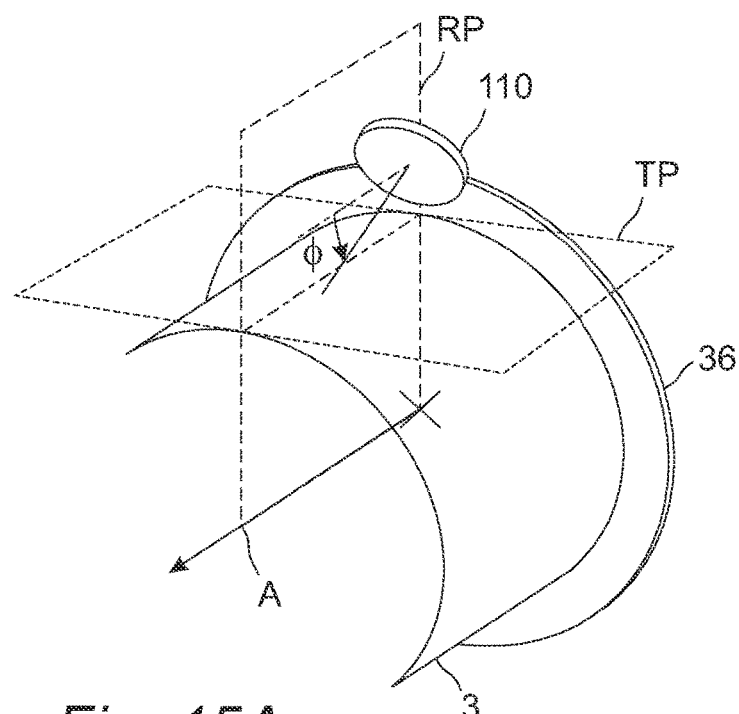
FIG. 15A is a schematic perspective view of a rotatable cutter unit of a material removal device in relation to a roller with a flange when the rotatable cutter unit is arranged at the top of the roller with a flange and tilted by a tilt angle φ.
Figure 15B:
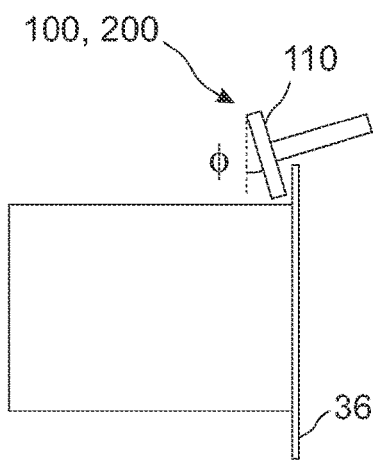
FIG. 15B is a schematic side view of the rotatable cutter unit and roller with the flange of FIG. 15A.

FIGS. 15A and B illustrates one way to angle the rotatable cutter unit 110 with respect to the roller 3. This way to angle the rotatable cutter unit 110 is herein referred to as a tilt. By tilting is herein means that the rotatable cutter unit 110 is arranged such the cutter unit rotational axis A forms a tilt angle $\phi$ with respect to the rotational axis F of the roller in the radial plane RP of the roller which intersects the cutter unit rotational axis A. This implies that the rotatable cutter unit 110 will be unparallel with the flange 36 of the roller 3, resulting in a varying distance between the rotatable cutter unit 110 and the flange 36 in the radial direction of the roller, as best illustrated in FIG. 5B. The tilt angle $\phi$ may be in the range of 0 to 90 degrees, preferably within the range 0 to 45 degrees. For larger tilt angles $\phi$, the material removal device 200 may be more suitable than the material removal device 100, since it does not have a through-going shaft.

Figure 15C:
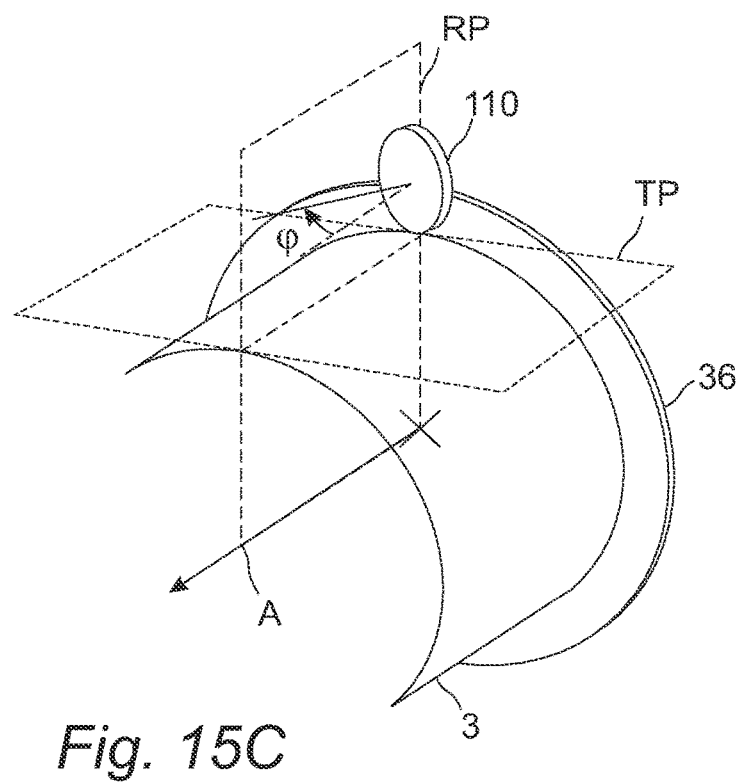
FIG. 15C is a schematic perspective view of a rotatable cutter unit of a material removal device in relation to a roller with a flange when the rotatable cutter unit is arranged at the top of the roller with a flange and skewed by a skew angle φ.
Figure 15D:
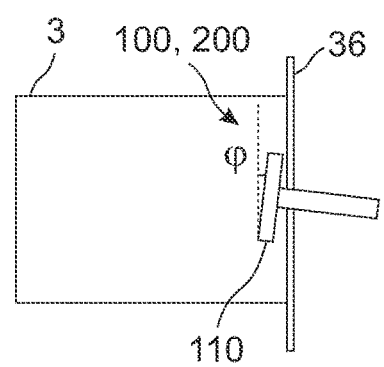
FIG. 15D is a schematic top view of the rotatable cutter unit and roller with the flange of FIG. 15C.

FIGS. 15C and D illustrates another way to angle the rotatable cutter unit 110 with respect to the roller 3. This way to angle the rotatable cutter unit 110 is herein referred to as a skew. By skewing is herein means that the rotatable cutter unit 110 is arranged such that the cutter unit rotational axis A forms a skew angle $\varphi$ with respect to the rotational axis F of the roller 3 in the tangential plane TP of the roller 3 which is orthogonal to said radial plane RP of the roller 3 which intersects the cutter unit rotational axis A. This implies that the rotatable cutter unit 110 will be unparallel with the flange 36 of the roller 3, resulting in a varying distance between the rotatable cutter unit 110 and the flange 36 along the tangential direction of the roller surface 3, as best illustrated in FIG. 5D. The skew angle $\varphi$ may be in the range of 0 to 20 degrees, preferably within the range 0 to 15 degrees. Preferably, the skew angle φ is defined such that the distance between the rotatable cutter unit 110 and the flange 36 is at its minimum on an upstream end of the material removal device 100. This may be advantageous as it may facilitate removal of the broken off build-up material at the down-stream end of the material removal device as a result of the distance between the rotatable cutter unit 110 and the flange 36 being wider there.

Figure 16A:
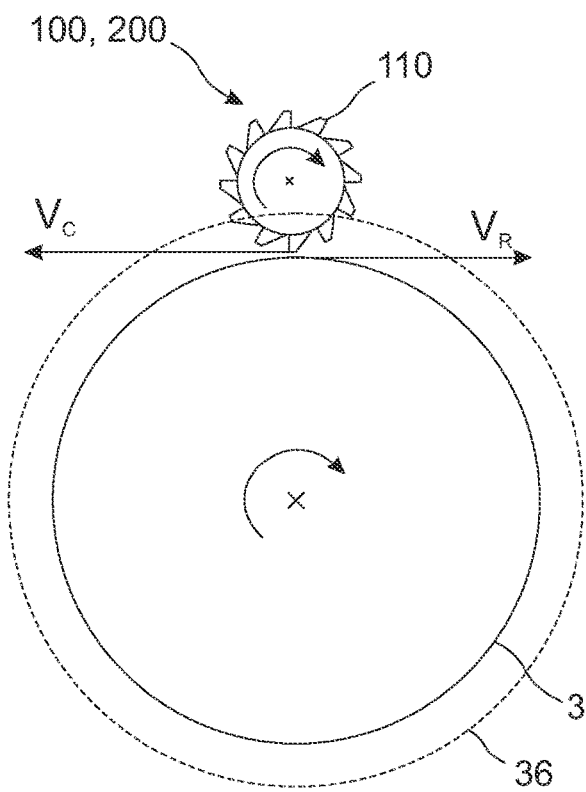
FIG. 16A is a schematic side view of a rotatable cutter unit and a roller surface of a roller with a flange for an operating mode where a tangential velocity VC of the rotatable cutter unit is directed opposite to a tangential velocity VR of the roller surface.
Figure 16B:
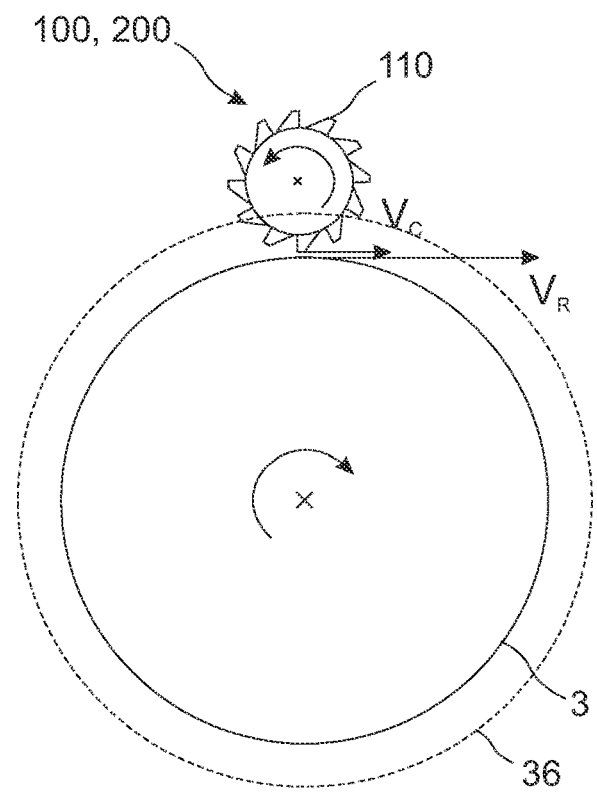
FIG. 16B is a schematic side view of a rotatable cutter unit and a roller surface of a roller with a flange for an operating mode where a tangential velocity VC of the rotatable cutter unit is directed in the same direction as a tangential velocity VR of the roller surface, and wherein VC is smaller than VR.
Figure 16C:
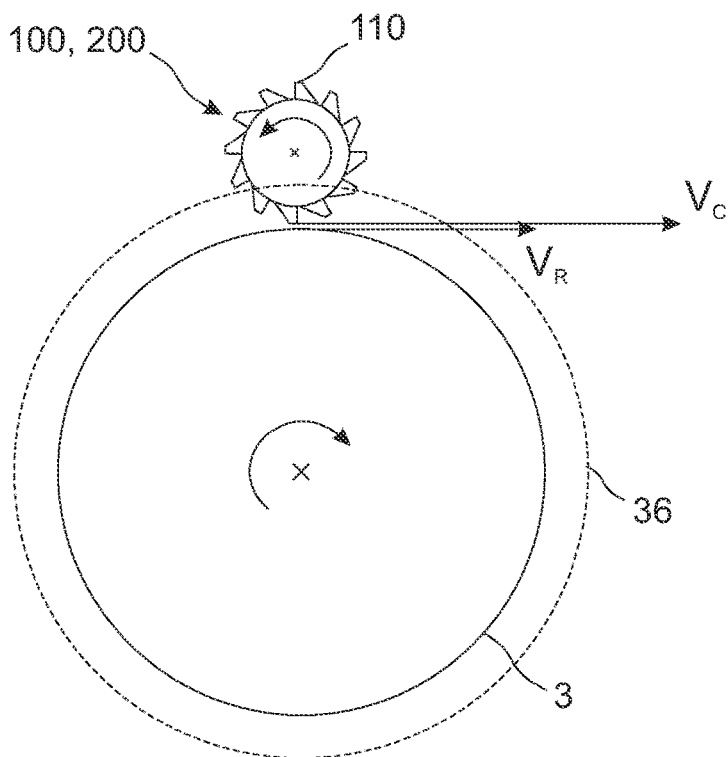
FIG. 16C is a schematic side view of a rotatable cutter unit and a roller surface of a roller with a flange for an operating mode where a tangential velocity VC of the rotatable cutter unit is directed in the same direction as a tangential velocity VR of the roller surface, and wherein VC is larger than VR.

The rotatable cutter unit 110 may be rotated in the same rotational direction as the rotational direction of the roller 3 with a flange 36. Alternatively, the rotatable cutter unit 110 may be rotated in a rotational direction being opposite to the rotational direction of the roller 3 with a flange 36. The rotational speed of the rotatable cutter unit 110 may be within the range of 1 rpm up to 200 rpm. As readily appreciated by the person skilled in the art, the important factor will be the relative difference in tangential velocity between the roller surface and the cutter elements of the rotatable cutter unit at the point of impact between the same. This is illustrated in FIGS. 16A-C for different cases. The tangential velocity for the rotatable cutter unit 110 is here denoted VC whereas the tangential velocity of the roller surface 37 of the roller 3 is denoted VR.

If the rotatable cutter unit 110 rotates along the same rotational direction as the rotational direction of the roller 3 with a flange 36 (FIG. 16A), the highest relative difference in tangential velocity will typically be obtained. This occurs as a result from the two tangential velocities VR and VC being directed in opposite directions thus adding to each other. If the rotatable cutter unit 110 rotates along the rotational direction being opposite to the rotational direction of the roller 3 with a flange 36, the relative difference in tangential velocity will be lower. This occurs as a result from the two tangential velocities VR and VC being directed along the same direction as illustrated in FIGS. 16B and 16C. As can be seen, there are two different cases. FIG. 16B illustrates the case where both tangential velocity VC and VR are directed in the same direction but where the tangential velocity VC of the roller 3 is larger than the tangential velocity VC of the rotatable cutter unit 110. In this velocity range, the material build-up residing on the roller surface will move faster than the impact surfaces 131*a*, 131*b* of the rotatable cutter unit 110. This mode of operation may be used in cases where material build-up not as excessive. By constantly rotating the rotatable cutter unit 110, each of the cutter elements will be worn to the same degree equally contributing to the cutting, however at a reduced speed. As readily appreciated by the person skilled in the art, and also illustrated in FIGS. 16A and B, the impact surfaces 131*a*, 131*b* of the cutter elements is oriented in the same direction for these two cases. The third conceivable case is illustrated in FIG. 16C, which illustrates the case where both tangential velocity VC and VR are directed in the same direction but where the tangential velocity VC of the roller 3 is smaller than the tangential velocity VC of the rotatable cutter unit 110. In this velocity range, the material build-up residing on the roller surface will move slower than the impact surfaces 131*a*, 131*b* of the rotatable cutter unit 110. This mode of operation may have the advantage of directing the removed material and dust created in the process inwardly towards the crusher gap, which may be advantageous for some applications.

For the counter-rotating cases illustrated in FIGS. 16B and C, at a particular ratio between the rotational speed of the roller 3 and the rotational speed of the rotatable cutter unit 110, the relative difference in tangential velocity will be zero (i.e. VC=VR) which will result in loss of cutting action. Therefore, when operating the rotatable cutter unit along the rotational direction opposite to the rotational direction of the roller 3, care must be taken to avoid this rotational speed. For an efficient cutting operation, the relative tangential velocity is preferably higher than 1.25 times the tangential speed of the roller surface.

Figure 18A:
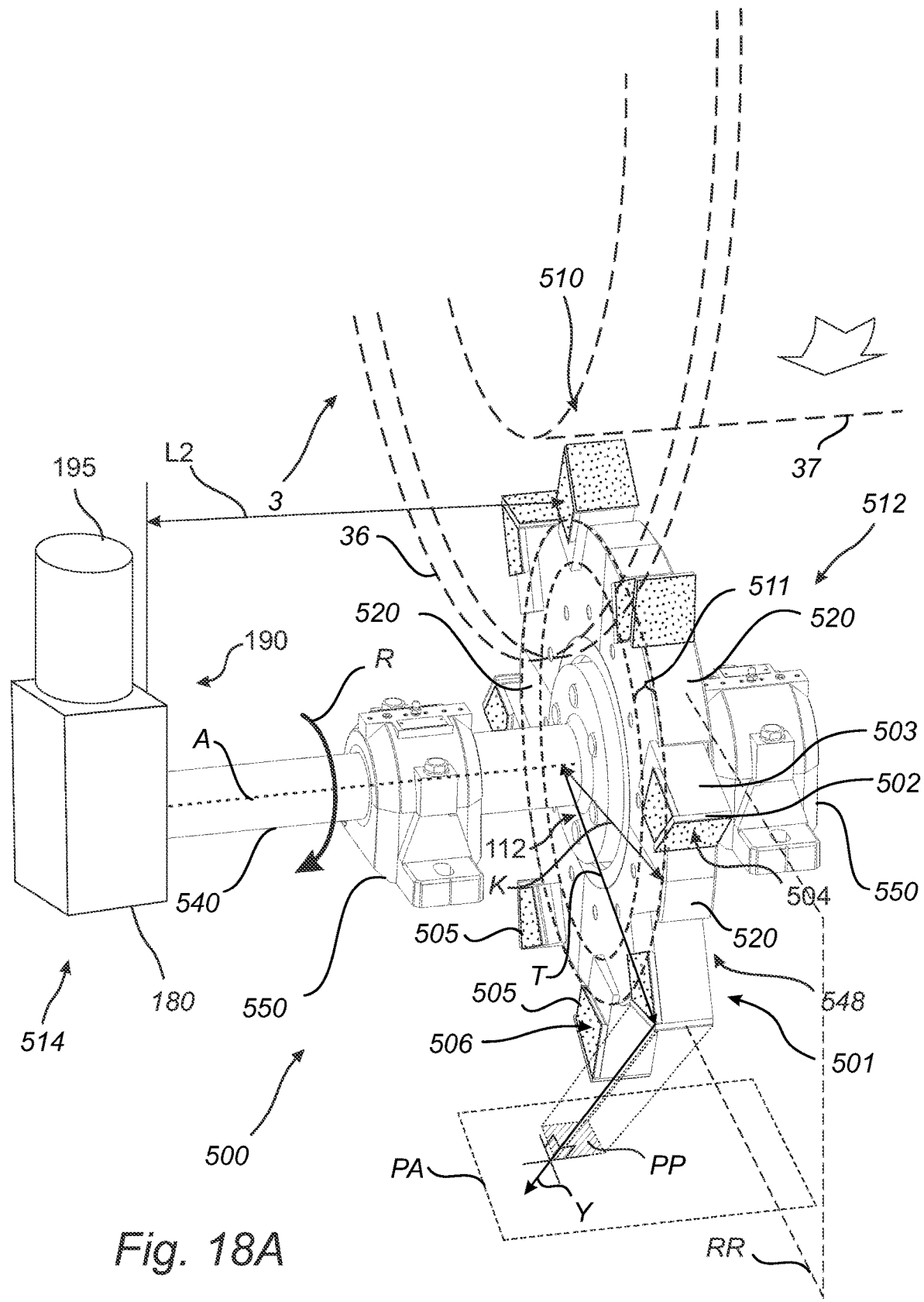
FIG. 18A is a perspective view of a material removal device according to another embodiment of the disclosure.

FIG. 18A illustrates a material removal device 500 according to another example embodiment of the disclosure. The material removal device 500 comprises a rotatable cutter unit 510. The rotatable cutter unit 510, which is also illustrated in isolation in FIG. 18B. has a plurality of cutter elements 501 (for this particular example embodiment: eight cutter elements 501) arranged tangentially about the rotatable cutter unit 510 at a respective radial distance T from a rotational axis A of the rotatable cutter unit 510. For the example embodiment, the cutter elements 501 are mutually equidistantly spaced at 45 degrees from each other. The rotatable cutter unit 510 has an annular engagement portion 511 and each cutter element 501 is arranged to the annular engagement portion 511. Each cutter element 501 may be attached to the annular engagement portion 511 by bolting, or screwing, or clamping, or the like. The rotatable cutter unit 510 is attached to a rotationally arranged shaft member 540 which in turn is rotationally attached to a part of a roller crusher 1 via support structures, or brackets, 550. As illustrated in FIGS. 18A and 19B, a periphery 548 of the rotatable cutter unit 510, as seen between a pair of adjacent cutter elements 501 of the plurality of cutter elements 501, has a radial extension K being at least 20 mm smaller than a smallest radial distance T of the pair of adjacent cutter elements 501. For the example embodiment illustrated in FIG. 1A, the radial distance T is the same for all eight cutter elements 501, and thus the smallest radial distance will be the radial distance T defined in FIG. 18A.

The material removal device 500 further comprises a transmission system 180 connected to the rotating shaft 540 and a drive unit 195 connected to the transmission system 180. The transmission system 180 and the drive unit 195 are only schematically illustrated in FIG. 18A and may be the same as previously described with reference to the material removal device 100.

As illustrated in FIG. 18A, the rotatable cutter unit 510 is arranged at a first end 512 of the material removal device 500, and the rotation device 190 is arranged at a second 514, opposite, end of the material removal device 500. The rotatable cutter unit 510 extends in a reference plane RR which is orthogonal to the rotational axis A. As will be apparent when viewing the drawings, the reference plane RR is indicated at different axial positions for different figures. This has been made to make it easier to understand the geometrical shape of the cutter elements. However, the reference plane RR is always orthogonal to the rotational axis A.

Figure 18B:
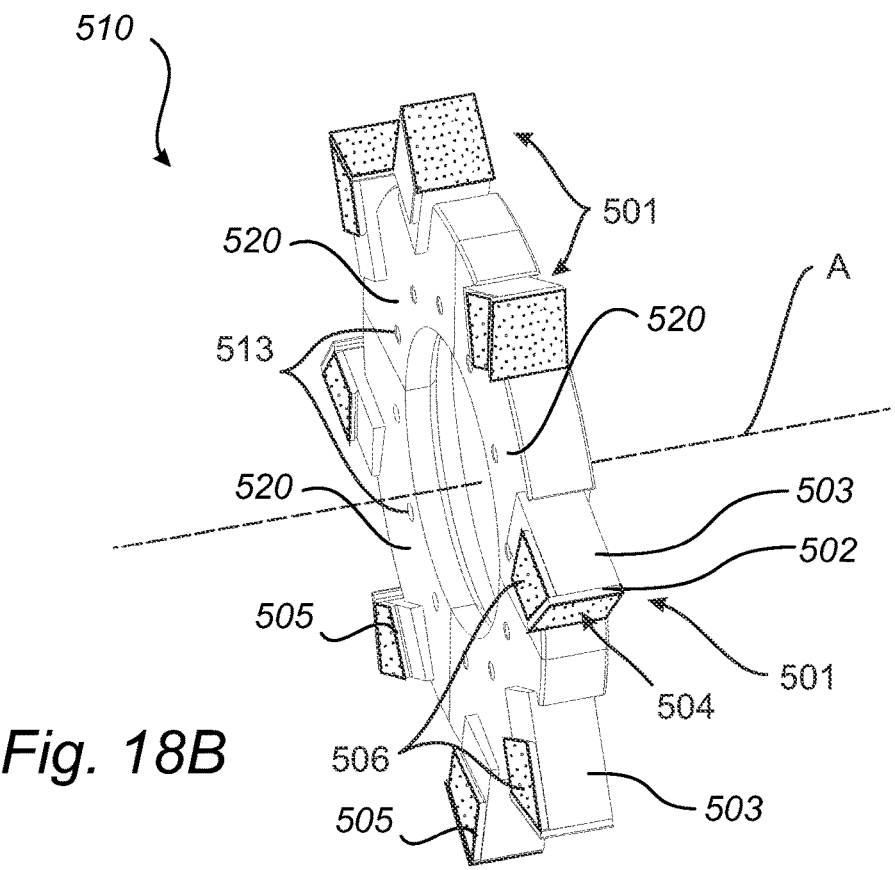
FIG. 18B is a perspective view of the rotatable cutter unit of the material removal device of FIG. 18A.
Figure 18C:
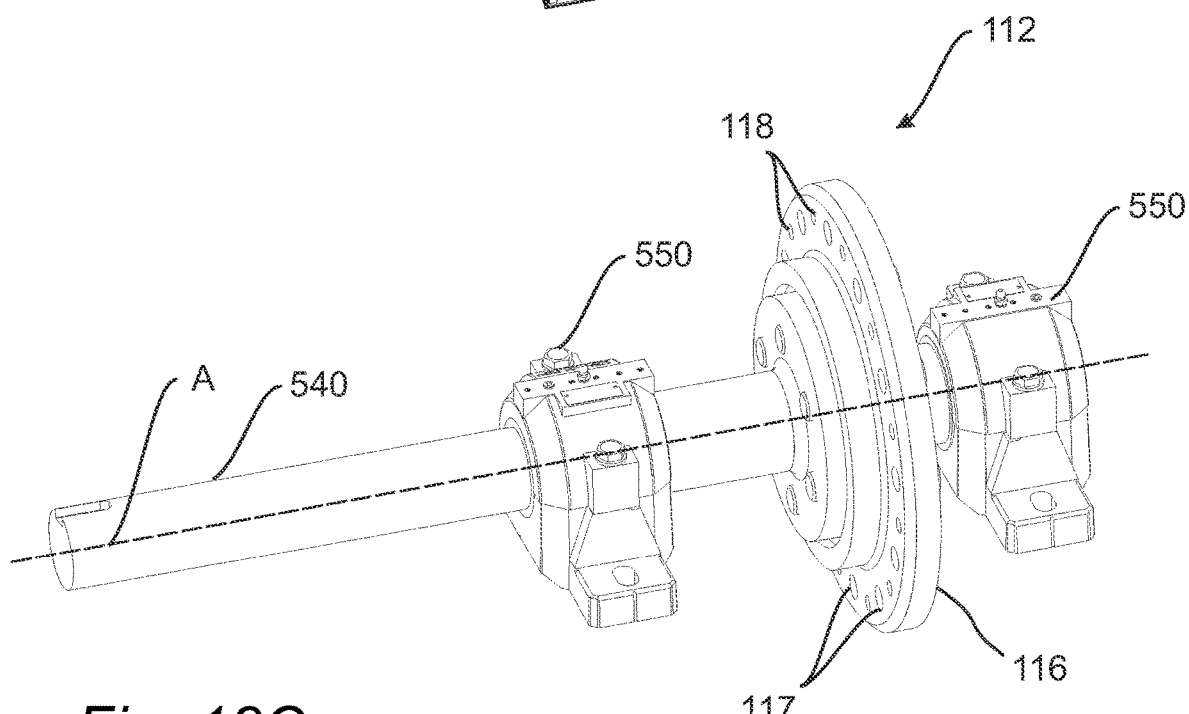
FIG. 18C is a perspective view of the material removal device of FIG. 18A where the rotatable cutter unit is omitted.

As can be seen in FIGS. 18A to 18C, the rotatable cutter unit 510 comprises a main support structure 112 and at least two cutter element support structures 520 (in the example embodiment: four cutter element support structures 520). The cutter element support structures 520 are releasably arranged with respect to the main support structure 112 and shaped as circular ring sectors which together form a circular ring, in the same manner as described for previous embodiments. The releasable attachment may be realized by bolting the elements together by means of fastening bolts 148 entering through-holes 513 and being secured into threaded holes 117 of the outer portion 116 of the main support structure 112. The fastening bolts 148 are not visible in FIG. 18A but can be seen e.g. in the earlier described example embodiment of FIG. 4 and also in an example embodiment illustrated in FIG. 25. The main support structure 112 of the rotatable cutter unit 510 is the same as described with reference to FIG. 6, and the attachment of the cutter element support structures 520 to the main support structure 112 is achieved in the exact same manner as preciously described and will therefore not be further described herein.

As illustrated in FIG. 18A, the circular ring presents the annular engagement portion 511. The purpose of providing two or more cutter element support structures 520 is that it allows them to be individually replaced on site without having to completely dismantle the material removal device 500, as detailed earlier. There are many conceivable ways to provide cutter element support structures within the scope of the disclosure. They may occur in different numbers, have different shapes, and support various numbers of cutter elements. The cutter element support structure 520 has a 90-degree circular ring sector design, and therefore four cutter element support structures 520 are needed to completely encircle the main support structure 112 to form the annular engagement portion 511.

Each cutter element 501 comprises a cutter element holding structure 503 and an active cutter element 502 which has an impact surface 504 indicated in FIGS. 18A and 18B as dotted areas. The active cutter elements 502 of the cutter elements 501 have impact surfaces 504 which comprise a polycrystalline diamond (PCD).

As readily appreciated by the person skilled in the art, diamond can be one single, continuous crystal or it can be made up of many smaller crystals (polycrystal). Large, clear and transparent single-crystal diamonds are typically used as gemstones. Polycrystalline diamond (PCD) consists of numerous small grains, which are easily seen by the naked eye through strong light absorption and scattering; it is unsuitable for gems and is instead used for industrial applications such as mining and cutting tools. Polycrystalline diamond is often described by the average size (or grain size) of the crystals that make it up. Grain sizes range from nanometres to hundreds of micrometres, usually referred to as "nanocrystalline" and "microcrystalline" diamond, respectively.

For the cutter element 501, the active cutter element 502 further comprises a wear resistant material in which the polycrystalline diamond (PCD) is at least partly embedded. The polycrystalline diamond (PCD) may in an alternative embodiment be attached to a surface of a wear resistant material of the active cutter element 502. For the example embodiment, the wear resistant material is a cemented carbide comprising Tungsten carbide and, as a binder, cobalt. The binder content may typically be 10-15 wt %. Other wear resistant materials are conceivable. Such alternative materials include other ceramic materials, such as Titanium carbides or Vanadium carbides; metal ceramics composite materials, such as cemented carbides e.g. Titanium carbide, Tungsten carbide or Vanadium carbide with cobalt as a binder; or metal matrix composite materials comprising Titanium carbide, Tungsten carbide or Vanadium carbide.

In one embodiment, the polycrystalline diamond (PCD) is embedded in Tungsten carbide, Vanadium carbide, or Titanium carbide.

An advantage of the impact surface 504 comprising the polycrystalline diamond (PCD) is that the wear life of the cutter elements 501 may be considerably prolonged. Normally such impact surfaces 504 would comprise wear resistant material such as ceramic or composite materials comprising Tungsten carbide, Titanium carbide, and Vanadium carbide, but with an impact surface 504 comprising polycrystalline diamond (PCD), the wear life may be prolonged with up to about 50 times in comparison with only comprising e.g. a composite material comprising Tungsten carbide.

The active cutter element 502 may comprise a layer of polycrystalline diamond (PCD). The layer of polycrystalline diamond (PCD) may have a thickness of 0.4 to 3.2 mm, or 1.0 to 2.0 mm, or 1.35 to 1.8 mm, or 1.4 to 1.6 mm, or about 1.5 mm.

According to one embodiment, the impact surface of the cutter element may comprise two or more layers of polycrystalline diamond (PCD). The two or more layers may be attached to each other e.g. by adhesive. The number of layers and/or the thickness of individual layers may depend on grain size and/or the application for which it is used.

The diamond grain size of the polycrystalline diamond (PCD) of the impact surface may be 0.8 to 30 μm, as determined by image analysis using a Scanning Electron Microscope (SEM).

The grain size of diamond may be measured by various measurement techniques. such as laser size analysers or scanning electronic microscopes (SEM). One example of a laser size analyser is a Malvern Particle size analyser equipment which is based on laser diffraction. The values determined using the laser size analyser may be the initial diamond grain size that for some embodiments may later be subjected to High Pressure High Temperature Sintering. When the diamond particles have been sintered and compacted to form the polycrystalline diamond (PCD) of the impact surface, an image analysis by means of scanning electron microscopy is used to determine the end microstructural grain size distribution, i.e. the diamond grain size of the polycrystalline diamond (PCD) of the impact surface.

This disclosure of the material of the impact surface 504 and the active cutter element 502 is also true for the impact surfaces 131, 231, 331, 431, 604, 804, 1004, and 1104, and for the active cutter elements 130, 230, 330, 430, 602, 802, 1002, 1102, as indicated in the associated drawings with the dotted areas.

In addition to the active cutter elements 502, each of the cutter elements 501 of the material removal device 500 further comprises a surface 506 which faces the flange 36 (sec FIG. 18A), which surface 506 comprises a polycrystalline diamond (PCD). The surface 506 is defined on elements 505 which may be similar to the active cutter elements 502 already described in detail herein. It is also conceivable that the elements 505 are different from the active cutter elements 502. For example, the PCD of the active cutter elements 502 may have different properties than the PCD of the elements 505. This may be beneficial, since the cutter elements 502 will be facing generally towards the material to be removed and may thus be mostly exposed to material impact, whereas the elements 505 will be oriented such that material will impinge at an angle which makes the elements 505 more prone to sliding wear than impact wear. The rotatable cutter unit 510 is structured and arranged such that each impact surface 504 at least partly faces in a tangential direction of motion Y defined at the impact surface 504 and directed along the rotational direction R of the rotatable cutter unit 510. In other words, the impact surface 504 has a projection PP in a plane PA being orthogonal to said tangential direction of motion Y which projection PP is larger than zero. As readily appreciated by the person skilled in the art, this achieves the effect that when the material removal device 500 is arranged on a roller crusher 1, the impact surfaces 504 may be arranged such that it at least partially faces the material to be removed.

Each cutter element 501 is releasably fastened to the cutter element support structures 520 by bolting. The bolting allows for an easy assembly procedure when preparing a rotatable cutter unit 510 for being mounted on a roller crusher 1. The rotatable cutter unit 510 is attached to a shaft member 540 which is rotatably attached to brackets 550. The brackets 550 are structured and arranged to be connected to a frame 2 of the roller crusher 1.

As illustrated in FIGS. 18A and 19A to 19C, which shows the individual cutter elements 501 of the material removal device 500 in more detail, the surface 506 that faces the flange 36 has an extension E2 from the active cutter element 502 tangentially towards a rear end 507 thereof. The cutter element 501 is structured and arranged such that a distance L2 (see FIGS. 18A and 19A) between the surface 506 facing the flange 36 and the rotation device 190 decreases towards the impact surface 506 over at least a part of the extension E2. The distance L2 is only schematically indicated in FIG. 19A, by means of the arrow and the dashed square aiming to define the relative location of the rotation device 190 with respect to cutter element 501. The distance L2 is however more realistically illustrated in FIG. 12A. The view in FIG. 19C, as indeed also the view in later FIGS. 20C, 21C, 22C and 23C are taken along the radial axis RA as defined in FIG. 19B.

For the example embodiment, the surface 506 which faces the flange 36 is substantially planar. Therefore, the varying distance L2 as described hereinabove may for the cutter element 501 be further expressed in terms of an angle β defined between the surface 506 which faces the flange 36 and the reference plane RR, wherein the angle β is defined within a tangential plane TPS of the cutter element 501 which is orthogonal to the reference plane RR. The angle β may be 1 to 45°, 1 to 40°, 1 to 30°, 5 to 25°, or 5 to 20°, or 5 to 15°, or 8 to 12°, or 10°. The angle β, the reference plane RR and the tangential plane TPS of the cutter element 501 are illustrated in FIG. 19A.

As can be seen in FIG. 19A, the tangential plane TPS of the cutter element 501 is parallel with the tangential direction Y of the cutter element 501, as defined at the impact surface 504 and directed along the reference rotational direction R of the rotatable cutter unit 510, and which tangential plane TPS is orthogonal to the reference plane RR. Thus, each cutter element 501 of the plurality cutter element 501 have an associated tangential plane TPS, which are all angled with respect of each other as a result from the cutter elements 501 being arranged tangentially about the rotatable cutter unit 510.

As best illustrated in FIG. 19B, each cutter element 501 extends in the reference plane RR from a bottom end 517, along a cutter axis 514 towards the active cutter element 502. The cutter axis 514 forms a first acute angle A1 along the rotational direction R with a radial axis RA of the rotatable cutter unit 510 which radial axis RA intersects with the active cutter element 502. As best illustrated in FIG. 19B, this achieves the effect that the cutter elements 501 are "forward-leaning" when the material removal device 500 is arranged in the roller crusher 1. Furthermore, each impact surface 504 extends in a plane SP which has a normal NP which forms an acute angle A2 along the rotational direction R with the cutter axis 514. This further aid in turning the impact surfaces 504 towards the material to be removed when the material removal device 500 is arranged on a roller crusher 1.

As illustrated in FIG. 18A, and in more detail in FIG. 19C, the cutter elements 501 are arranged to form axial protrusions 515 on the side of the rotatable cutter unit 510 that faces the flange 36. As illustrated in FIG. 18C, the protrusions 515 has axial extensions X. The axial extensions X may be within the range up to 75 mm, or 5 to 50 mm or, 10 to 40 mm. Although the above disclosed ranges are currently preferred, it is contemplated that axial extensions X could also be larger than 75 mm. The axial extension may depend on the roller crusher 1, the operating conditions and the material to be crushed etc. Thus, the axial extension X must be chosen based on parameters such as, but not limited to, the crushing gap G, the size of the crushing rolls 3, 4, and the size of the build-up material 41 to be removed. A bigger material build-up 41 may require a bigger axial extension X.

This particular example embodiment only has protrusions one the side facing the flange 36. It is however conceivable that the plurality of cutter elements are arranged to form axial protrusions on one or both sides of the rotatable cutter unit. An advantage with the protrusions 515 is that, upon arranging and operating the material removal device 500 on a roller crusher 1, the material removed will, as soon as it has flown past along the surface 506 of the cutter element 501 facing the flange 36, easily be removed via the wider gap between the inner surface 39 of the flange 36 and the remaining part of the rotatable cutter unit 510 (for the example embodiment, the remaining part will be the main support structure 112 and the cutter element support structures 520), and flow towards the centre of the roller 3 instead of being squeezed and compacted between the rotatable cutter unit 510 and the inner surface 39 of the flange 36.

The material removal device according to the disclosure may be embodied in many different ways. In what follows, a number of alternative embodiments of a cutter element assembly 600, 700, 800, 900 will be described in detail with reference to FIGS. 20 to 23. A cutter element assembly 600, 700, 800, 900 is here defined as one cutter element support structure 620 and its associated cutter elements 601, 701, 801, 901. Each of these cutter element assemblies 600, 700, 800, 900 may be fastened to the main support structure 112 illustrated in FIG. 18C. Providing the same interface for different cutter element assembly versions allows for varying both the number of cutter elements on the rotatable cutter unit and the structure and characteristics of the individual cutter elements attached to the cutter element support structures.

FIGS. 20A to 20E illustrates a cutter element assembly 600 according to an alternative embodiment of the disclosure. The cutter element assembly 600 includes a cutter element support structure 620 and two cutter elements 601 connected thereto. The cutter element support structure 620 is similar to the previously described cutter element support structure 520 in that it has the same interface for attachment to the main support structure 112, and that it has the same 90-degree circle sector form factor. Thus, the cutter element support structure 620 provides the same releasable attachment as cutter element support structure 520 realized by means of fastening bolts 148 entering through-holes 613 and being secured into threaded holes 117 of the outer portion 116 of the main support structure 112. The cutter element support structure 620 also has through openings 614 distributed in between the through-holes 613. The purpose of the through-openings 614 is the same as the purpose of the through-openings 146 of the cutter element support structure 140, namely to allow fastening wear shields. Similar to previous example embodiments, the periphery 648 as seen between a pair of adjacent cutter elements 601 has a radial extension K being at least 20 mm smaller than a smallest radial distance T of the pair of adjacent cutter elements 601 (see FIG. 14B). The advantage of the above feature is the generally the same as outlined for the first example embodiment in FIG. 4.

Figure 20D:
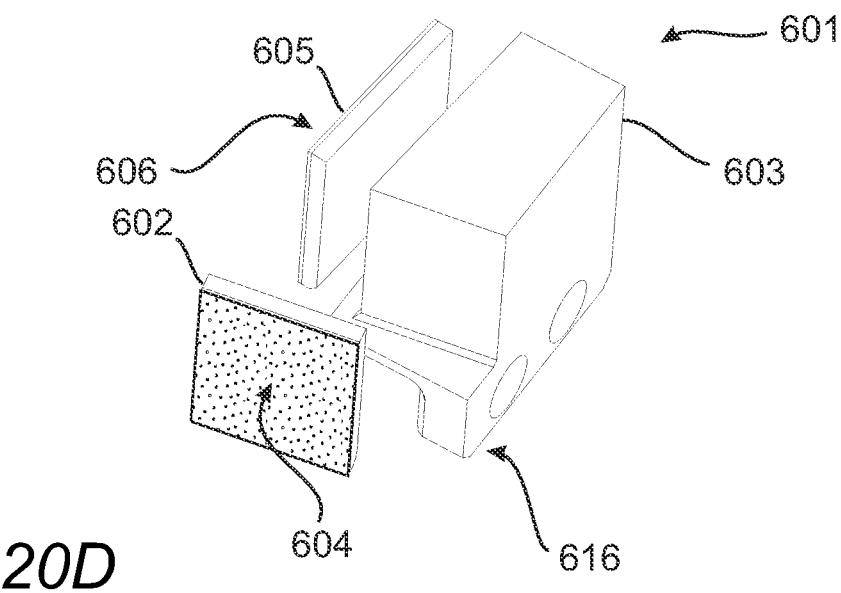
FIG. 20D is an exploded view of a cutter element which forms a part of the rotatable cutter unit of FIG. 20A.
Figure 20E:
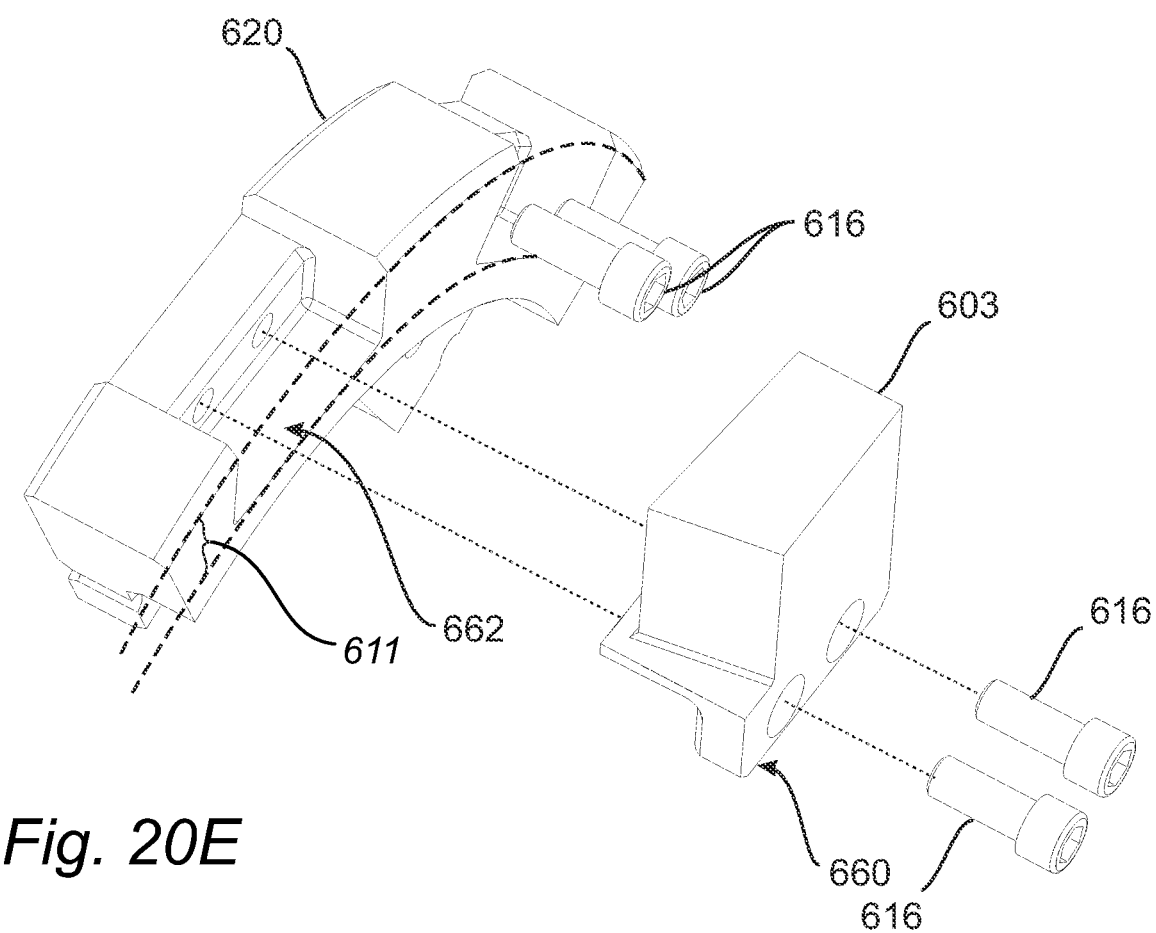
FIG. 20E is an exploded view of a cutter element support structure and an active cutter element which forms a part of the rotatable cutter unit of FIG. 20A.

Each cutter element 601 is releasably arranged in the annular engagement portion 611 by a geometrical locking engagement. The releasable arrangement of the cutter elements 601 on the cutter element support structure 620 is best illustrated in FIG. 20E. As can be seen in FIG. 20E, the geometrical locking engagement is at least partly defined by a protruding structure 660 of the cutter element 601 being inserted into an associated recess 662 of the annular engagement portion 611, wherein the protruding structure 660 and the associated recess 662 has complementary shapes. The recesses 662 of the annular engagement portion 611 are defined on a side surface of the cutter element support structure 620. The protruding structure 660 forms a part of the cutter element holding structure 603, whereas recess 662 forms a part of the cutter element support structure 620. The cutter elements 601 are releasably attached to the cutter element support structure 620 by means of fastening bolts 616 (see FIG. 20E). The geometrical locking engagement illustrated in FIG. 20E is similar to the one described earlier with reference to FIG. 12, albeit for somewhat structurally different cutter element support structures, cutter element holding structures, and active cutter elements.

Furthermore, the cutter elements 601 structurally differs from the cutter elements 501. In particular, the impact surface 604 is not oriented the same way as the impact surface 504. The impact surface 604 is substantially planar and arranged to incline in a relation to a normal N of the reference plane RR, as defined in front of the impact surface 604, and incline such that a distance L1 between the normal N and the impact surface 604 decreases towards the flange 36 (see FIG. 20C).

For the example embodiment, the impact surface 604 is substantially planar. Therefore, the varying distance L1 as described hereinabove may for the cutter element 601 be further expressed in terms of an angle α defined between the impact surface 604 and the normal N of the reference plane RR, wherein the angle α is defined within a tangential plane TPS of the cutter element 601 which is orthogonal to the reference plane RR. This is illustrated in FIGS. 20A and 20C. This angle α may be 1 to 45°, 1 to 35°, 1 to 30°, 1 to 15°, or 2 to 10°, or 3 to 8°, or 4 to 6°, or 5°.

The cutter element 601 shares some features with the already described cutter element 501. In particular, the cutter element 601 further comprises elements 605 on a side thereof, which elements 605 also comprises a surface 606 which comprises polycrystalline diamond (PCD). The cutter element 601 is structured and arranged such that the surface 606 forms an angle β between the surface 606 which faces the flange 36 and the reference plane RR. wherein the angle β is defined within a tangential plane TPS of the cutter element 601 which is orthogonal to the reference plane RR. . . . A yet further similarity is that the cutter elements 601 are arranged to form axial protrusions 615 on the side of the rotatable cutter unit. As illustrated in FIG. 20C, the protrusions 615 have axial extensions X. The axial extensions X may be within the range up to 75 mm, or 5 to 50 mm, or 10 to 40 mm.

Figure 21A:
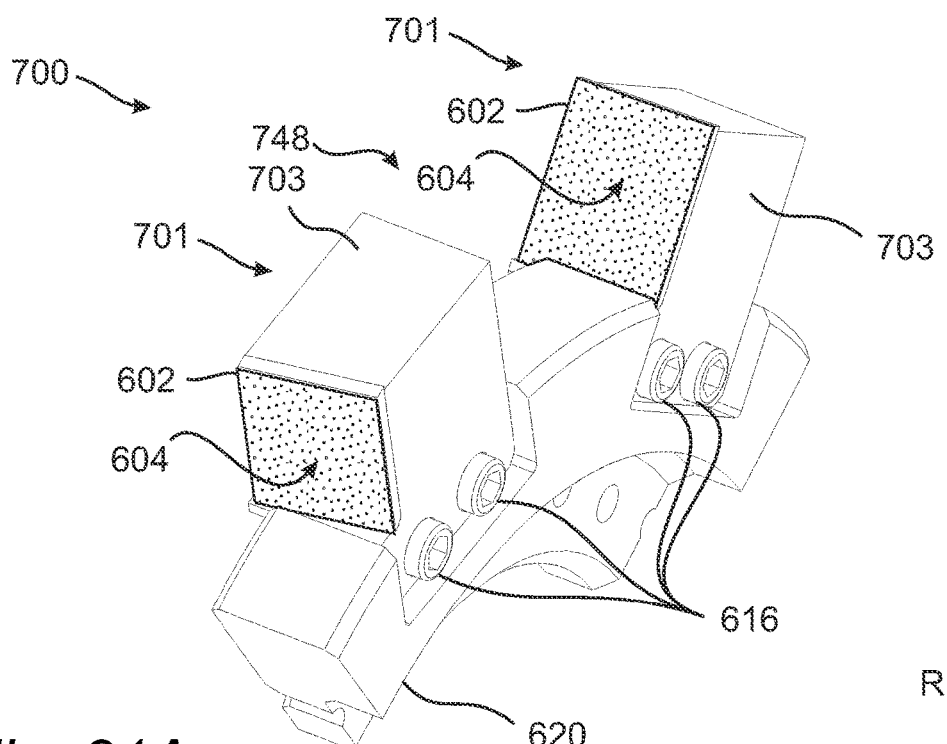
FIG. 21A is a perspective view of a part of a rotatable cutter unit according to another embodiment of the disclosure.
Figure 21B:
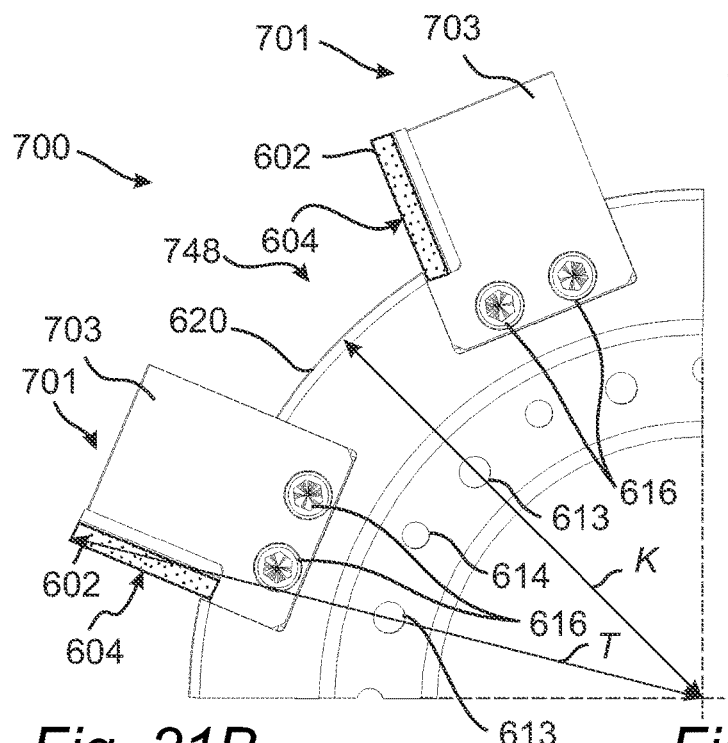
FIG. 21B is a side view of the part of the rotatable cutter unit of FIG. 21A.
Figure 21C:
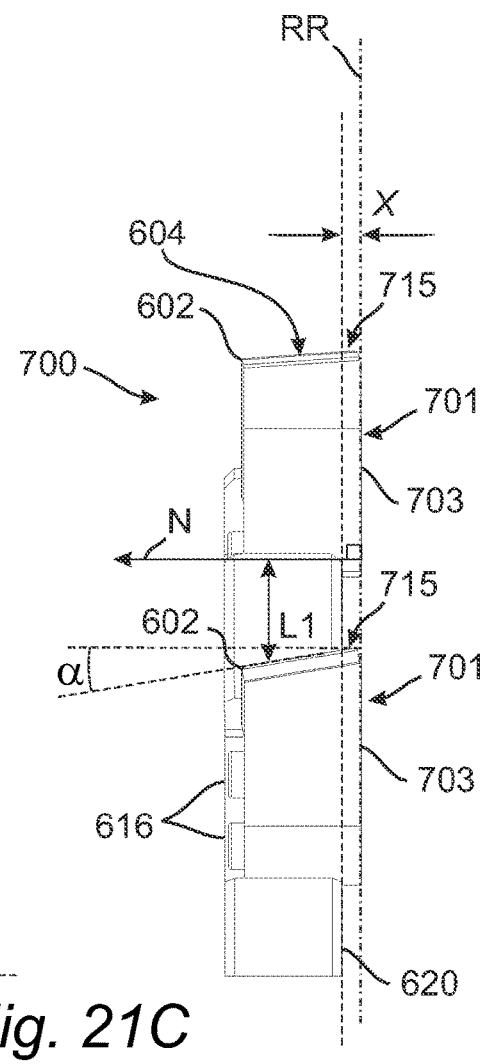
FIG. 21C is a top view of the part of the rotatable cutter unit of FIG. 21A.

FIGS. 21A to 21C illustrate a cutter element assembly 700 according to another example embodiment of the disclosure. The cutter element assembly 700 is similar to already described cutter element assembly 600 and will therefore only be briefly described herein. Like reference characters refer to like elements and have been earlier described herein. The cutter element assembly 700 comprises previously described cutter element support structure 620 and two cutter elements 701. The cutter elements 701 differs from the already described cutter elements 601 in that they do not have dedicated separate elements on the side of the cutter element holding structure 703. Furthermore, the cutter element 701 does not have the angled side surface, i.e. the angle β=0 (see e.g. FIGS. 20A and 21C). The flange 36 is not shown in FIG. 21C but is located to the right of cutter element assembly 700 in the same manner as illustrated in FIG. 20C for the cutter element assembly 600. To provide an appropriate form factor, the cutter element holding structure 703 is thus somewhat thicker than the cutter element holding structure 603. The cutter elements 701 are arranged to form axial protrusions 715 on the side of the rotatable cutter unit. As illustrated in FIG. 21C, the protrusions 715 has axial extensions X. The axial extensions X may be within the range up to 75 mm, or 5 to 50 mm, or 10 to 40 mm. For the example embodiment of FIG. 21A to C, the axial extension X is 15 mm. Similar to previous example embodiments, the periphery 748 as seen between a pair of adjacent cutter elements 701 has a radial extension K being at least 20 mm smaller than a smallest radial distance T of the pair of adjacent cutter elements 701 (see FIG. 21B). The advantage of the above feature is the generally the same as outlined for the first example embodiment in FIG. 4.

Figure 22A:
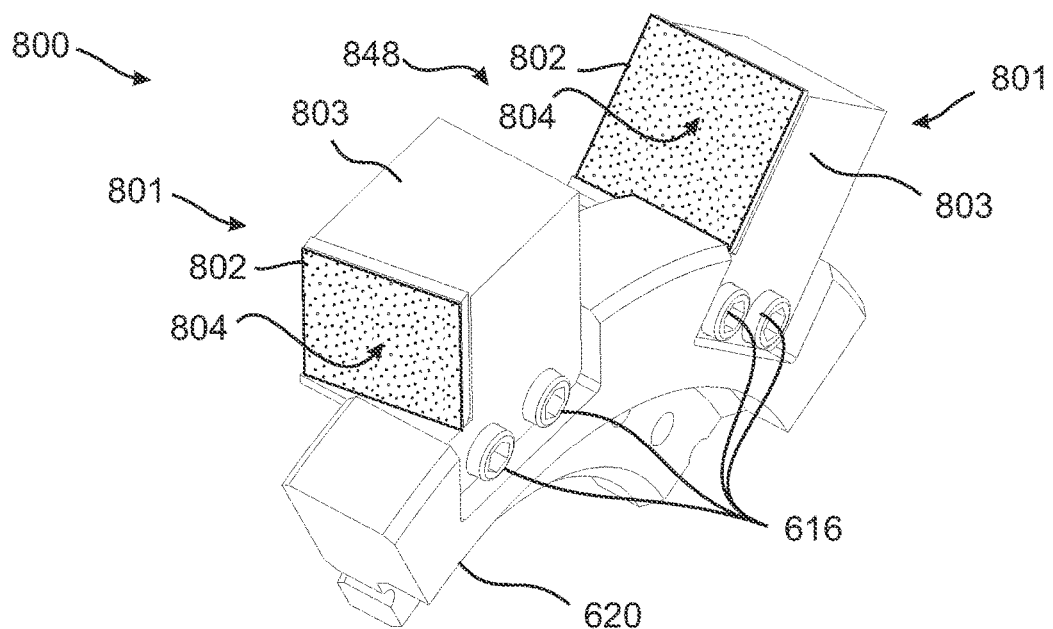
FIG. 22A is a perspective view of a part of a rotatable cutter unit according to another embodiment of the disclosure.
Figure 22B:
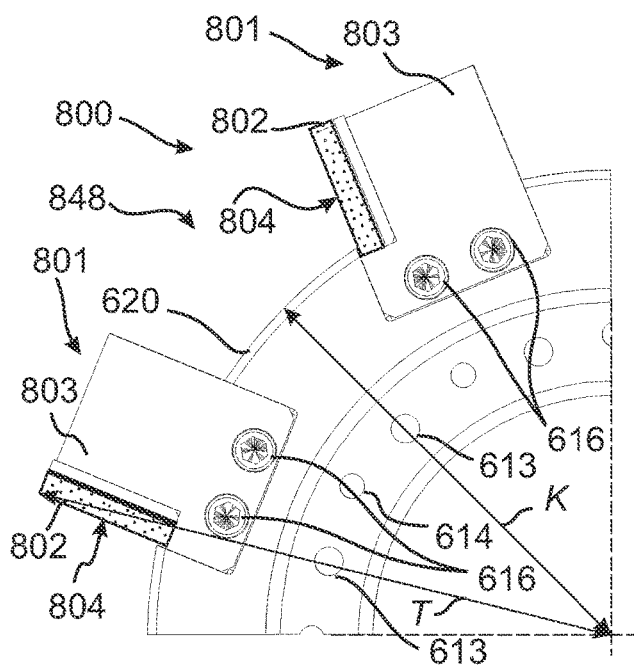
FIG. 22B is a side view of the part of the rotatable cutter unit of FIG. 22A.
Figure 22C:
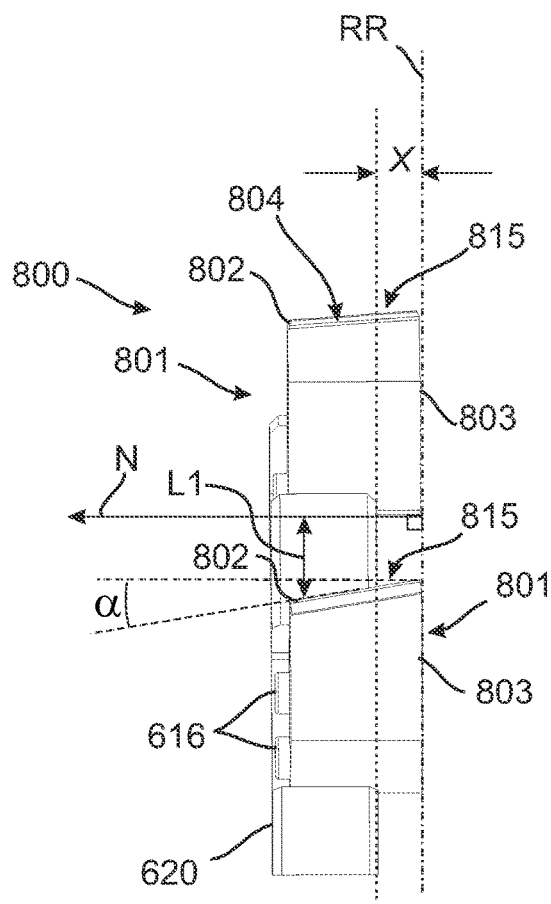
FIG. 22C is a top view of the part of the rotatable cutter unit of FIG. 22A.

FIGS. 22A to 22C illustrate a cutter element assembly 800 according to another example embodiment of the disclosure. The cutter element assembly 800 is similar to already described cutter element assembly 700 and will therefore only be briefly described herein. Like reference characters refer to like elements and have been earlier described herein. The main difference between the cutter element assembly 800 and the cutter element assembly 700 is that the cutter elements 801 of the cutter element assembly 800 are wider. This allows providing protrusions 815 having a considerably larger axial extension X. For the example embodiment of FIG. 16A to C, the axial extension X is 40 mm. The axial extension for this embodiment is X. To accommodate the wider form factor, both the cutter element holding structure 803 and the active cutter element 802 are larger than the cutter element holding structure 703 and the active cutter element 702 in FIGS. 21A to 21C. Similar to previous example embodiments, the periphery 848 as seen between a pair of adjacent cutter elements 801 has a radial extension K being at least 20 mm smaller than a smallest radial distance T of the pair of cutter elements 801 (see FIG. 22B). The advantage of the above feature is the generally the same as outlined for the first example embodiment in FIG. 4.

FIGS. 23A to 23C illustrate a cutter element assembly 900 according to another example embodiment of the disclosure. The cutter element assembly 900 is similar to already described cutter element assembly 700 and will therefore only be briefly described herein. Like reference characters refer to like elements and have been earlier described herein. The cutter element assembly 900 comprises cutter elements 901 and already described cutter element support structure 620. The cutter element 901 differs from already described cutter elements 701 in that the cutter element 901 has a surface 919 facing away from the flange 36, which surface 919 has an extension E3 from the impact surface 604 tangentially towards a rear end 907 thereof, wherein the cutter element 901 is structured and arranged such that a distance L3 between the surface 919 facing away from the flange 36 and the rotation device 190 decreases towards the impact surface 604 over at least a part of the extension E3.

As readily appreciated by the person skilled in the art, a distance L3 defined between the surface 919 which faces away from the rotation device 190 and the rotation device 190 itself must inevitably be defined as going through the cutter element 901 which presents said surface 919. In the context of defining the distance L3, the term "surface" should thus be construed as a mathematical or geometrical surface. This is clearly illustrated in FIG. 23A where the distance L3 is marked as a solid line outside of the cutter element 901 and a dotted line inside the cutter element 901.

For the example embodiment, the surface 919 which faces away from the flange 36 (see FIG. 23C) is substantially planar. Therefore, the varying distance L3 as described hereinabove may for the cutter element 901 be further expressed in terms of an angle γ defined between the surface 919 which faces away from the flange 36 and the reference plane RR, wherein the angle γ is defined within a tangential plane TPS of the cutter element 901 which is orthogonal to the reference plane RR. The angle γ may be 1 to 45°, or 1 to 40°, or 1 to 30°, or 5 to 25°, or 5 to 20°, or 5 to 15°, or 8 to 12°, or 10°. The angle γ, the reference plane RR and the tangential plane TPS of the cutter element 901 are illustrated in FIGS. 23A and 23C.

Similar to previous example embodiments, the periphery 948 as seen between a pair of adjacent cutter elements 901 has a radial extension K being at least 20 mm smaller than a smallest radial distance T of the pair of adjacent cutter elements 901 (see FIG. 23B). The advantage of the above feature is the generally the same as outlined for the first example embodiment in FIG. 4.

FIGS. 24A and 24B illustrate yet another example embodiment of the disclosure. In this case, the figures illustrate a rotatable cutter unit 1010 which comprises a spider 1030 arranged to be mounted onto a rotating shaft, such as the rotating shaft 150, 540 of previously disclosed example embodiment of the material removal device. The rotatable cutter unit 1010 differs from previously described embodiments in that it comprises cutter elements 1001 which has a surface 1019 facing away from the flange 36 and a surface 1006 which faces the flange 36, and wherein at least one of the surface 1019 facing away from the flange 36 and the surface 1006 facing the flange comprises ceramic inserts 1090. Arranging ceramic inserts on these surfaces 1006, 1019 will prolong the wear life of the cutter elements 1001. Similar to previous example embodiments, the periphery 1048 as seen between a pair of adjacent cutter elements 1001 has a radial extension K being at least 20 mm smaller than a smallest radial distance T of the pair of adjacent cutter elements 1001 (see FIG. 24A). The advantage of the above feature is the generally the same as outlined for the first example embodiment in FIG. 4.

Figure 25:
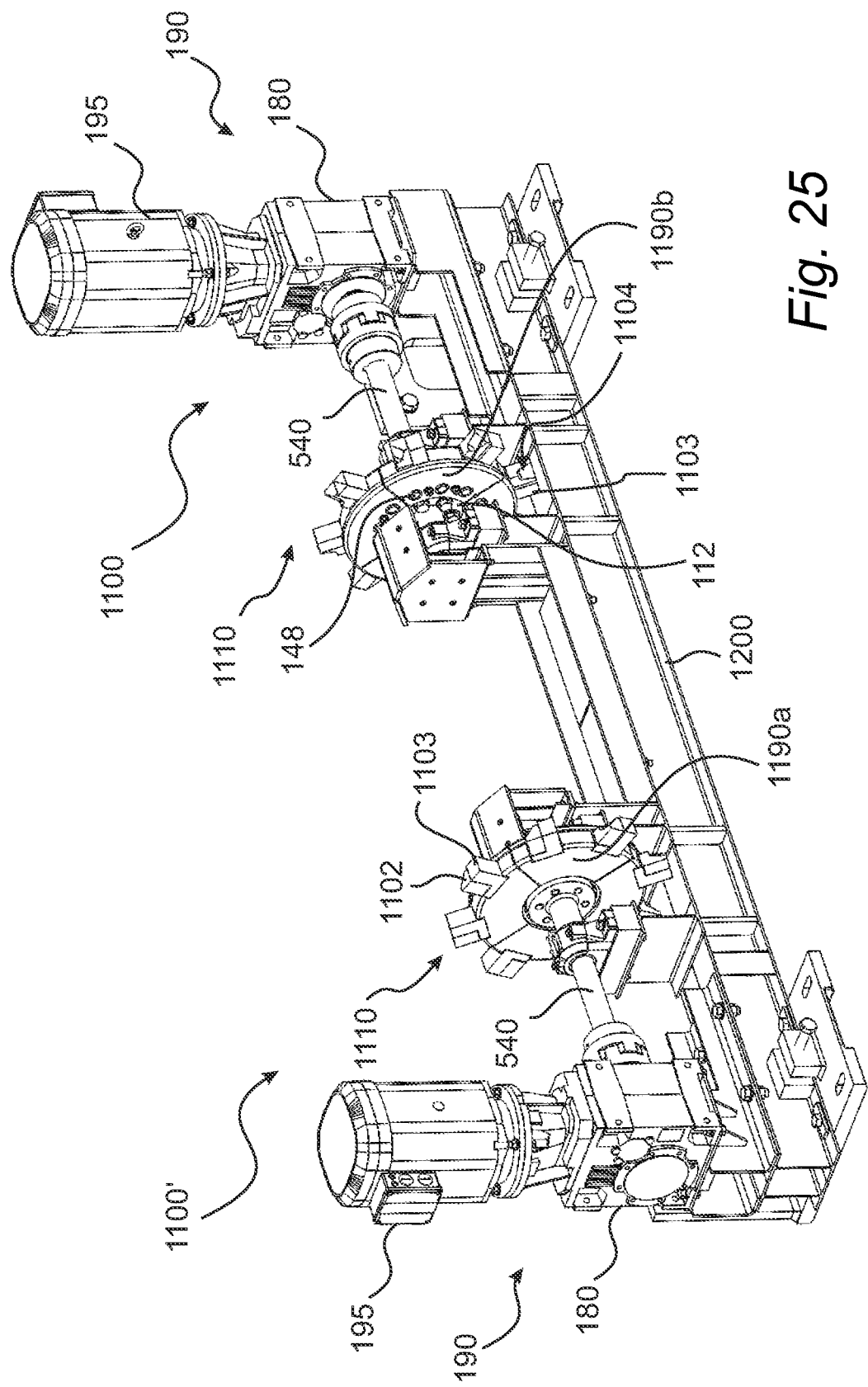
FIG. 25 is a perspective view of two material removal devices according to another example embodiment of the disclosure, situated on opposite sides of a frame of a roller crusher.

FIG. 25 illustrates a complete assembly of two material removal devices 1100, 1100' according to the disclosure when arranged on a frame 1200 of a roller crusher 1. The material removal devices 1100 and 1100' are nearly identical. The only difference between them is that the rotatable cutter units 1120 are mounted in an opposite manner to allow the impact surfaces 1104 of the cutter elements 1101 to face in the same direction in spite of the material removal devices 1100, 1100' being arranged in a mirrored manner. The rotatable cutter unit 1110 comprises four cutter element support structures 620 (same as described with reference to earlier example embodiments) each carrying two cutter elements 1101, which means that the rotatable cutter unit 1110 comprises eight cutter elements 1101. The cutter element support structures 620 are mounted on main support structure 112 which in turn is mounted onto shaft member 540 (see also FIG. 18C). The cutter element support structures 620 are covered by wear shields 1190a, 1190b and cannot therefore be seen in FIG. 25. The cutter element support structures 620 are illustrated in FIGS. 20 to 23. Wear shields 1190a, 1190b are similar to the wear shields 160, 165 described in detail with reference to FIG. 13 and therefore not further described herein. Similar to previous example embodiments, the periphery 1148 as seen between a pair of adjacent cutter elements 1101 has a radial extension K being at least 20 mm smaller than a smallest radial distance T of the pair of adjacent cutter elements 1101 (see FIG. 25). The advantage of the above feature is the generally the same as outlined for the first example embodiment in FIG. 4.

The cutter elements 1102 are similar to cutter elements 220 previously disclosed with reference to FIG. 10 and are therefore only briefly described herein. The active cutter elements 1102 present an impact surface 1104 which has a front portion 1104a and a rear portion 1104b which interconnect each other. The front portion 1104a is arranged upstream of the rear portion 1104b such that the front portion 1104a will meet the material to be removed from the roller 3 first. When the material removal device 1100 is arranged on a roller crusher 1, the front portion 1104a will be arranged closer to the flange 36 than the rear portion 1104b. This may be advantageous as it allows creating very strong impact forces on localized regions of the material build-up on the roller 3 with the flange 36 by means of the front portion 1104a, thereby increasing the likelihood of breaking away larger portions of material. The rear portion 1104b may then step in and aid in further removing material from the roller 3 and/or conveying the already removed material away from the flange 36. The front portion 1104a comprises polycrystalline diamond (PCD). The rear portion 1104b may also comprise polycrystalline diamond (PCD).

Also shown in FIG. 25 and in a more realistic representation than the earlier schematic one, is drive unit 195 and transmission system 180.

The person skilled in the art realizes that the present disclosure by no means is limited to the preferred embodiments described above. On the contrary, many modifications and variations are possible within the scope of the appended claims. For example, the example embodiments of the rotatable cutter unit presented herein constitute relatively complex assemblies of a plurality of elements. Important to keep in mind is however, that the rotatable cutter unit of the disclosure should not be construed as limited to such assemblies. It is also conceivable to provide a rotatable cutter unit from a single material in which the claimed features are integrally formed. As an example, a rotatable cutter unit may be formed from a single steel element and cut to create the cutter elements as radially outwardly directed protrusions of the same. Each cutter element may be cut to provide an impact surface of suitable shape. Such an embodiment, though not explicitly illustrated in the drawings, is considered to be straight-forward for the person skilled in the art to design based on the present disclosure and common general knowledge in the field. Additionally, variations to the disclosed embodiments can be understood and effected by the skilled person in practicing the claimed, from a study of the drawings, the disclosure, and the appended claims.

LIST OF EMBODIMENTS

Embodiment 1. A roller crusher having two generally parallel rollers arranged to rotate in opposite directions, and separated by a gap, each roller having two ends, the roller crusher comprising:

a flange attached to one of the ends of one of the rollers, the flange extending in a radial direction of the roller, and the flange having an extension (H) past an envelope surface of the roller, wherein the roller crusher further comprises a material removal device, comprising:

a rotatable cutter unit having a plurality of cutter elements arranged tangentially about the rotatable cutter unit at a respective radial distance from a rotational axis of the rotatable cutter unit; and a rotation device arranged to rotate the rotatable cutter unit, wherein the rotatable cutter unit is arranged at an end of a roller having a flange and thereby, when being rotated by the rotation device, at least partially allow cutting away material accumulated on the flange and/or on the envelope surface at an end portion of the roller adjacent the flange, wherein each of the cutter elements of the plurality of cutter elements presents an impact surface arranged to face the material to be cut away, and wherein each of the impact surfaces comprises a polycrystalline diamond (PCD).

Embodiment 2. The roller crusher according to Embodiment 1, wherein the cutter element further comprises a wear resistant material in which the polycrystalline diamond (PCD) is at least partly embedded.

Embodiment 3. The roller crusher as claimed in Embodiment 2, wherein the wear resistant material is one from the list of: a ceramic material, a metal ceramic composite material, and a metal matrix composite material.

Embodiment 4. The roller crusher according to any one of Embodiment 1 to 3, wherein the impact surface is substantially planar and arranged transverse to a tangential direction of motion of the cutter element.

Embodiment 5. The roller crusher according to any one of Embodiment 1 to 4, wherein the rotatable cutter unit is arranged at a first end of the material removal device, and the rotation device is arranged at a second, opposite, end of the material removal device, and wherein the rotatable cutter unit extends in a reference plane which is orthogonal to the rotational axis.

Embodiment 6. The roller crusher as claimed in Embodiment 5, wherein each impact surface of the plurality of cutter elements is substantially planar and arranged to incline in a relation to a normal to the reference plane, as defined in front of the impact surface, and incline such that a distance between the normal and the impact surface decreases towards the flange.

Embodiment 7. The roller crusher according to any one of Embodiment 1 to 6, wherein the impact surface has a front portion and a rear portion which interconnect each other, wherein the front portion is arranged upstream of the rear portion as seen in relation to a tangential direction of motion of the cutter element and wherein the front portion is arranged closer to the flange than the rear portion.

Embodiment 8. The roller crusher according to Embodiment 7, wherein the rear portion is shaped so as to convey cut away material in a direction away from the flange.

Embodiment 9. The roller crusher according to Embodiment 8, wherein the rear portion is substantially planar and forms an oblique angle with respect to the tangential direction of motion of the cutter element.

Embodiment 10. The roller crusher according to Embodiment 8, wherein the rear portion is curved inwardly so as to form a bowl-shape.

Embodiment 11. The roller crusher according to any one of Embodiment 5 to 10, wherein each of the cutter elements has a surface facing the flange, which surface has an extension from its impact surface tangentially towards a rear end thereof, wherein the cutter element is structured and arranged such that a distance between the surface facing the flange and the rotation device decreases towards the impact surface over at least a part of the extension.

Embodiment 12. The roller crusher as claimed in any one of Embodiment 1 to 11, wherein each of the cutter elements has a surface facing the flange, which surface comprises a polycrystalline diamond (PCD).

Embodiment 13. The roller crusher as claimed in any one of Embodiment 5 to 12, wherein each of the plurality of cutter elements has a surface facing away from the flange, which surface has an extension tangentially from the impact surface towards a rear end thereof, wherein the cutter element is structured and arranged such that a distance between the surface facing away from the flange and the rotation device decreases towards the impact surface over at least a part of the extension.

Embodiment 14. The roller crusher as claimed in any one of Embodiment 1 to 13, wherein the plurality of cutter elements is arranged to form axial protrusions on one or both sides of the rotatable cutter unit.

Embodiment 15. The roller crusher as claimed in Embodiment 14, wherein the axial protrusions have axial extensions within the range of up to 75 mm, or 5 to 50 mm, or 10 to 40 mm.

Embodiment 16. The roller crusher as claimed in any one of Embodiment 1 to 15, wherein the rotatable cutter unit extends in a reference plane which is orthogonal to the rotational axis of the rotatable cutter unit, wherein each of the plurality of cutter elements extends in the reference plane along a cutter element axis towards the impact surface, and wherein the cutter element axis forms a first acute angle along a reference rotational direction with a radial axis of the rotatable cutter unit which radial axis intersects with the cutter element.

Embodiment 17. The roller crusher as claimed in Embodiment 16, wherein each impact surface of the plurality of cutter elements extends in a plane which has a normal which forms an acute angle along the reference direction with the cutter element axis.

Embodiment 18. The roller crusher as claimed in any one of Embodiment 1 to 17, wherein each of the plurality of cutter elements has a surface facing away from the flange and a surface facing the flange, and wherein at least one of the surface facing away from the flange and the surface facing the flange comprises ceramic inserts.

Embodiment 19. The roller crusher according to any one of Embodiment 1 to 18, wherein each cutter element of the plurality of cutter elements comprises a cutter element holding structure and an active cutter element attached thereto, wherein the active cutter element presents said impact surface.

Embodiment 20. The roller crusher according to any one of Embodiment 1 to 19, wherein the rotatable cutter unit has an annular engagement portion and wherein each cutter element of the plurality of cutter elements is releasably arranged to the annular engagement portion.

Embodiment 21. The roller crusher according to Embodiment 20, wherein the rotatable cutter unit further comprises a main support structure and at least two cutter element support structures, wherein the at least two cutter element support structures are releasably arranged with respect to the main support structure and shaped as circular ring sectors which together form a circular ring, and which circular ring presents the annular engagement portion.

Embodiment 22. The roller crusher according to Embodiment 20 or 21, wherein each cutter element of the plurality of cutter elements is releasably arranged in the annular engagement portion by a geometrical locking engagement.

Embodiment 23. The roller crusher according to Embodiment 22, wherein the geometrical locking engagement is at least partly defined by a protruding structure of the cutter element being inserted into an associated recess of the annular engagement portion, wherein the protruding structure and the associated recess has complementary shapes.

Embodiment 24. The roller crusher according to Embodiment 23, wherein the associated recess of the annular engagement portion is defined on a side surface thereof.

Embodiment 25. The roller crusher according to Embodiment 23 or 24, wherein each cutter element of the plurality of cutter elements comprises a cutter element holding structure and an active cutter element attached thereto, wherein the active cutter element presents said impact surface, and wherein the protruding structure forms a part of the cutter element holding structure.

Embodiment 26. The roller crusher according to any one of Embodiment 1 to 25, further comprising wear shields structured and arranged to protect at least parts of the rotatable cutter unit.

Embodiment 27. The roller crusher according to any one of claims 1 to 26, wherein a periphery of the rotatable cutter unit, as seen between a pair of adjacent cutter elements of the plurality of cutter elements, has a radial extension being at least 20 mm smaller than a smallest radial distance of the pair of adjacent cutter elements.

Embodiment 28. A method for operating a roller crusher according to any one of Embodiment 1 to 27, wherein the method comprises at least the step of at least partially cutting away material accumulated on the flange and/or on the envelope surface at an end portion of the roller adjacent the flange by means of the material removal device.

The invention claimed is:

1. A roller crusher having two parallel rollers arranged to rotate in opposite directions, and separated by a gap, each roller having two ends, the roller crusher comprising:
a flange attached to an end of one of the two rollers,
the flange extending in a radial direction of the roller, and the flange having an extension (H) past an envelope surface of the roller, wherein the roller crusher further comprises a material removal device, comprising:
a rotatable cutter unit having a plurality of cutter elements arranged tangentially about the rotatable cutter unit at a respective radial distance from a rotational axis of the rotatable cutter unit; and
a rotation device arranged to rotate the rotatable cutter unit,
wherein the rotatable cutter unit is arranged at the end of one of the two rollers having the flange and thereby, when the rotatable cutter unit being rotated by the rotation device, at least partially allow cutting away material accumulated on the flange and/or on the envelope surface at an end portion of the roller adjacent the flange,
wherein each cutter element of the plurality of cutter elements presents an impact surface arranged to face the material to be cut away, and
wherein the impact surface comprises a polycrystalline diamond (PCD).

2. The roller crusher according to claim 1, wherein the cutter element further comprises a wear resistant material in which the polycrystalline diamond (PCD) is at least partly embedded.

3. The roller crusher as claimed in claim 2, wherein the wear resistant material is one of: a ceramic material, a metal ceramic composite material, and a metal matrix composite material.

4. The roller crusher according to claim 1, wherein the impact surface is substantially planar and arranged transverse to a tangential direction of motion of the cutter element.

5. The roller crusher according to claim 1, wherein the rotatable cutter unit is arranged at a first end of the material removal device, and the rotation device is arranged at a second, opposite, end of the material removal device, and wherein the rotatable cutter unit extends in a reference plane which is orthogonal to the rotational axis.

6. The roller crusher as claimed in claim 5, wherein the impact surface of the plurality of cutter elements is substantially planar and arranged to incline in a relation to a normal to the reference plane, as defined in front of the impact surface, and incline such that a distance between the normal and the impact surface decreases towards the flange.

7. The roller crusher according to claim 1, wherein the impact surface has a front portion and a rear portion which interconnect each other, wherein the front portion is arranged upstream of the rear portion as seen in relation to a tangential direction of motion of the cutter element and wherein the front portion is arranged closer to the flange than the rear portion.

8. The roller crusher according to claim 7, wherein the rear portion is shaped so as to convey cut away material in a direction away from the flange.

9. The roller crusher according to claim 8, wherein the rear portion is substantially planar and forms an oblique angle with respect to the tangential direction of motion of the cutter element.

10. The roller crusher according to claim 8, wherein the rear portion is curved inwardly so as to form a bowl-shape.

11. The roller crusher according to claim 5, wherein the cutter element has a surface facing the flange, which surface has an extension from its impact surface tangentially towards a rear end thereof, wherein the cutter element is structured and arranged such that a distance between the surface facing the flange and the rotation device decreases towards the impact surface over at least a part of the extension.

12. The roller crusher as claimed in claim 1, wherein the cutter element has a surface facing the flange, wherein the surface facing the flange comprises a polycrystalline diamond (PCD).

13. The roller crusher as claimed in claim 5, wherein the cutter element has a surface facing away from the flange, wherein the surface facing away from the flange has an extension tangentially from the impact surface towards a rear end thereof, wherein the cutter element is structured and arranged such that a distance between the surface facing away from the flange and the rotation device decreases towards the impact surface over at least a part of the extension.

14. The roller crusher as claimed in claim 1, wherein the cutter element is arranged to form axial protrusions on one or both sides of the rotatable cutter unit.

15. The roller crusher as claimed in claim 14, wherein the axial protrusions have axial extensions within a range of up to 75 mm, or 5 to 50 mm, or 10 to 40 mm.

16. The roller crusher as claimed in claim 1, wherein the rotatable cutter unit extends in a reference plane which is orthogonal to the rotational axis of the rotatable cutter unit, wherein the cutter element extends in the reference plane along a cutter element axis towards the impact surface, and wherein the cutter element axis forms a first acute angle along a reference rotational direction with a radial axis of the rotatable cutter unit which radial axis intersects with the cutter element.

17. The roller crusher as claimed in claim 16, wherein the impact surface of the cutter element extends in a plane which has a normal which forms an acute angle along the reference direction with the cutter element axis.

18. The roller crusher as claimed in claim 1, wherein the cutter element has a surface facing away from the flange and a surface facing the flange, and wherein at least one of the surface facing away from the flange and the surface facing the flange comprises ceramic inserts.

19. The roller crusher according to claim 1, wherein the cutter element comprises a cutter element holding structure and an active cutter element attached thereto, wherein the active cutter element presents the impact surface.

20. The roller crusher according to claim 1, wherein the rotatable cutter unit has an annular engagement portion and wherein the cutter element is releasably arranged to the annular engagement portion.

21. The roller crusher according to claim 20, wherein the rotatable cutter unit further comprises a main support structure and at least two cutter element support structures, wherein the at least two cutter element support structures are releasably arranged with respect to the main support structure and shaped as circular ring sectors which together form a circular ring, and wherein the circular ring presents the annular engagement portion.

22. The roller crusher according to claim 20, wherein each cutter element of the plurality of cutter elements is releasably arranged in the annular engagement portion by a geometrical locking engagement.

23. The roller crusher according to claim 22, wherein the geometrical locking engagement is at least partly defined by a protruding structure of the cutter element being inserted into an associated recess of the annular engagement portion, wherein the protruding structure and the associated recess has complementary shapes.

24. The roller crusher according to claim 23, wherein the associated recess of the annular engagement portion is defined on a side surface thereof.

25. The roller crusher according to claim 23, wherein the cutter element comprises a cutter element holding structure and an active cutter element attached thereto, wherein the active cutter element presents the impact surface, and wherein the protruding structure forms a part of the cutter element holding structure.

26. The roller crusher according to claim 1, further comprising wear shields structured and arranged to protect at least parts of the rotatable cutter unit.

27. The roller crusher according to claim 1, wherein a periphery of the rotatable cutter unit, as seen between a pair of adjacent cutter elements of the plurality of cutter elements, has a radial extension being at least 20 mm smaller than a smallest radial distance of the pair of adjacent cutter elements.

28. A method for operating a roller crusher according to claim 1, wherein the method comprises at least a step of at least partially cutting away the material accumulated on the flange and/or on the envelope surface at the end portion of the roller adjacent the flange by the material removal device.

* * * * *